(12) United States Patent
Fujita et al.

(10) Patent No.: US 11,155,193 B2
(45) Date of Patent: Oct. 26, 2021

(54) SEAT CUSHION FOR VEHICLE SEAT AND VEHICLE SEAT

(71) Applicant: DELTA KOGYO CO., LTD., Aki-gun (JP)

(72) Inventors: Etsunori Fujita, Higashihiroshima (JP); Seiji Kawasaki, Higashihiroshima (JP); Yuta Hiramoto, Aki-gun (JP); Masahiro Kuromoto, Aki-gun (JP); Minoru Nakamura, Hiroshima (JP)

(73) Assignee: DELTA KOGYO CO., LTD., Aki-gun (JP)

( * ) Notice: Subject to any disclaimer, the term of this patent is extended or adjusted under 35 U.S.C. 154(b) by 0 days.

(21) Appl. No.: 16/758,311

(22) PCT Filed: Oct. 23, 2018

(86) PCT No.: PCT/JP2018/039300
§ 371 (c)(1),
(2) Date: Apr. 22, 2020

(87) PCT Pub. No.: WO2019/082876
PCT Pub. Date: May 2, 2019

(65) Prior Publication Data
US 2020/0254912 A1 Aug. 13, 2020

(30) Foreign Application Priority Data

Oct. 24, 2017 (JP) .............................. JP2017-205660
Sep. 28, 2018 (JP) .............................. JP2018-186176

(51) Int. Cl.
*B60N 2/70* (2006.01)
*A47C 7/28* (2006.01)
(Continued)

(52) U.S. Cl.
CPC .............. *B60N 2/7094* (2013.01); *A47C 7/28* (2013.01); *A47C 7/40* (2013.01); *B60N 2/66* (2013.01); *B60N 2/72* (2013.01)

(58) Field of Classification Search
CPC .. B60N 2/7094; B60N 2/7035; B60N 2/7058; B60N 2/7047
See application file for complete search history.

(56) References Cited

U.S. PATENT DOCUMENTS 9,138,062 B2 *   9/2015   Todd .......................... A47C 7/74
9,950,650 B1 *   4/2018   Watanabe ................ B60N 2/68
(Continued)

FOREIGN PATENT DOCUMENTS

CA      2932447 A1 *   6/2015   ........... B60N 2/1675
FR       969602 A  * 12/1950   ........... B60N 2/7047
(Continued)

OTHER PUBLICATIONS

International Search Report dated Jan. 29, 2019 in PCT/JP2018/039300 filed Oct. 23, 2018.

*Primary Examiner* — Timothy J Brindley
(74) *Attorney, Agent, or Firm* — Oblon, McClelland, Maier & Neustadt, L.L.P.

(57) ABSTRACT

A seat cushion includes a seat cushion base layer which biases two base support parts in directions approaching each other, and has base support part elastic members which are elastically deformed in an up-down direction, thereby causing the seat cushion to have a configuration having a high spring characteristic. In the seat cushion and the seat back, the seat cushion is configured to be set to be larger than the seat back regarding a range of connecting an origin, a maximum displacement point, and a maximum load point, and a ratio of an area of a range including an inward curve (Continued)

to an area of a range including an outward curve in a predetermined load-deflection characteristic.

17 Claims, 50 Drawing Sheets

(51) Int. Cl.
  *A47C 7/40* (2006.01)
  *B60N 2/66* (2006.01)
  *B60N 2/72* (2006.01)

(56) References Cited

U.S. PATENT DOCUMENTS

| | | |
|---|---|---|
| 2003/0116999 A1 | 6/2003 | Fujita et al. |
| 2007/0236071 A1 | 10/2007 | Fujita et al. |
| 2013/0060164 A1 | 3/2013 | Fujita et al. |
| 2014/0117738 A1* | 5/2014 | Takahashi ............ B60N 2/7094 297/452.56 |
| 2016/0368404 A1* | 12/2016 | Sammons ............ B60N 2/7047 |
| 2017/0232871 A1 | 8/2017 | Asai et al. |
| 2018/0272908 A1* | 9/2018 | Onuma ..................... B60N 2/56 |
| 2019/0184872 A1* | 6/2019 | Mizoi ..................... A47C 7/28 |
| 2020/0307414 A1* | 10/2020 | Ozawa ................. H01H 13/704 |

FOREIGN PATENT DOCUMENTS

| | | |
|---|---|---|
| JP | 2002-331603 A | 11/2002 |
| JP | 2003-182427 A | 7/2003 |
| JP | 2004-188164 A | 7/2004 |
| JP | 2005-287935 A | 10/2005 |
| JP | 2011-152242 A | 8/2011 |
| JP | 2012-176330 A | 9/2012 |
| JP | 2013-10456 A | 1/2013 |
| JP | 2016-16715 A | 2/2016 |
| JP | 6677233 B2 * | 4/2020 |
| WO | WO 2016/060270 A1 | 4/2016 |
| WO | WO-2019208555 A1 * | 10/2019 ............. B60N 2/502 |
| WO | WO-2020059882 A1 * | 3/2020 ............. A47C 27/14 |

* cited by examiner (a) EXPERIMENTAL RESULT OF TRANSIENT RESPONSIVENESS OF NON-REBOUND 3D NET SEAT (b) TRANSIENT RESPONSE CHARACTERISTIC OF ORDINARY CAR SEAT (c) TRANSIENT RESPONSE CHARACTERISTIC OF NON-REBOUND 3D NET SEAT (a) DAMPING CHARACTERISTIC OF ORDINARY CAR SEAT (b) DAMPING CHARACTERISTIC OF NON-REBOUND 3D NET SEAT (a) PHASE DIFFERENCE SEEN IN EXPERIMENT OF TRANSIENT RESPONSE CHARACTERISTIC (b) PHASE DIFFERENCE SEEN IN EXPERIMENT OF TRANSIENT RESPONSE CHARACTERISTIC (ENLARGEMENT)

(a) ORDINARY CAR SEAT (b) NON-REBOUND 3D NET SEAT (a) 
FLAT SPRING MEMBER (b) 
TWO-DIMENSIONAL KNITTED FABRIC (c) 
VIEW FROM FRONT DIRECTION   VIEW FROM BACK DIRECTION (a) Genuine Seat (b) Remodeling A seat (c) Remodeling B seat (a) Genuine Seat (b) Remodeling A seat (c) Remodeling B seat (a) Genuine seat (b) Remodeling B seat (a) Subject A (58kg)

(b) Subject D (77kg)

(a) Subject A (58kg)

(b) Subject B (60kg)

(c) Subject C (71kg)

(d) Subject D (77kg)

SEAT CUSHION FOR VEHICLE SEAT AND VEHICLE SEAT

TECHNICAL FIELD

The present invention relates to a technique of a vehicle seat used for an automobile, an aircraft, a train, or the like.

BACKGROUND ART

The present applicant has proposed, in order to achieve weight reduction of vehicle seats and improvement in a vibration absorption characteristic, various seat structures in each of which a tension structure provided by stretching a three-dimensional knitted fabric or a two-dimensional net material over a cushion frame and a back frame serves as a cushioning layer (refer to Patent Documents 1, 2). Further, Patent Document 2 discloses a technique in which a flexible plate-shaped member is disposed between a back base net and an outer layer, and by vibration input in the up-down direction, the flexible plate-shaped member is relatively moved to the back base net to improve the vibration absorption characteristic. Moreover, in Patent Document 3, setting of a static spring constant and a dynamic spring constant in a seat cushion is made in a predetermined relationship according to a position of a body support portion on the seat cushion, to thereby achieve the improvement in the vibration absorption characteristic.

PRIOR ART DOCUMENT

Patent Document

Patent Document 1: Japanese Patent Application Laid-open No. 2004-188164
Patent Document 2: Japanese Patent Application Laid-open No. 2013-10456
Patent Document 3: Japanese Patent Application Laid-open No. 2012-176330

SUMMARY OF THE INVENTION

Problems to Be Solved by the Invention

The seat structures in Patent Documents 1 to 3 are light in weight and excellent in the vibration absorption characteristic or the like. However, the improvement in the vibration absorption characteristic or the like is always demanded from the vehicle seat. Further, oxygen is necessary for humans, and securing an environment where oxygen is easily taken in leads humans to a steady state. A case where humans are seated in the vehicle seat is also similar, and in order to reduce tiredness and achieve comfortable ride, it is important to enable easy breathing in a seating state. Accordingly, the vehicle seat is desired not only to be capable of reducing a stress on humans due to vibrations, acceleration, and the like which are input from a vehicle body during traveling but also to be capable of securing such a posture as not to prevent humans from easily breathing.

The present invention was made in consideration of the above problem, and has an object to provide a seat cushion for a vehicle seat and a vehicle seat which are capable of reducing a stress suffered by a seated person due to vibrations, acceleration, and the like, and moreover, easily maintain a posture likely to secure easy breathing.

Means for Solving the Problems

In order to solve the aforesaid problem, the seat cushion for the vehicle seat of the present invention is a seat cushion for a vehicle seat, the seat cushion includes:
a seat cushion base layer supported by a cushion frame; and
a seat cushion cushioning layer disposed on the seat cushion base layer,
wherein the seat cushion base layer includes
left-right base support parts provided in a range including positions corresponding to seated person's left-right ischial tuberosities, apart from each other in a width direction of the cushion frame,
wherein the left-right base support parts are coupled with each other through base support part elastic members, and supported to be movable by the cushion frame, and
wherein the respective left-right base support parts are movable with 6 degrees of freedom with the positions corresponding to ischial tuberosities centered.

Further, the seat cushion for the vehicle seat of the present invention is a seat cushion for a vehicle seat including a seat back, the seat cushion includes:
a seat cushion base layer supported by a cushion frame; and
a seat cushion cushioning layer disposed on the seat cushion base layer,
wherein the seat cushion base layer includes:
left-right base support parts provided in positions corresponding to seated person's left-right ischial tuberosities, apart from each other in a width direction of the cushion frame; and
base support part elastic members bridged between the left-right base support parts, in which restoring force acts in directions bringing the left-right base support parts close to each other, near a middle in a width direction of the cushion frame.

Preferably, the base support part elastic members are composed of coil springs, and disposed in plurality along a front-rear direction of the cushion frame between the left-right base support parts.

Preferably, the left-right base support parts each include: a support fabric whose front portion, rear portion, and outer portion are supported by the cushion frame; and a buffer member stacked on the support fabric.

Preferably, the buffer member is configured to have a three-dimensional knitted fabric.

Preferably, the buffer member is configured to have an outer pad member in a substantially rectangular frame shape, an inner pad member disposed in an inner space of the outer pad member, and cover members covering a front surface and a back surface of the inner pad member and made to adhere to a front surface and a back surface of the outer pad member.

Preferably, the outer pad member is a bead foam, and the inner pad member is a three-dimensional knitted fabric.

The vehicle seat of the present invention is a vehicle seat including a seat cushion and a seat back, wherein the seat cushion is used.

Preferably, the seat back includes: a seat back base layer supported by a back frame; and a seat back cushioning layer disposed by covering the seat back base layer, wherein the seat back base layer includes: a seat back base fabric bridged between left-right side frames of the back frame; and a lumbar support elastically supported through spring members in a range close to a portion more downward than a substantially middle portion in an up-down direction of the back frame.

Preferably, the seat back base fabric has a size which is longer than an up-down-direction length of the lumbar support and covers a portion between a frame disposed close to an upper portion of the back frame and a frame disposed close to a lower portion thereof.

Preferably, the lumbar support includes:

a lumbar flat support member having a plate-shaped lumbar bead foam, three-dimensional knitted fabrics disposed in hole portions formed in the lumbar bead foam, and cover members covering a front surface and a back surface of each of the three-dimensional knitted fabrics and made to adhere to a front surface and a back surface of the lumbar bead foam.

Preferably, when, in a load-deflection characteristic of the seat cushion in pressurizing the seat cushion with a pressure board having a diameter of 200 mm, at a speed of 50 mm/min, and up to a load of 1000 N, in a range of connecting an origin, a maximum displacement point, and a maximum load point, in the range, a ratio between an outward area (a1) of a range including an outward curve and an inward area (b1) of a range including an inward curve is set as a load characteristic area ratio of the seat cushion (b1/a1), and in a load-deflection characteristic of the seat back in pressurizing the seat back with a pressure board having a diameter of 200 mm, at a speed of 50 mm/min, and up to a load of 500 N, in a range of connecting an origin, a maximum displacement point, and a maximum load point, in the range, a ratio between an outward area (a2) of a range including an outward curve and an inward area (b2) of a range including an inward curve is set as a load characteristic area ratio of the seat back (b2/a2), there is a relationship of (b1/a1)>(b2/a2).

Preferably, a difference between the load characteristic area ratio of the seat cushion (b1/a1) and the load characteristic area ratio of the seat back (b2/a2) is in a range of 3 to 15%.

Preferably, spring constants at a balanced point on outward curves of a load-deflection characteristic of the seat back are each 15000 N/m or more.

Preferably, a damping ratio of the seat back is larger than a damping ratio of the seat cushion, in which the respective damping ratios are found from free damped waveforms when a weight of 6.7 kg is made to fall from a height of 20 mm onto the seat cushion and the seat back.

Preferably, in a load-deflection characteristic of the seat back in pressurizing the seat back with a pressure board having a diameter of 200 mm, at a speed of 50 mm/min, and up to a load of 500 N, from an intersection of the seat cushion and the seat back, a deflection difference at each of 100 mm and 300 mm upward measuring points in the seat back is 4 mm or more and less than 10 mm.

Effect of the Invention

In the present invention, a seat cushion includes a seat cushion base layer which biases left-right base support parts provided in a range including positions corresponding to seated person's left-right ischial tuberosities in directions approaching each other, and has base support part elastic members which are elastically deformed in an up-down direction near the middle in a width direction of a cushion frame, whereby the seat cushion has a configuration having a high spring characteristic. Therefore, with the positions corresponding to the ischial tuberosities centered, the base support parts are movable with 6 degrees of freedom, and their surfaces supporting buttocks on the seat cushion are easy to move. As a result, followability with respect to displacement is high, which increases a sense of unity between a person and a vehicle such as an automobile, resulting in enabling improvement in ride comfort.

Further, as a seat back, between left-right side frames of the back frame, one having a seat back base fabric bridged over a vertically longer range than that of a lumbar support is preferable. That allows a damping ratio of the seat back to be made higher than that of the seat cushion. Moreover, the seat cushion and the seat back are preferably configured to set the seat cushion to be larger than the seat back regarding a range of connecting an origin, a maximum displacement point, and a maximum load point, and a ratio of an area of a range including an inward curve to an area of a range including an outward curve in a predetermined load-deflection characteristic (load characteristic area ratio). That is, in the seat cushion, greater importance is given to a spring characteristic than a damping characteristic, while in the seat back, greater importance is given to the damping characteristic than the spring characteristic, resulting in a configuration to be provided with a remarkable characteristic difference between the seat cushion and the seat back.

This causes the present invention to achieve the action and effect such as high dispersibility of body pressure on the seat back, but only an increase in the damping characteristic of the seat back sometimes causes a rise in a resonant frequency up to a value equal to a visceral resonant frequency. However, as described above, with a configuration to dispose the aforesaid base support part elastic members in a portion where a center of gravity of a trunk is supported, namely, near the middle in the cushion frame width direction, avoid the resonant frequency rising to the visceral resonant frequency in consideration of improvement in surface stiffness, and enhance displacement followability and vibration followability, it is possible to achieve balance with the damping characteristic of the seat back, suppress swing of a head, and reduce harshness felt on buttocks.

Further, breathing moves a central portion of the trunk in a range mainly from a pelvis to a chest, and the base support part elastic members are disposed near the middle in the width direction of the cushion frame, thereby making restoring force likely to be imparted to the central portion of the trunk. Besides, since the seat back has a high damping characteristic as described above, the restoring force from the seat cushion is transmitted along a seating surface to be damped and dispersed in the seat back. Binding force near the chest in the seat back is small, which allows easy breathing to be stimulated.

Further, the base part elastic members are provided near the middle in the width direction of the cushion frame, and outer portions of the left-right base support parts provided in the positions corresponding to the left-right ischial tuberosities are preferably supported by the cushion frame having high stiffness without interposing an elastic member. This causes a seated person's trunk side portion to be supported, which allows bad posture to be suppressed. On one hand, owing to movement of the base part elastic members near the middle in the width direction of the seat cushion, there is no uneasy feeling even when the trunk side portion is supported. Besides, the base part elastic members near the middle in the width direction of the seat cushion are composed of a plurality of coil springs, thereby increasing stiffness of the above portion, and on one hand, since the ischial tuberosities are supported by the base support parts, a sense of unity with movement of the seat cushion is increased, which enhances stability of a seating posture.

MODES FOR CARRYING OUT THE INVENTION

Figure 1:
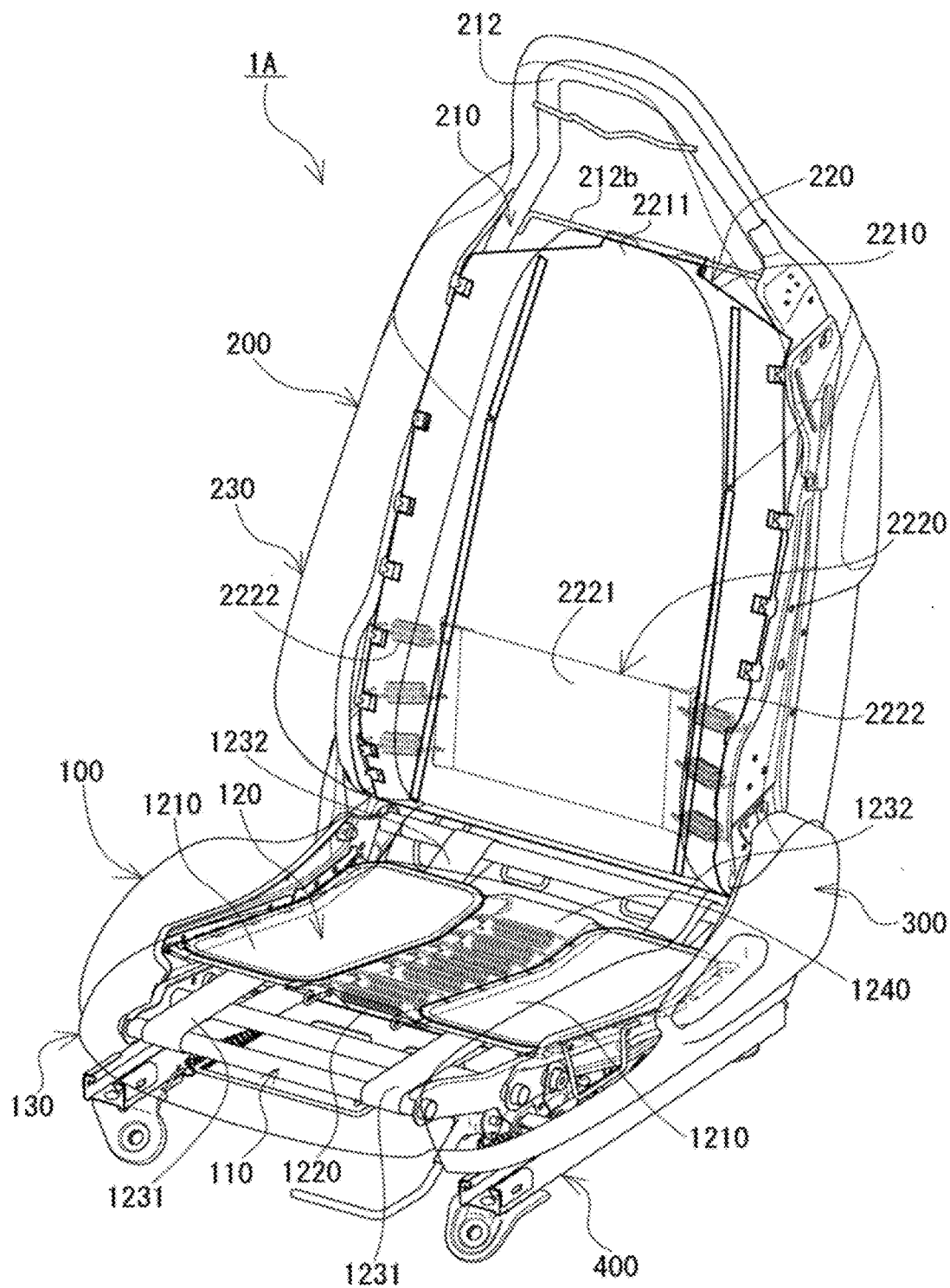
FIG. 1 is a perspective view illustrating a vehicle seat according to a first embodiment of the present invention.
Figure 2:
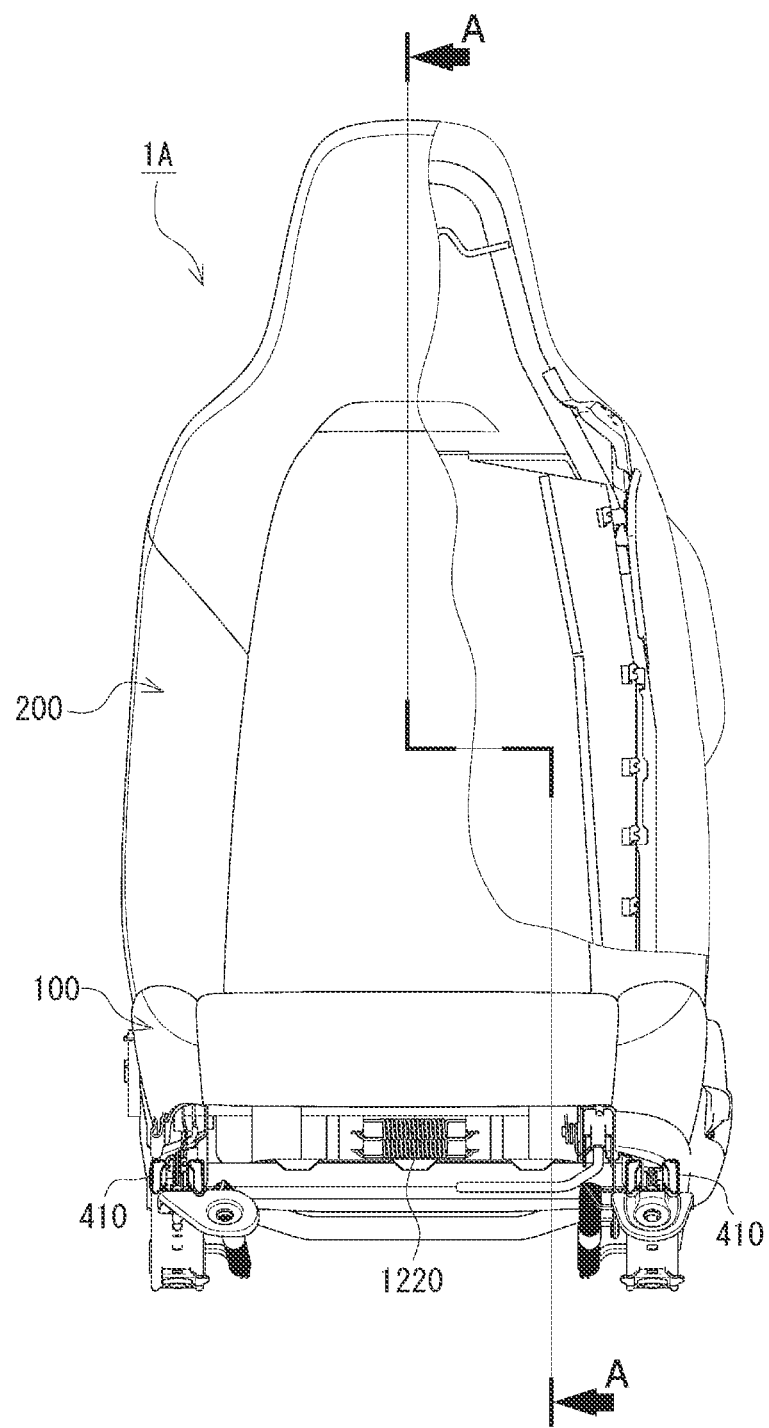
FIG. 2 is a front view of FIG. 1.

The present invention will be hereinafter described in more detail based on embodiments illustrated in the drawings.

First Embodiment

FIG. 1 to FIG. 11 are views illustrating a vehicle seat 1A according to a first embodiment of the present invention, and the vehicle seat 1A includes a seat cushion 100 and a seat back 200, they are coupled through a reclining mechanism part 300, and with respect to the seat cushion 100 fixed to a slider 400, the seat back 200 is capable of reclining.

The seat cushion 100 has a cushion frame 110, a seat cushion base layer 120, and a seat cushion cushioning layer 130 (refer to FIG. 1). The cushion frame 110 is supported by the slider 400. The slider 400 is configured to have left-right lower rails 410, 410 fixed to a vehicle body floor (not illustrated) at a predetermined interval in a width direction of the seat cushion 100, and upper rails 420, 420 disposed on the lower rails 410, 410 to be capable of sliding thereon, and left-right cushion-side side frames 111, 111 constituting the cushion frame 110 are coupled and supported by the upper rails 420, 420. Further, between front end portions between the left-right cushion-side side frames 111, 111, a front edge frame 112 is bridged along the width direction of the seat cushion 100, and a rear edge frame 113 is bridged between rear end portions therebetween (refer to FIG. 3, FIG. 4). Moreover, between the left-right cushion-side side frames 111, 111, a front edge side reinforcing frame 114 is bridged slightly in the rear of the front edge frame 112, and a rear edge side reinforcing frame 115 is bridged in the front of a rear edge frame 113. A disposition height of the rear edge side reinforcing frame 115 is in a lower position than that of the rear edge frame 113, which makes it possible to secure a predetermined amount of a stroke in a downward direction of the seat cushion base layer 120 in the position (refer to FIG. 10, FIG. 11).

Figure 4:
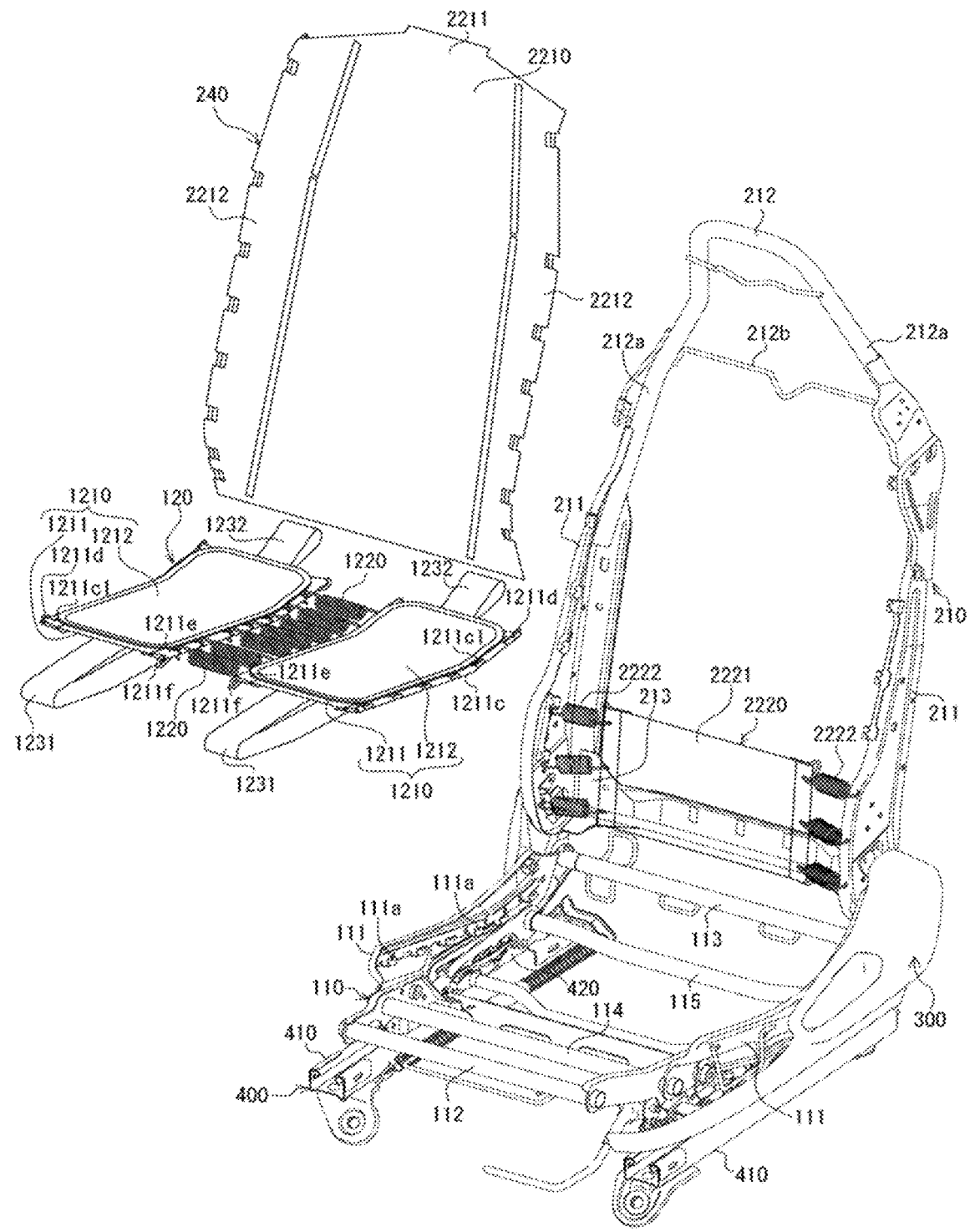
FIG. 4 is an exploded perspective view of substantial parts of the vehicle seat according to the first embodiment.
Figure 5:
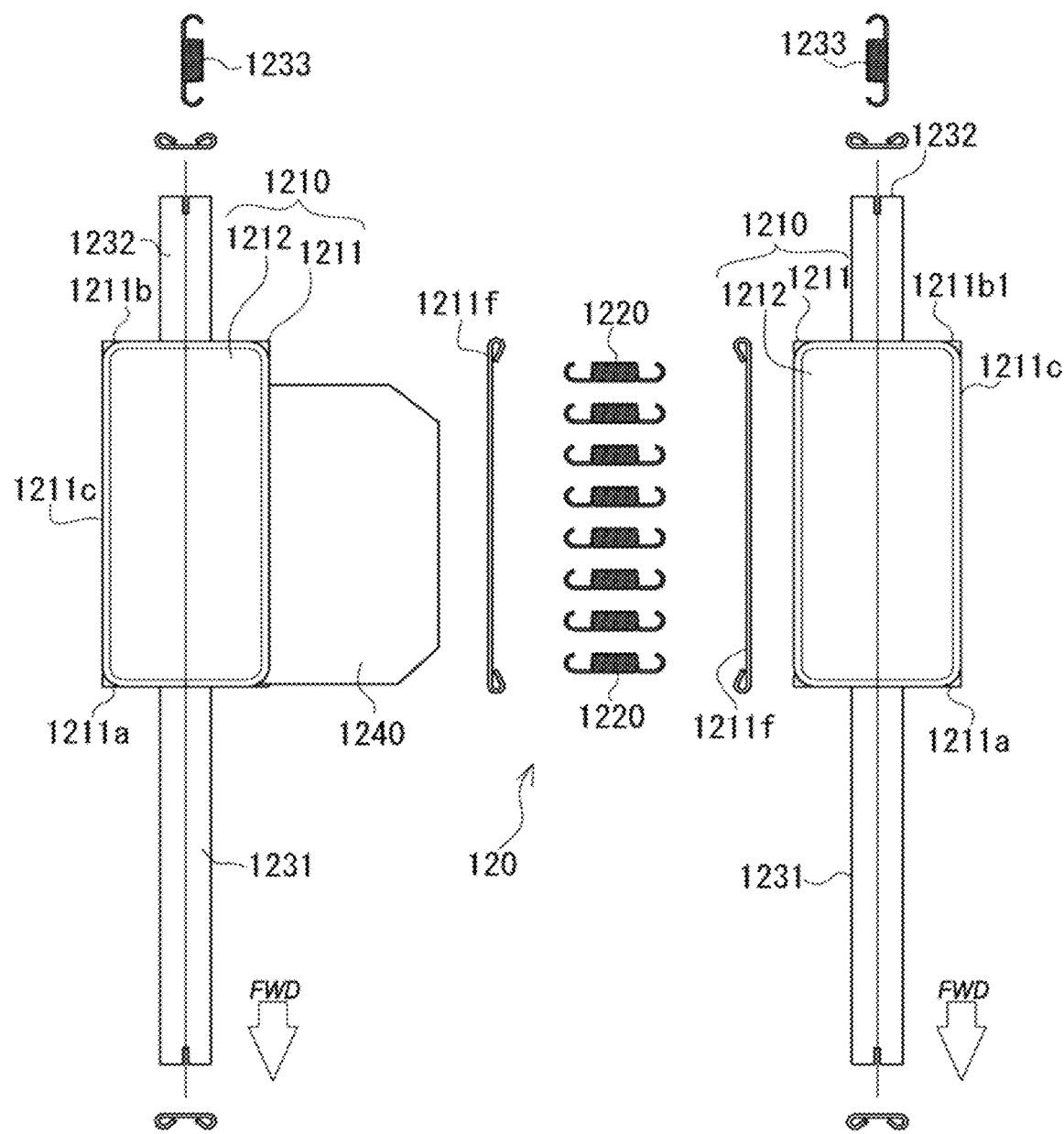
FIG. 5 is a view for explaining a configuration of a seat cushion base layer.

The seat cushion base layer 120 has left-right base support parts 1210, 1210 disposed apart from each other in the width direction of the cushion frame 110 and a plurality of coil springs 1220, 1220 being base support part elastic members, as illustrated in FIG. 4. The base support parts 1210, 1210 are provided in a range including positions corresponding to seated person's ischial tuberosities, and support portions corresponding to the ischial tuberosities. Then, as illustrated in FIG. 4 to FIG. 6, the base support parts 1210, 1210 have support fabrics 1211, 1211 and buffer members 1212, 1212.

The support fabrics 1211, 1211 are each composed of a two-dimensional fabric or a thin three-dimensional fabric (for example, a three-dimensional knitted fabric to be described later). Though optional, a shape thereof is formed in a substantial rectangle in this embodiment, and front portions 1211a, rear portions 1211b, and outer portions 1211c are supported by the cushion frame 110. FIG. 5 and FIG. 6 illustrate examples of each using the two-dimensional fabric as the support fabrics 1211, 1211. Specifically, with the front portion 1211a of the support fabric 1211, one end of a front band-shaped member 1231 is coupled, and with the rear portion 1211b, one end of a rear band-shaped member 1232 is coupled. The front band-shaped member 1231 is looped around the front edge frame 112 to turn therearound from an upper side to a lower side, the rear band-shaped member 1232 is looped around the rear edge frame 113 to turn therearound from the upper side to the lower side, and the other ends of the front band-shaped member 1231 and the rear band-shaped member 1232 are coupled with each other through a connecting elastic member 1233 (refer to FIG. 3). Note that a coil spring is used as the connecting elastic member 1233 in this embodiment. Accordingly, the front portions 1211a and the rear portions 1211b of the support fabrics 1211, 1211 constituting the base support parts 1210, 1210 are supported to be movable with respect to the cushion frame 110, and in centering the portions corresponding to the ischial tuberosities, the front portions 1211a and the rear portions 1211b serve as freely-rotating ends.

The outer portions 1211c, 1211c of the support fabrics 1211, 1211 are formed in a loop shape, and cut-out portions 1211c1, 1211c1 are formed at predetermined intervals along a front-rear direction of the seat cushion 100, and at the same time, outer engagement metal wires 1211d, 1211d are inserted into the loop-shaped outer portions 1211c, 1211c (refer to FIG. 4). This causes the outer engagement metal wires 1211d, 1211d to be exposed in a range of the cut-out portions 1211c1, 1211c1. Meanwhile, inside the left-right cushion-side side frames 111, 111, in a position higher than disposition positions of the front edge frame 112, the front edge side reinforcing frame 114, and the rear edge side reinforcing frame 115, engaging pieces 111a, 111a are formed in plurality at positions corresponding to the aforesaid cut-out portions 1211c1, 1211c1 (refer to FIG. 4). Consequently, when the outer engagement metal wires 1211d, 1211d exposed from the cut-out portions 1211c1, 1211c1 are engaged in the engaging pieces 111a, 111a, the outer portions 1211c, 1211c of the support fabrics 1211, 1211 are engaged and supported by the left-right cushion-side side frames 111, 111.

Figure 6:
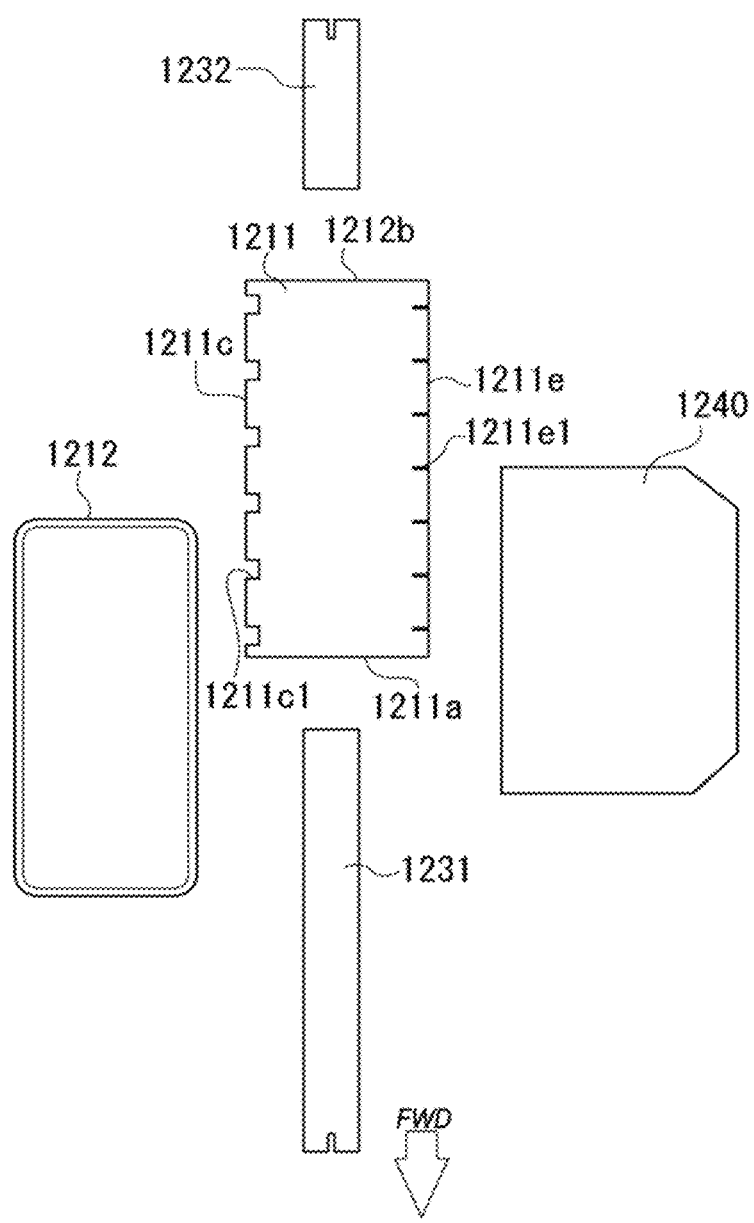
FIG. 6 is a view for explaining a configuration of a buffer member of the seat cushion base layer.

Inner portions 1211e, 1211e of the support fabrics 1211, 1211 (side portions on adjacent sides of the two support fabrics 1211, 1211 disposed at a predetermined interval in the width direction) are also formed in a loop shape, and cuts 1211e1, 1211e1 are formed at predetermined intervals along the front-rear direction of the cushion frame 110 (refer to FIG. 6). Inner engagement metal wires 1211f, 1211f are inserted into the loop-shaped inner portions 1211e, 1211e (refer to FIG. 4, FIG. 5). In the coil springs 1220, 1220 being the base support part elastic members, hooks are engaged in the inner engagement metal wires 1211f, 1211f through the facing cuts 1211e1, 1211e1 at predetermined intervals along the front-rear direction of the seat cushion 100. Thus, the two support fabrics 1211, 1211 disposed apart from each other in the width direction of the cushion frame 110 are pulled in directions coming close to each other (a middle direction in the width direction of the cushion frame 110) by the action of elastic restoring force of the coil springs 1220, 1220 being the base support part elastic members which are disposed in plurality along the front-rear direction of the cushion frame 110 near the middle in the width direction of the cushion frame 110. The coil springs 1220, 1220 are thus located near the middle portion in the width direction of the cushion frame 110. Accordingly, when force in the up-down direction is applied due to a load caused by a seated person's weight and vibrations during traveling, the coil springs 1220, 1220 are expanded while being elastically deformed in the up-down direction, and the elastic restoring force acts (refer to FIG. 10 and FIG. 11).

In the support fabrics 1211, 1211, as described above, the outer portions 1211c, 1211c are engaged and supported by the left-right cushion-side side frames 111, 111. This stabilizes positions of the outer portions 1211c, 1211c of the support fabrics 1211, 1211, and suppresses a seated person's bad posture in the left-right direction even though swing in a lateral direction during traveling, or the like is input. Assuming that the outer portions 1211c, 1211c of the base support parts 1210, 1210 (support fabrics 1211, 1211) are supported through elastic members by the cushion frame 110, the input of the swing in the lateral direction, or the like easily causes the bad posture, and an attempt to restore this posture further requires muscular power and oxygen, which sometimes induces strain of sympathetic nerves. Meanwhile, near the middle in the width direction of the cushion frame 110, the plurality of coil springs 1220, 1220 are disposed along the front-rear direction of the cushion frame 110. Therefore, even though a seated person's left-right movement is restricted, owing to the elastic deformation of the coil springs 1220, 1220 in the up-down direction, an uneasy feeling does not occur. That is, in the support fabrics 1211, 1211 constituting the base support parts 1210, 1210, the inner portions 1211e, 1211e with which the coil springs 1220, 1220 are connected serve as freely-rotating ends centering the outer portions 1211c, 1211c coupled with the cushion-side side frames 111, 111.

Accordingly, the base support parts 1210, 1210 are coupled through the coil springs 1220, 1220, the front band-shaped members 1231, the rear band-shaped members 1232, and the connecting elastic members 1233 to be movable upward or downward, frontward or rearward, and leftward or rightward, and the front portions 1211a, the rear portions 1211b, and the inner portions 1211e of the support fabrics 1211, 1211 serve as the freely-rotating ends, and are movable with 6 degrees of freedom with the positions corresponding to the ischial tuberosities in the base support parts 1210, 1210 centered. Further, since the coil springs 1220, 1220 are disposed near the middle in the width direction of the cushion frame 110, the vicinity of a seated person's trunk is supported by members each having high stiffness. Accordingly, a sense of unity between this movement of the coil springs 1220, 1220 and a seated person's movement on a seating surface, namely, followability to displacement is increased. Vibrations input from the outside are damped by the movement of the coil springs 1220, 1220 becoming an opposite phase, and vibrations transmitted to the seated person are also damped similarly since the sense of unity with the seated person is high.

On the support fabrics 1211, 1211, the buffer members 1212, 1212 are disposed. The buffer member 1212 is composed by using a three-dimensional fabric in almost the same shape as the support fabric 1211, preferably a knitted fabric forming a three-dimensional structure having a pair of ground knitted fabrics disposed apart from each other, and a lot of connecting yarn which goes and returns between the pair of ground knitted fabrics to connect both (three-dimensional knitted fabric), which is disclosed in Japanese Patent Application Laid-open No. 2002-331603, Japanese Patent Application Laid-open No. 2003-182427, and so on as illustrated in FIG. 4 to FIG. 6. The three-dimensional knitted fabric is characterized in that a spring constant found from a load-deflection characteristic in pressurizing it with a board for press having a diameter of 98 mm is higher than a spring constant found from a load-deflection characteristic in pressurizing it with a board for press having a diameter of 30 mm as a spring constant found from a load-deflection characteristic in pressurizing it substantially vertically in a surface direction after straining at an elongation percentage of 0%. This characteristic is a characteristic close to a load-deflection characteristic of human muscle, and to use the three-dimensional knitted fabric is characteristically to make a layer of muscle thick in the portion, which enables a reduction in a sense of incongruity, an increase in fit feeling, improvement in posture supportability, or the like. Note that the characteristic of the three-dimensional knitted fabric can be variously adjusted depending on a size and a shape of a stitch of the ground knitted fabric, a disposition density of the connecting yarn, a raw material of the yarn, and the like. The buffer members 1212, 1212 are disposed at a predetermined interval on the support fabrics 1211, 1211 through the coil springs 1220, 1220 disposed in the middle portion as described above, and the buffer members 1212, 1212 are provided to be in a range including the positions corresponding to the seated person's left-right ischial tuberosities. The buffer members 1212, 1212 support the portions corresponding to the ischial tuberosities, and since the three-dimensional knitted fabric thus has a characteristic close to a characteristic of human muscle, a relief effect of a pressure applied to an ischium is high.

Figure 8:
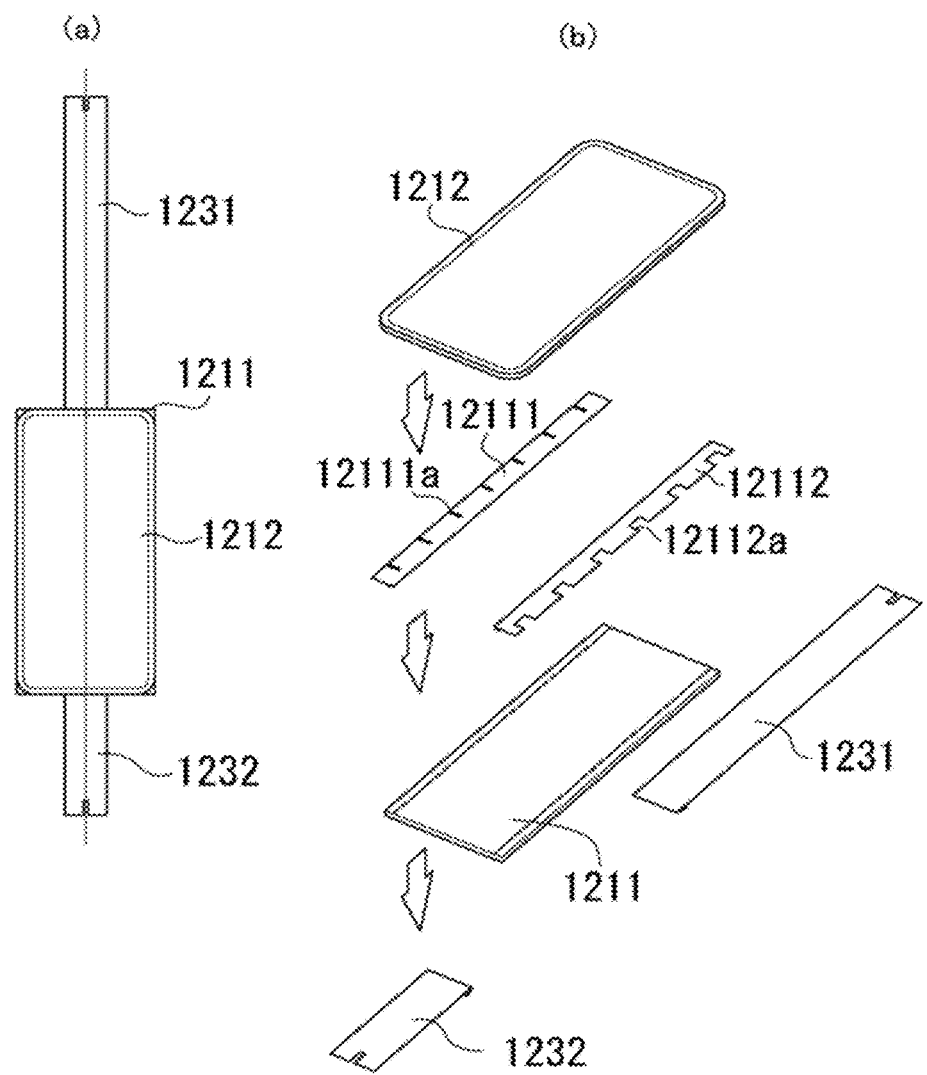
FIGS. 8($a$), ($b$) are views for explaining an example of using a three-dimensional knitted fabric as a support fabric of the seat cushion base layer FIGS. 9($a$), ($b$) are views for explaining an example of using a three-dimensional knitted fabric as a seat back base fabric of the seat back base layer.

The buffer member 1212 can be fixed to the support fabric 1211 by, for example, sewing or the like. However, a fixing means is not limited to this, and as will be in a later-described third embodiment, the buffer member 1212 can also be attached through a surface fastener. Note that as the support fabric 1211, in a case of using a three-dimensional fabric, for example, in a case of using the aforesaid three-dimensional knitted fabric, as illustrated in FIGS. 8(*a*), (*b*), to both side portions of the support fabric 1211 composed of the three-dimensional knitted fabric, a two-dimensional fabric 12111 having cuts 12111a and a two-dimensional fabric 12112 having cut-out portions 1211a which are processed similarly to the outer portions 1211c, 1211c and the inner portions 1211e, 1211e of the support fabrics 1211 composed of the two-dimensional fabric which are illustrated in FIG. 5 and FIG. 6 are each attached by sewing or the like. This makes it possible to engage the two-dimensional fabrics 12112 having the cut-out portions 12112a which correspond to the outer portions in the insides of the left-right cushion-side side frames 111, 111, and engage the coil springs 1220 in the cuts 12111a of the two-dimensional fabrics 12111 corresponding to the inner portions, similarly to a case of using the two-dimensional fabric in FIG. 5 and FIG. 6.

The seat cushion base layer 120 may be provided with a protective fabric 1240 besides the aforesaid base support parts 1210, 1210 and the plurality of coil springs 1220, 1220 being the base support part elastic members, as illustrated in FIG. 1, FIG. 5, and FIG. 6. The protective fabric 1240 is the one bridged between the two base support parts 1210, 1210 so as to cover an upper portion of the coil springs 1220, 1220, and this makes it possible to prevent the coil springs 1220, 1220 from coming into direct contact with the seat cushion cushioning layer 130 on the seat cushion base layer 120.

Figure 3:
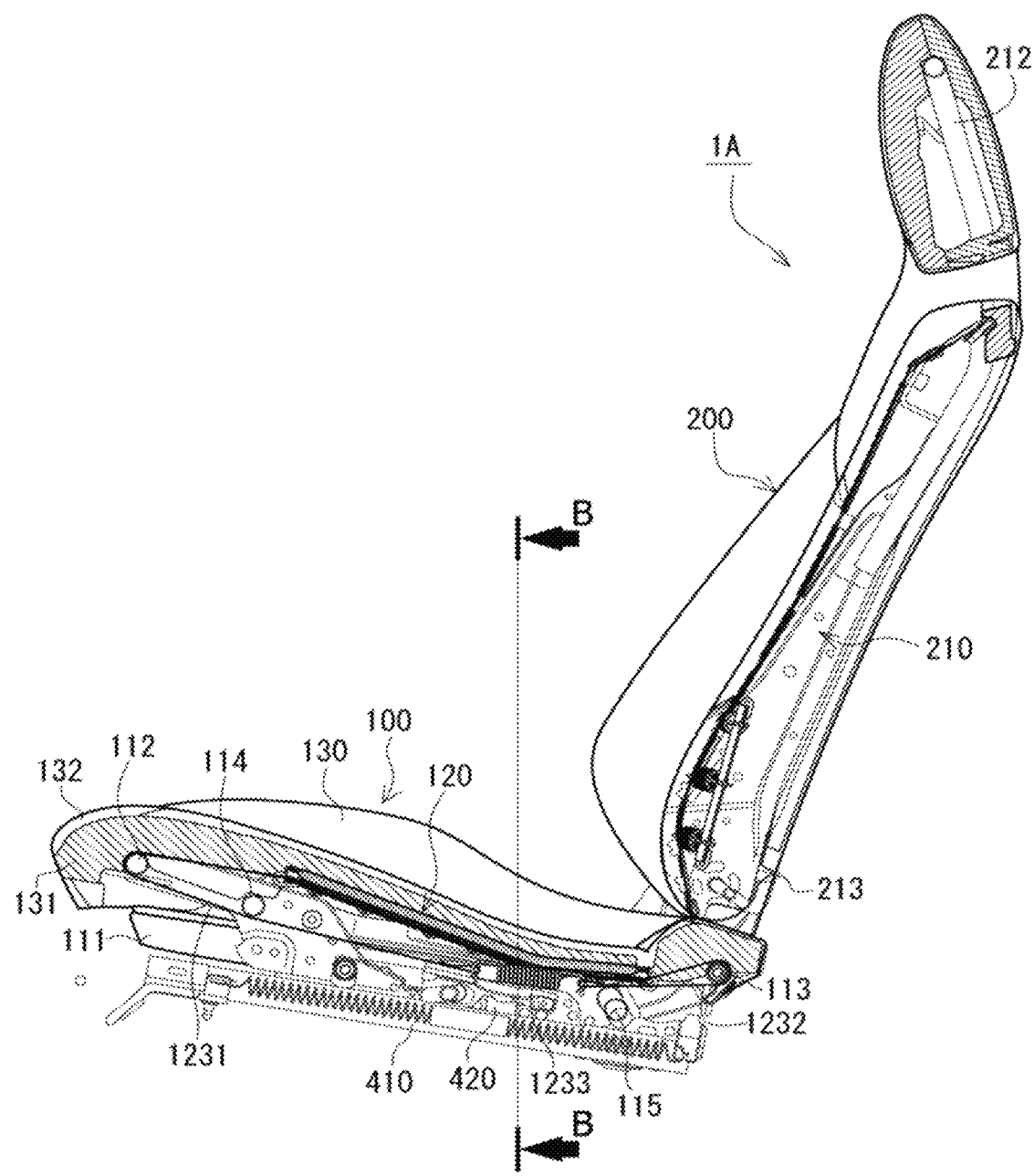
FIG. 3 is an A-A line sectional view of FIG. 1.

The seat cushion cushioning layer 130 is configured to have a cushioning layer pad 131 and an outer layer member 132, as illustrated in FIG. 3. The cushioning layer pad 131 is disposed on the aforesaid seat cushion base layer 120, and its front edge portion and rear edge portion are supported on the front edge frame 112 and the rear edge frame 113 respectively. Further its both side edge portions are also supported by the cushion-side side frames 111, 111 respectively. The cushioning layer pad 131 can be composed of a polyurethane foam or the like, and can also use the aforesaid three-dimensional knitted fabric. The outer layer member 132 is not particularly limited, and is composed by using genuine leather, synthetic leather, fabric, a three-dimensional knitted fabric, or the like and disposed by covering the cushioning layer pad 131. Further, the seat cushion cushioning layer 130 can also be certainly composed of only the three-dimensional knitted fabric bridged over the cushion frame 110 at a predetermined tension.

The seat back 200 has a back frame 210, a seat back base layer 220, and a seat back cushioning layer 230 (refer to FIG. 1). The back frame 210 has left-right back-side side frames 211, 211 disposed at a predetermined interval in a width direction of the seat back 200, and lower portions of the left-right back-side side frames 211, 211 are coupled with rear portions of the left-right cushion-side side frames 111, 111 constituting the cushion frame 110 through the reclining mechanism part 300. Between upper portions of the left-right back-side side frames 211, 211, a headrest frame 212 formed in a substantially inverted U-shape is coupled. Further, between the lower portions of the left-right back-side side frames 211, 211, the lower frame 213 is bridged (refer to FIG. 4).

Figure 7:
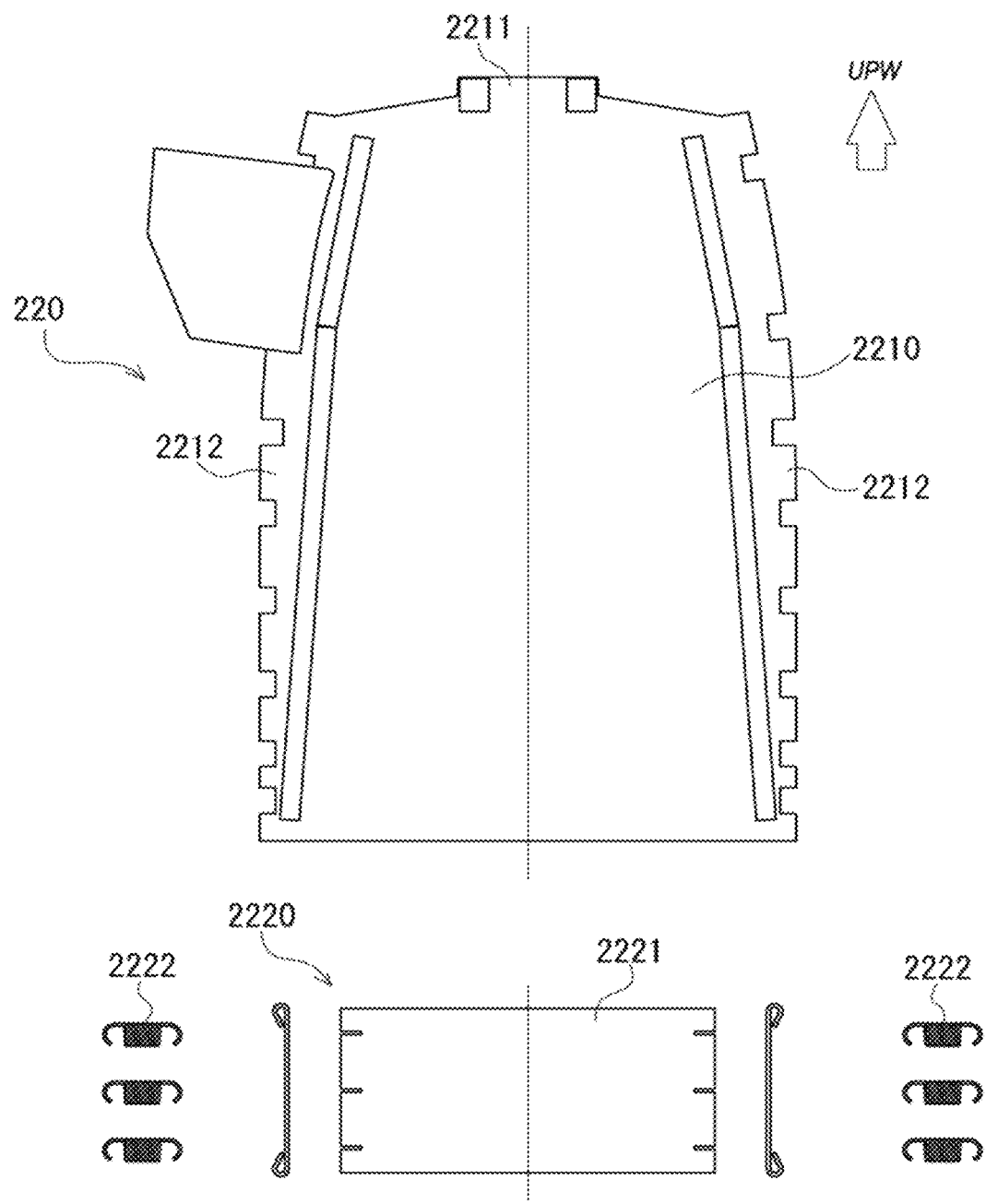
FIG. 7 is a view for explaining a configuration of a seat back base layer.
Figure 9:
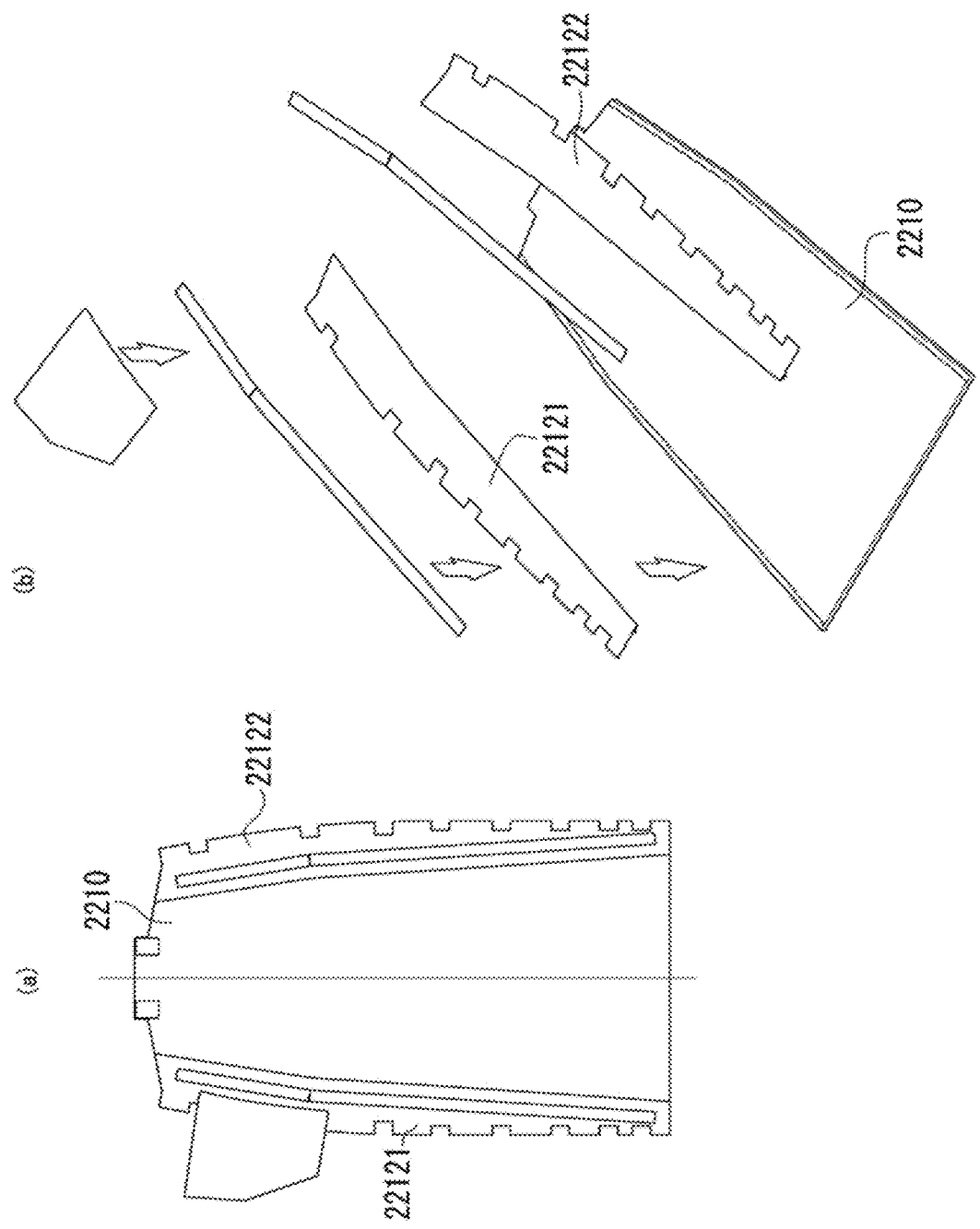
Figure 10:
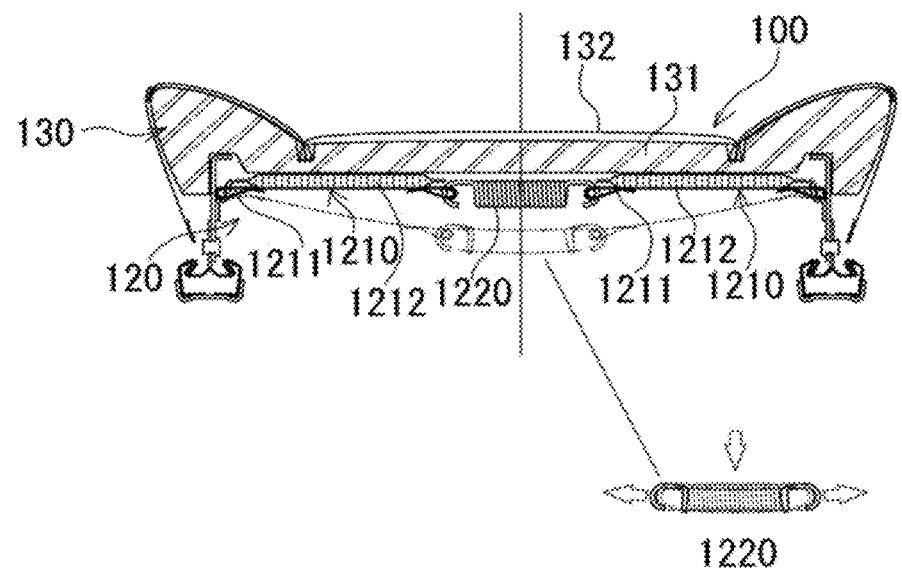
FIG. 10 is a B-B line sectional view of FIG. 3.
Figure 11:
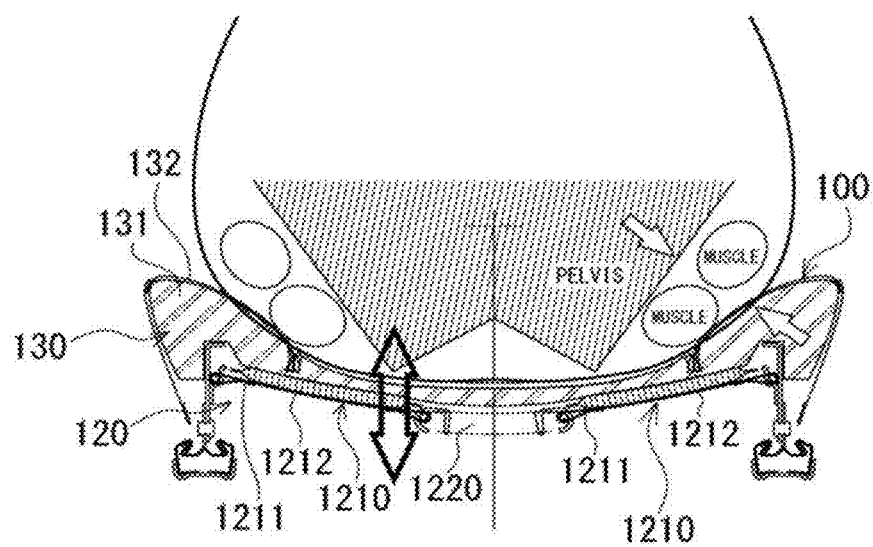
FIG. 11 is a view for explaining the action of the seat cushion base layer.

The seat back base layer 220 is configured to include a seat back base fabric 2210 and a lumbar support 2220, as illustrated in FIG. 1, FIG. 4, and FIG. 7. The seat back base fabric 2210, from a two-dimensional fabric or a thin three-dimensional fabric (for example, a three-dimensional knitted fabric), has a width corresponding to a distance between the left-right back-side side frames 211, 211, and has a size which is longer than an up-down-direction length of the lumbar support 2220 and covers a portion between a frame disposed close to an upper portion of the back frame 210 and a frame disposed close to a lower portion thereof. In this embodiment, the seat back base fabric 2210 is formed in a substantial rectangle having a length along the up-down direction which corresponds to a distance between a headrest auxiliary frame 212b bridged between end portions 212a, 212a of the headrest frame 212 as the frame disposed close to the upper portion and the lower frame 213 being the frame disposed close to the lower portion. Then, an upper edge portion 2211 is disposed to be engaged in the headrest auxiliary frame 212b, and side edge portions 2212, 2212 are disposed to be engaged in the left-right back-side side frames 211, 211. FIG. 7 illustrates an example of using a two-dimensional fabric as the seat back base fabric 2210, and in a case of using a three-dimensional fabric, for example, the three-dimensional knitted fabric, as illustrated in FIG. 9, two-dimensional fabrics 22121, 22122 are attached to side edge portions of the seat back base fabric 2210 composed of the three-dimensional knitted fabric by sewing or the like, and through them, the seat back base fabric 2210 is engaged in the left-right back-side side frames 211, 211.

The lumbar support 2220 is disposed on a back surface side of the seat back base fabric 2210 in the vicinity corresponding to a seated person's lumber region, namely, the vicinity of a portion more downward than a substantially middle portion in a longitudinal direction (up-down direction) of the seat back base fabric 2210 (refer to FIG. 1). The lumbar support 2220 has a lumbar support fabric 2221 and lumbar coil springs 2222 being spring members elastically supporting the lumbar support fabric 2221 (refer to FIG. 4, FIG. 7).

The lumbar support fabric 2221 is composed of a two-dimensional fabric or a thin three-dimensional fabric (for example, a three-dimensional knitted fabric), and its both side edges are engaged in one ends of the lumbar coil springs 2222. The respective other ends of the lumbar coil springs 2222 are engaged in the left-right back-side side frames 211, 211. Since the lumbar support fabric 2221 is biased forward by elastic force of the lumbar coil springs 2222, the vicinity of the portion more downward than the substantially middle portion in the longitudinal direction (up-down direction) of the seat back base fabric 2210 located in the front thereof is also biased forward. The vicinity of the seated person's lumbar region is thereby supported by a predetermined support pressure.

The seat back cushioning layer 230 is supported by the back frame 210 so as to cover the seat back base layer 220. In this embodiment, the seat back cushioning layer 230 is composed of the three-dimensional knitted fabric, and it is strained over the back frame 210. Note that the seat back cushioning layer 230 can be certainly composed by using a pad made of a polyurethane foam or the like and an outer layer member covering a surface thereof.

Here, in the vehicle seat 1 of this embodiment, the seat cushion 100 and the seat back 200 have characteristics as follows.

That is,

When in a load-deflection characteristic of the seat cushion in pressurizing the seat cushion with a pressure board having a diameter of 200 mm, at a speed of 50 mm/min, and up to a load of 1000 N, in a range of connecting an origin, a maximum displacement point, and a maximum load point, in the range, a ratio between an outward area (a1) of a range including an outward curve and an inward area (b1) of a range including an inward curve is set as a load characteristic area ratio of the seat cushion 100 (b1/a1), and in a load-deflection characteristic of the seat back in pressurizing the seat back with a pressure board having a diameter of 200 mm, at a speed of 50 mm/min, and up to a load of 500 N, in a range of connecting an origin, a maximum displacement point, and a maximum load point, in the range, a ratio between an outward area (a2) of a range including an outward curve and an inward area (b2) of a range including an inward curve is set as a load characteristic area ratio of the seat back 200 (b2/a2), there is a relationship of (b1/a1)>(b2/a2).

Figure 14:
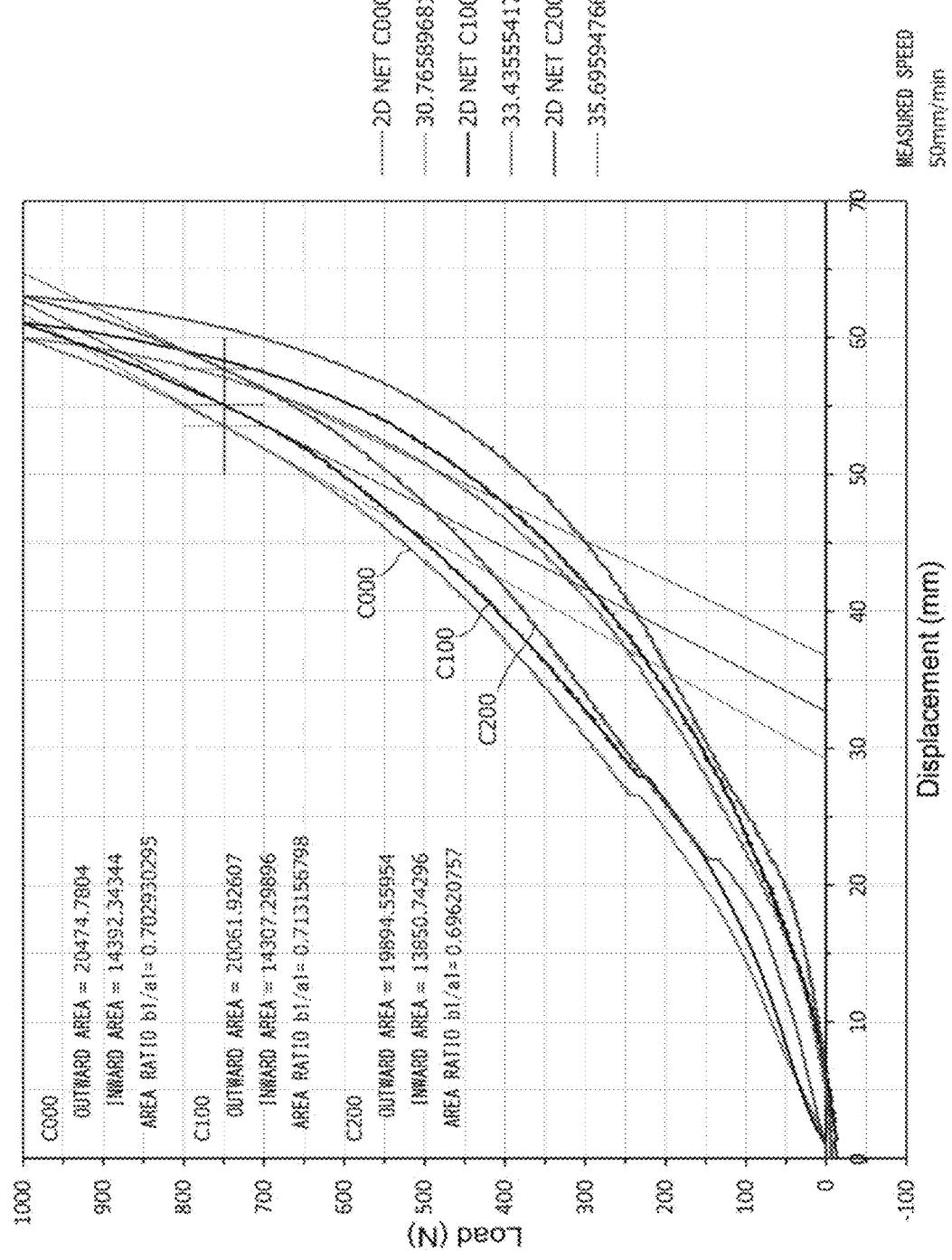
FIG. 14 is a chart illustrating a load-deflection characteristic of the seat cushion in Test example 2.
Figure 15:
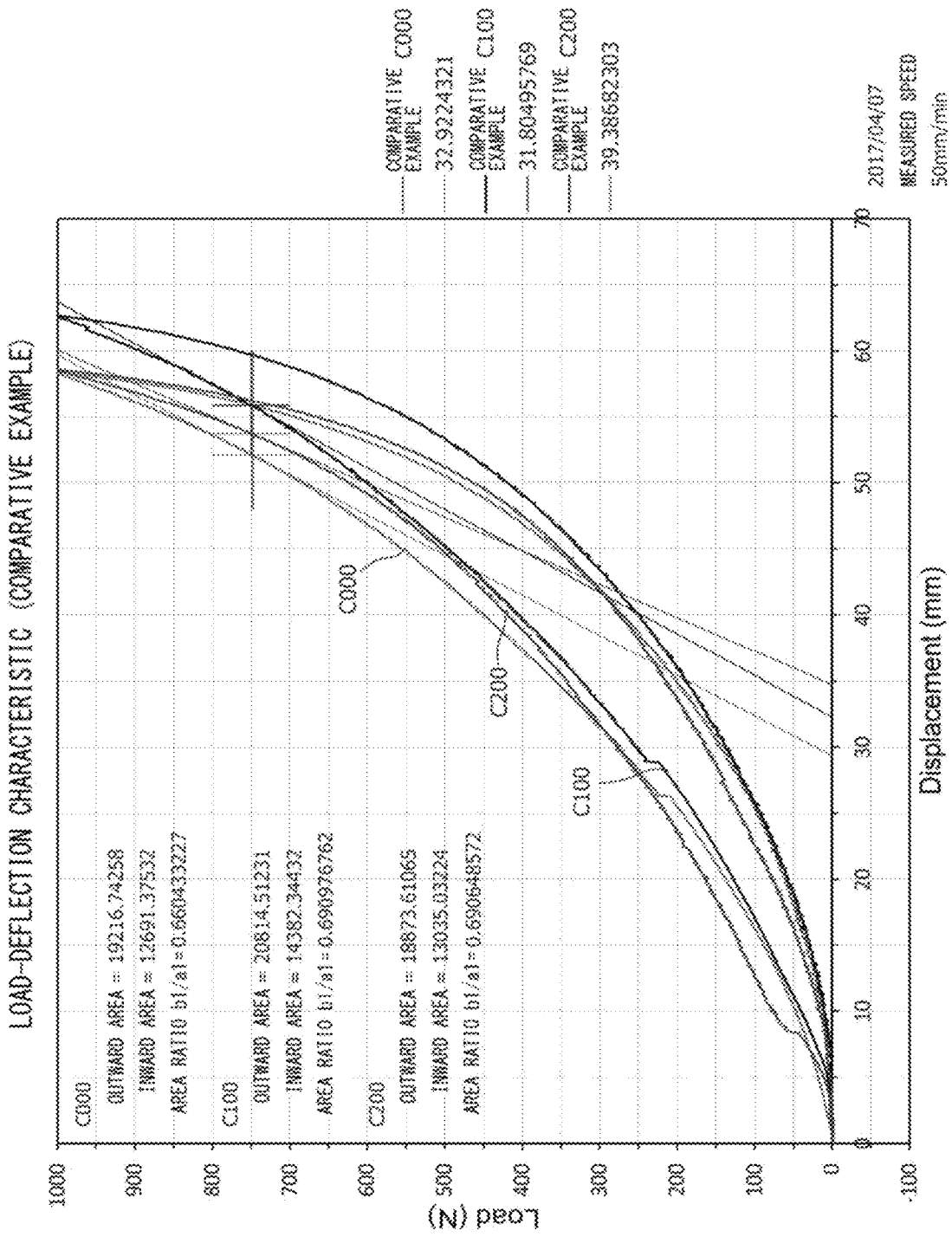
FIG. 15 is a chart illustrating a load-deflection characteristic of the seat cushion in the comparative example.
Figure 16:
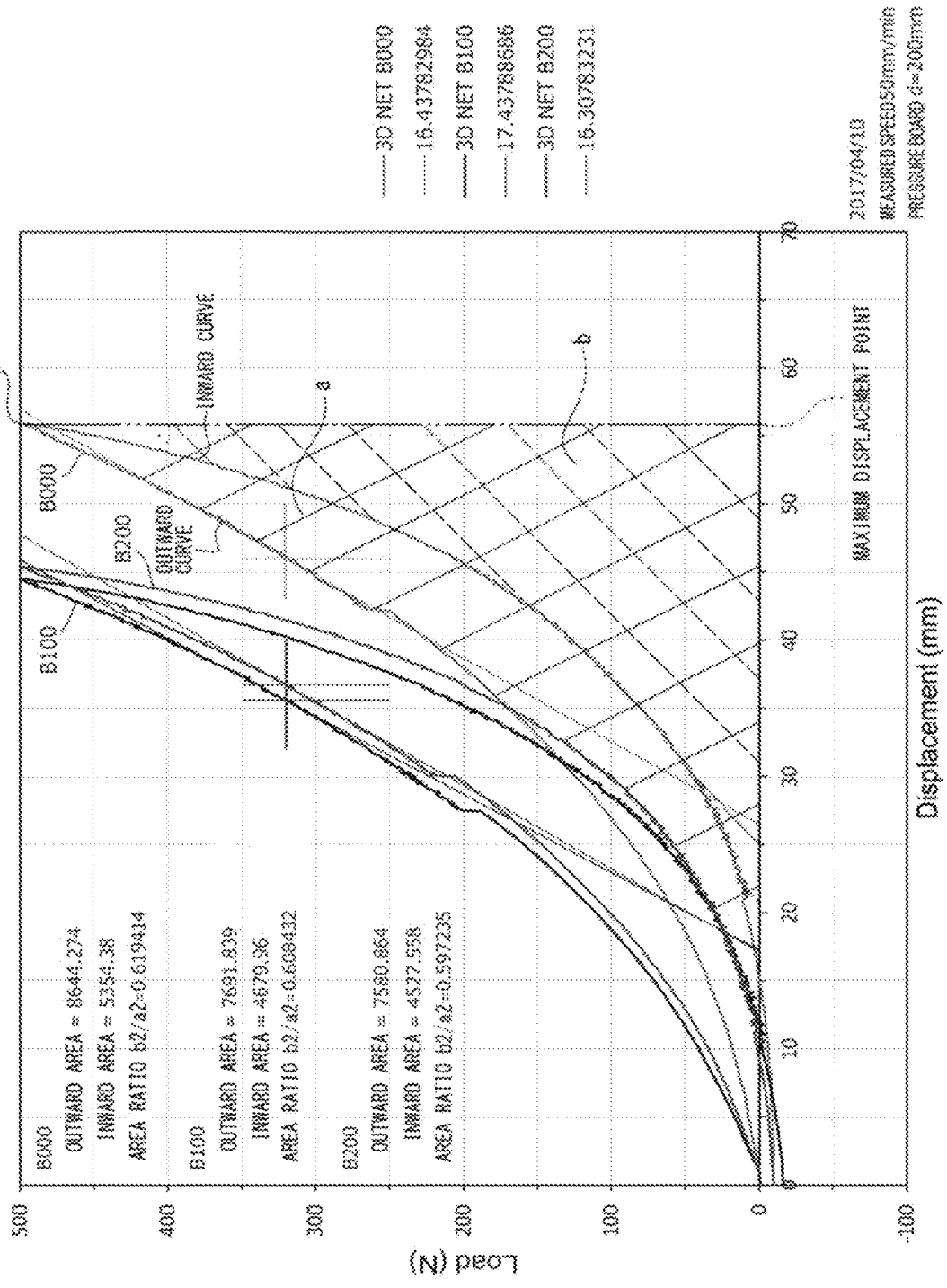
FIG. 16 is a chart illustrating a load-deflection characteristic of the seat back in Test example 1.

Note that when the aforesaid outward areas a1, a2 and inward areas b1, b2 are explained by exemplifying data of B000 in FIG. 16 having less overlap with the other pieces of data among pieces of data of the load-deflection characteristic illustrated in FIG. 13 to FIG. 18, the outward areas a1, a2 each mean an area of a range corresponding to a indicated by solid-line hatching in FIG. 16, and the inward areas b1, b2 each mean an area of a range corresponding to b indicated by dotted-line hatching in FIG. 16.

Figure 12:
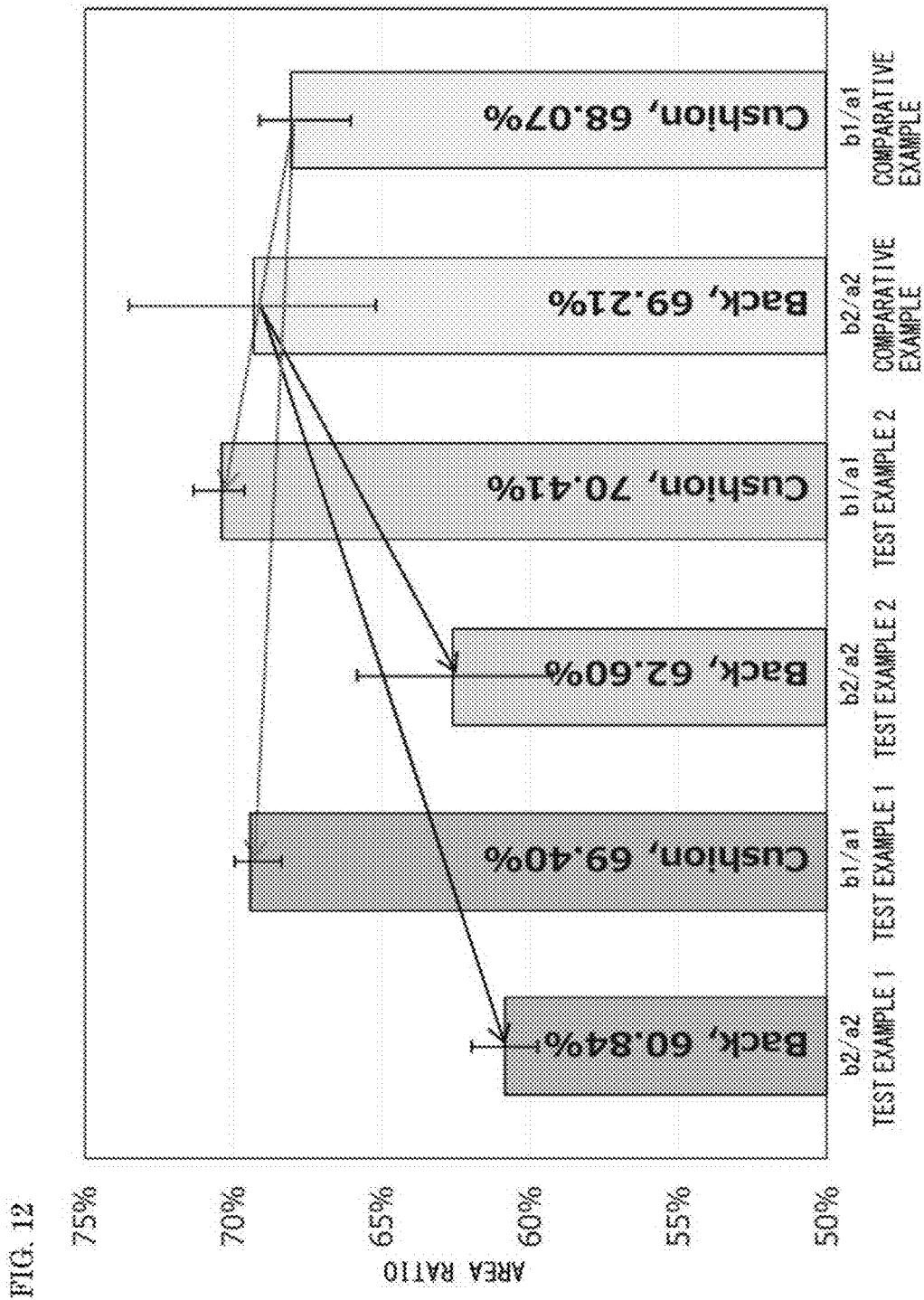
FIG. 12 is a chart illustrating load characteristic area ratios of seat cushions and seat backs regarding Test example 1, Test example 2, and a comparative example.

FIG. 12 is a chart illustrating the relationship of the load-deflection characteristic in the vehicle seat 1A of this embodiment (Test example 1, Test example 2), and a typical seat for driver seat which is mounted on a commercial passenger car (a comparative example). For the vehicle seat 1A of this embodiment, two types in Test example 1 and Test example 2 were prepared. In Test example 1, as both of the support fabric 1211 constituting the base support part 1210 of the seat cushion base layer 120 and the seat back base fabric 2210 of this embodiment, a three-dimensional knitted fabric (manufactured by Asahi Kasei Corporation, product number: AKE70043) is used, and in Test example 2, as both of the support fabric 1211 of the base support part 1210 and the seat back base fabric 2210, a two-dimensional fabric is used. The two-dimensional fabric is used as the lumbar support fabric 2221 in both Test example 1 and Test example 2. The other configurations in Test example 1 and Test example 2 are exactly the same.

Note that the comparative example adopts a structure in which seat cushion springs composed of S springs supported by a cushion frame are disposed in place of the seat cushion base layer 120 of this embodiment in a seat cushion, and seat back springs composed of S springs supported by the back frame 210 are disposed in place of the seat back base layer 220 of this embodiment in a seat back. The configurations of the seat cushion cushioning layer 130 and the seat back cushioning layer 230 are the same as those in Test example 1 and Test example 2.

Figure 13:
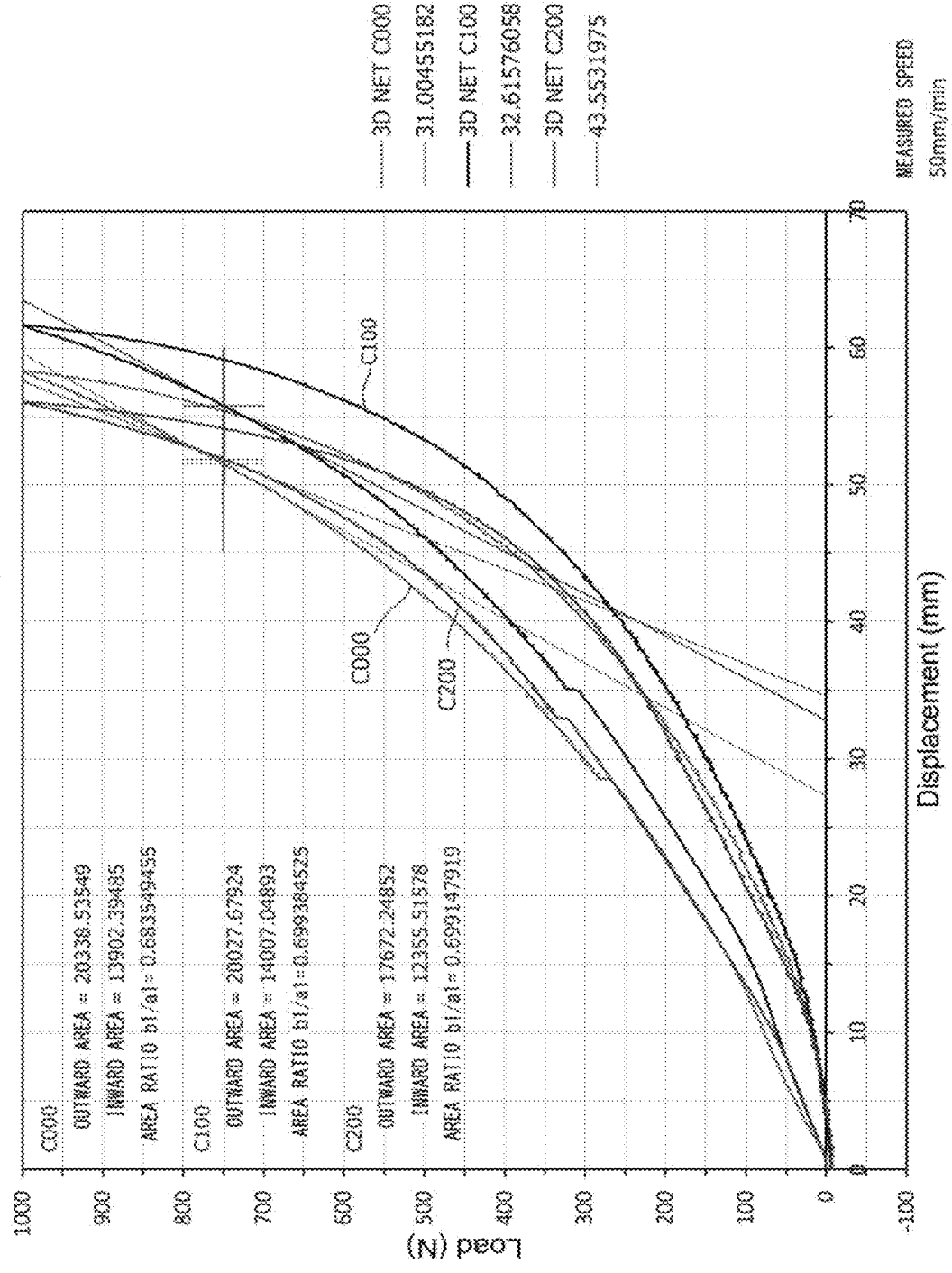
FIG. 13 is a chart illustrating a load-deflection characteristic of the seat cushion in Test example 1.

Positions in each of which the load-deflection characteristic of the seat cushion 100 is measured are a measuring point of a position about 100 mm forward of an intersection of the seat cushion 100 and the seat back 200 (a position corresponding to the seated person's ischial tuberosity) (C000), a measuring point 100 mm forward of C000 (C100), and a measuring point 100 mm further forward of C100 (C200). Each of the measuring points of C000, C100, and C200 was aligned with the center of the pressure board having a diameter of 200 mm in the middle position in the width direction of the seat cushion 100, and pressurized under the aforesaid conditions in a thickness direction (up-down direction) of the seat cushion 100 to perform measurement. Then, FIG. 13 to FIG. 15 illustrate measured results each indicating the load-deflection characteristic at the measuring points of C000, C100, and C200 in Test example 1, Test example 2, and the comparative example, in each of which ratios of the outward areas (a1) and inward areas (b1) at the measuring points are found, and an average value of them is adopted in FIG. 12 to be set as the load characteristic area ratio of the seat cushion 100 (b1/a1).

Figure 17:
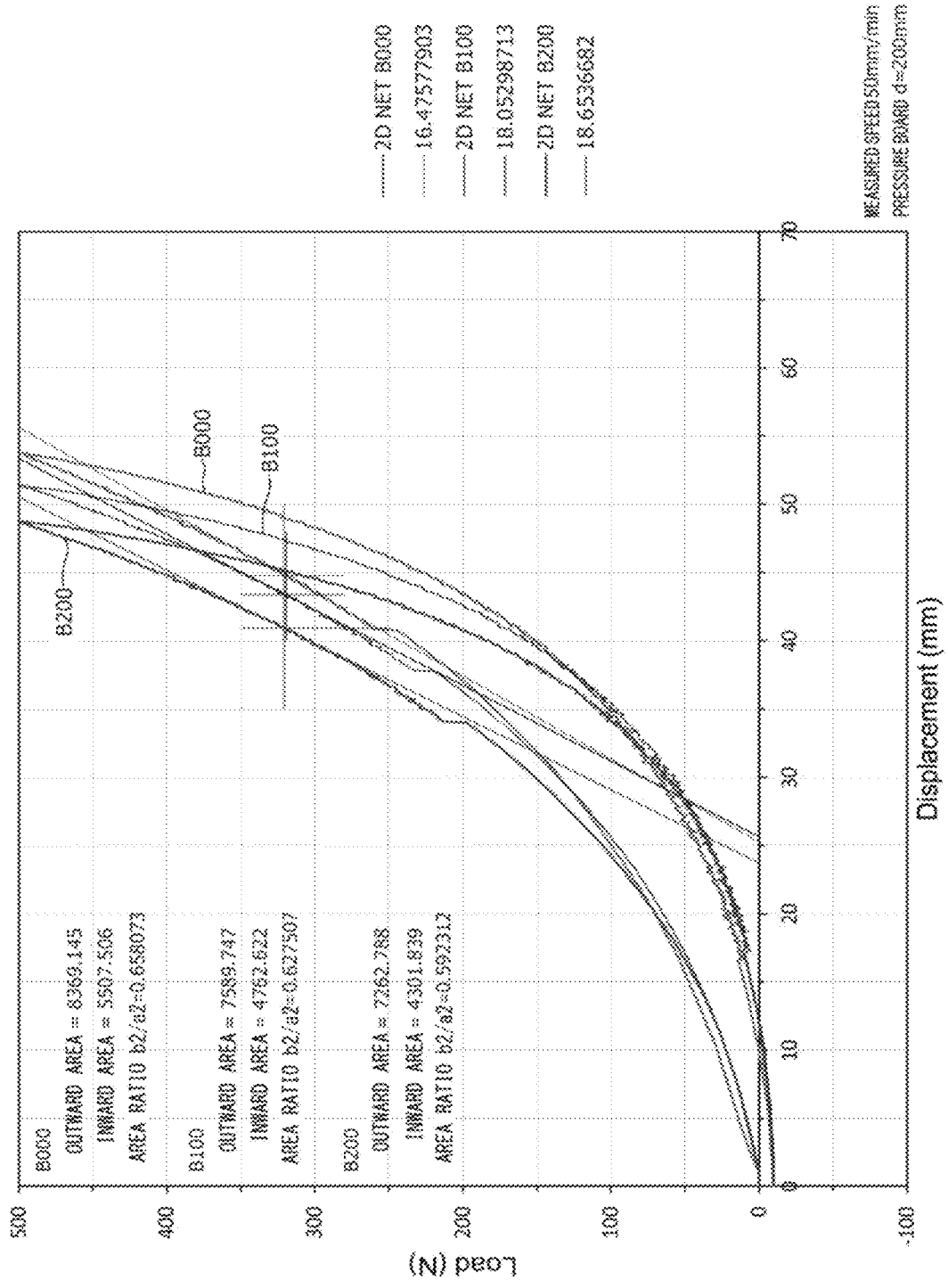
FIG. 17 is a chart illustrating a load-deflection characteristic of the seat back in Test example 2.
Figure 18:
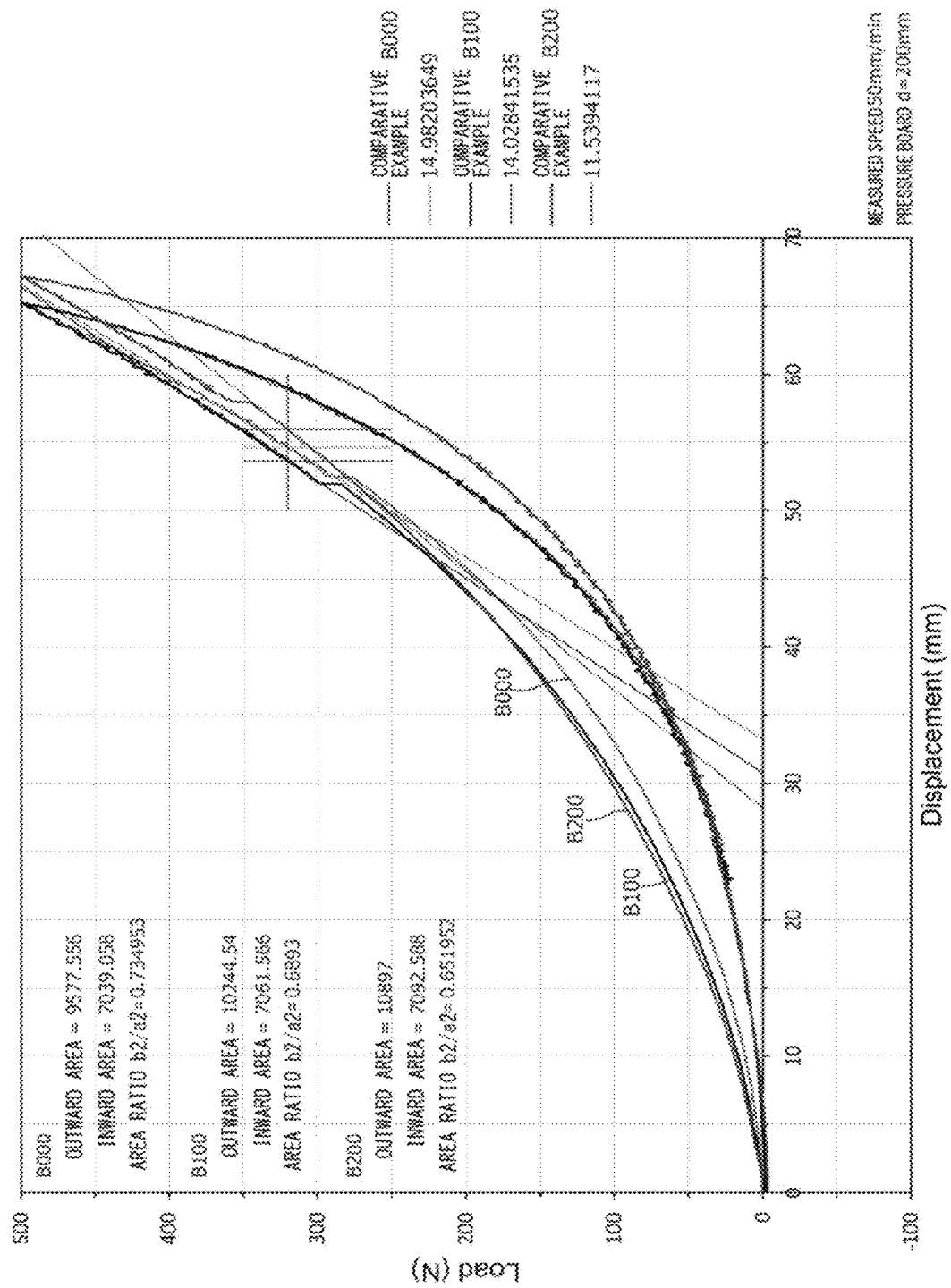
FIG. 18 is a chart illustrating a load-deflection characteristic of the seat back in the comparative example.

Positions in each of which the load-deflection characteristic of the seat back 200 is measured are a central position in a height direction of the lumbar support fabric 2221 (a position about 100 mm upward from an intersection of the seat cushion 100 and the seat back 200: B000), a measuring point 100 mm upward from B000 (B100), and a measuring point 100 mm further upward from B100 (B200). Each of the measuring points of B000, B100, and B200 was aligned with the center of the pressure board having a diameter of 200 mm in the middle position in the width direction of the seat back 200, and pressurized under the aforesaid conditions in a thickness direction (front-rear direction) of the seat back 200 to perform measurement. Then, FIG. 16 to FIG. 18 illustrate measured results each indicating the load-deflection characteristic at the measuring points of B000, B100, and B200 in Test example 1, Test example 2, and the comparative example, in each of which ratios of the outward areas (a2) and inward areas (b2) at the measuring points are found, and an average value of them is adopted in FIG. 12 to be set as the load characteristic area ratio of the seat back 200 (b2/a2).

As illustrated in FIG. 12, both Test example 1 and Test example 2 have a relationship of (b1/a1)>(b2/a2). That is, the seat cushion 100 is larger in the aforesaid area ratio than the seat back 200, and the seat cushion 100 has a structure in which greater importance is given to a spring characteristic as compared with the seat back 200. This is because the seat cushion base layer 120 is configured to dispose the plurality of coil springs 1220, 1220 near the middle portion to bias the both-side base support parts 1210, 1210 in the middle direction. On the other hand, the seat back 200 has a structure with a relatively high damping characteristic, and has high dispersibility of a body pressure. However, near the lumbar region, due to elasticity of the lumbar coil springs 2222 of the lumbar support 2220, the spring characteristic becomes relatively high in the seat back 200. This makes it possible to increase a sense of unity with the vehicle seat 1A, avoid a resonant frequency rising to a visceral resonant frequency, and enhance a vibration absorption characteristic, resulting in suppressing swing of a head, and reducing harshness felt on buttocks, in a range from seated person's buttocks to his/her lumbar region, by synergistic action with a high spring characteristic of the seat cushion 100.

Further, due to a high damping characteristic of the seat back 200, in particular, support pressure and binding force on the seated person are not high near a chest in a portion upward than the lumbar support 2220. That does not prevent movement of a central portion of the trunk accompanying breathing in a range from a pelvis to the chest. Accordingly, the seat back has high followability to slight movement accompanying breathing from the pelvis to the chest, which allows easy breathing to be stimulated.

That is, in this embodiment, the spring characteristic in which the coil springs 1220, 1220 in the seat cushion 100 are centered, the suppression of the bad posture in the left-right direction due to coupling and support of the outer portions 1211c, 1211c of the base support parts 1210, 1210 (support fabrics 1211, 1211) to the cushion frame 110, a low binding ability near the chest in the seat back 200, and the like make it possible to maintain a stable seating posture, and also make easy breathing likely to be secured.

In contrast with this, in the vehicle seat in the comparative example, two load characteristic area ratios are almost equal to each other. There is a somewhat inverse relationship of (b1/a1)<(b2/a2) to those in Test examples 1, 2. That is, the vehicle seat has a configuration to have a small difference in characteristics between the seat cushion and the seat back, or to give greater importance to the spring characteristic of the seat back. Therefore, the vehicle seat can be said to have a structure in which the damping characteristic in the seat back is not sufficient to make support for a seated person's back unstable and likely to swing, and further, a stroke of the seat back is large to make the seated person likely to slightly stoop.

Further, in a case of comparing Test example 1 and Test example 2, from FIG. 16 and FIG. 17, a hysteresis loss in Test example 1 of adopting the three-dimensional knitted fabric is larger than that in Test example 2 of adopting the two-dimensional fabric, and a spring constant at a balanced point at B200 in a position more upward than the lumbar support 2220 is lower in Test example 1. Therefore, in Test example 2, supportability for the whole of the seated person's back can be said to be higher, and in the case of Test example 1, vibration absorbency and body pressure dispersibility can be said to be more excellent.

In order to further increase the aforesaid action of this embodiment, by adjustment of the elastic force or the disposition number of the coil springs 1220, 1220 to the seat cushion cushioning layer 130, or the like, the load characteristic area ratios have the aforesaid relationship of (b1/a1)>(b2/a2), and a difference between them is preferably set to be 3% or more. Since too large difference between the load characteristic area ratios makes the spring characteristic of the seat cushion 100 too high, the difference between both the load characteristic area ratios is preferably in a range of 3 to 15%, and further, more preferably in a range of 5 to 10%.

Further, as illustrated in FIG. 16 and FIG. 17, spring constants of the load-deflection characteristic of the seat back 200 are preferably each 15000 N/m or more, as the spring constants at a balanced point (320 N in cases in FIG. 16 and FIG. 17) on outward curves, and further, more preferably each in a range of 15000 to 20000 N/m. As illustrated in FIG. 18, when the spring constants at a balanced point are below the aforesaid range, particularly, when the spring constant at the balanced point at B200 in the position more upward than the lumbar support 2220 is below the aforesaid range, support for an upper back region becomes insufficient, which makes the trunk likely to swing.

Figure 19:
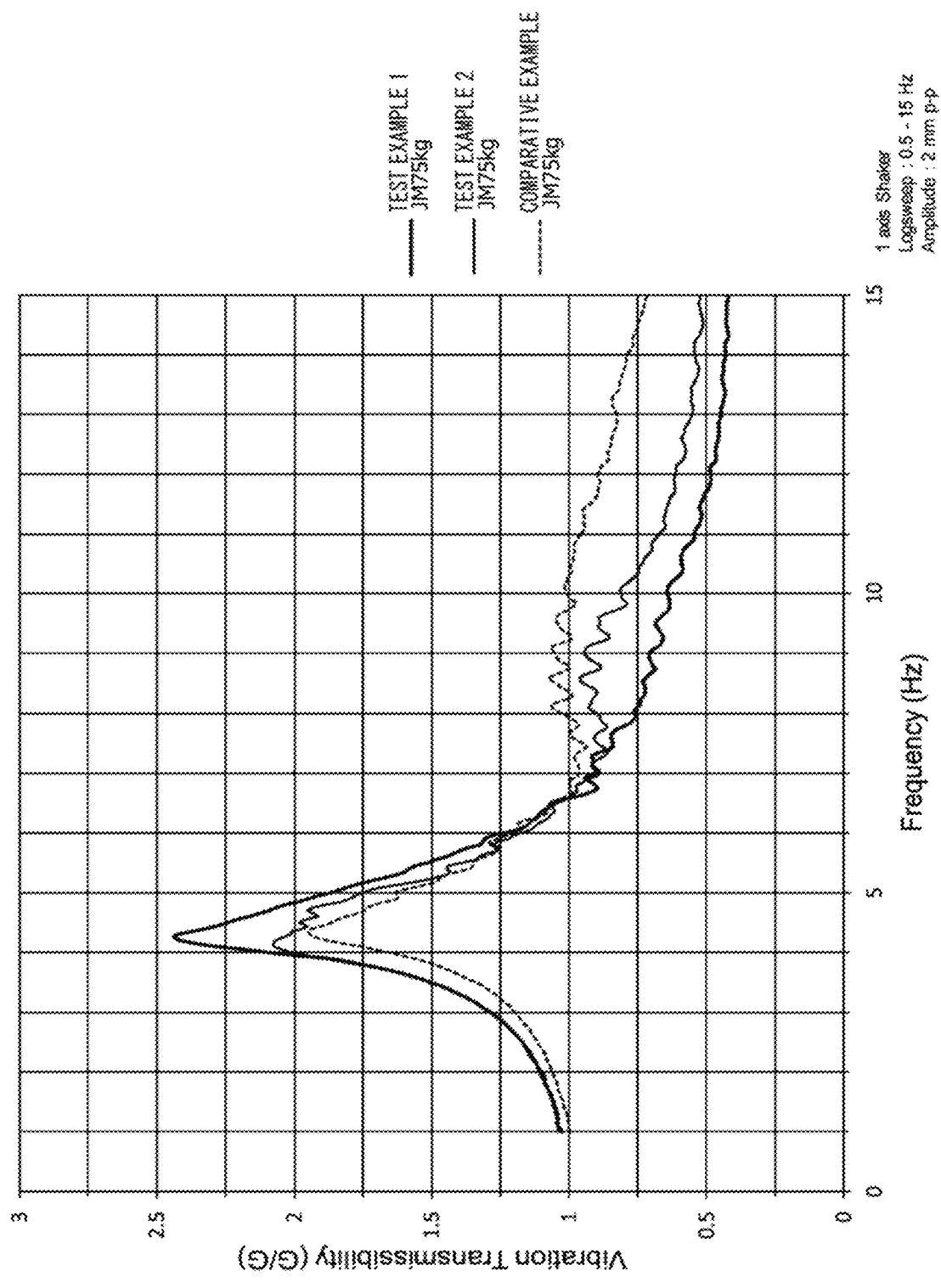
FIG. 19 is a chart illustrating measured results of vibration transmissibilities in Test example 1, Test example 2, and the comparative example.

FIG. 19 is a graph illustrating vibration transmissibilities when the vehicle seats 1A in Test example 1 and Test example 2 and the vehicle seat in the comparative example are set on a 1-axis shaker and shaken with a peak-to-peak amplitude of 2 mm at a log sweep: 0.5 to 15 Hz in a state of seating a subject with a weight of 75 kg.

As illustrated in FIG. 19, resonant frequencies in both Test example 1 and Test example 2 are lower than that in the comparative example. Further, any of the resonant frequencies is less than 5 Hz, and lower than a visceral resonant frequency, and moreover, in a high-frequency range of 7 Hz or more, in both Test example 1 and Test example 2, the vibration transmissibilities are each 1 or less, which indicates more excellence in point of a vibration transmission characteristic than the comparative example.

Second Embodiment

Figure 20:
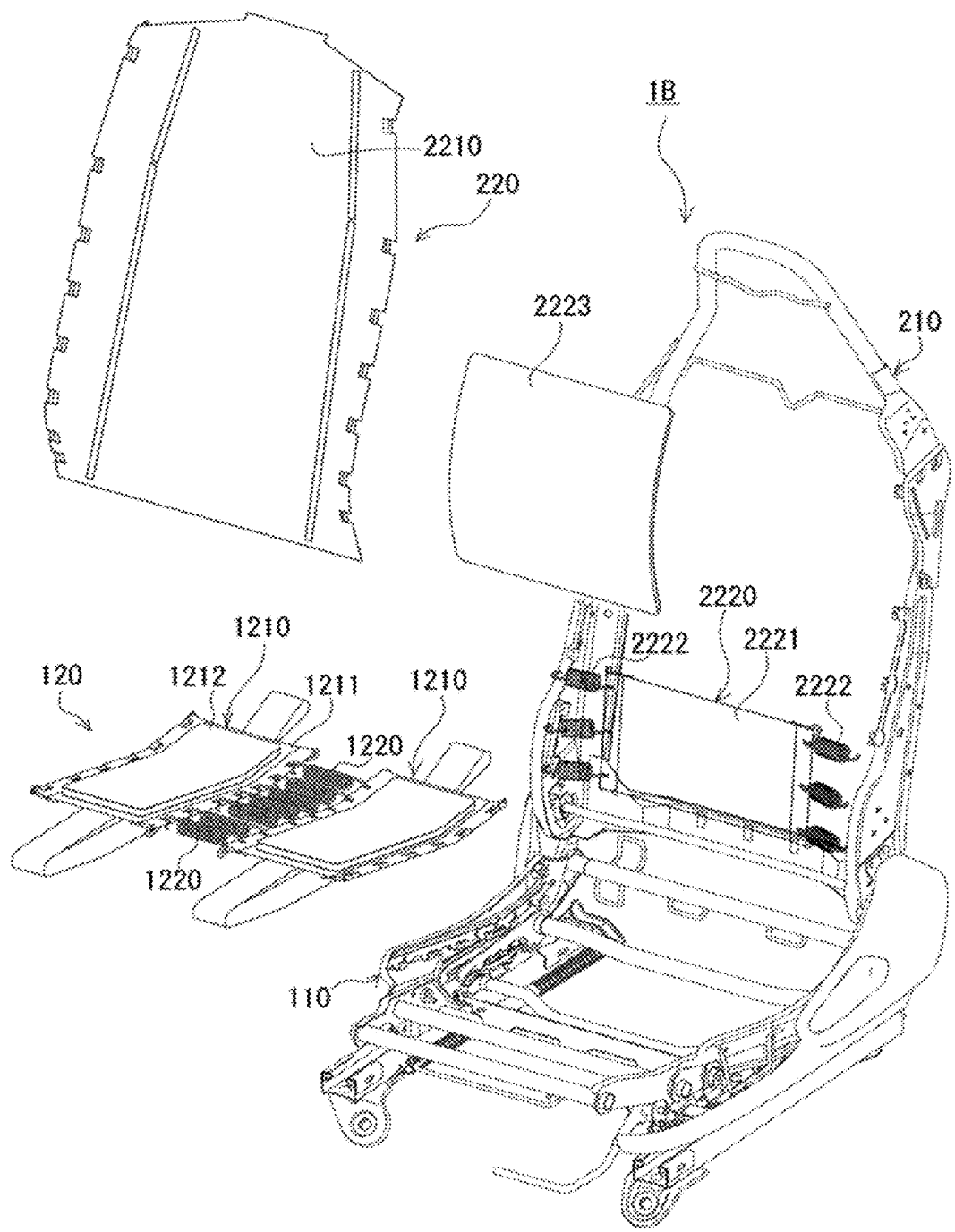
FIG. 20 is an exploded perspective view of substantial parts of a vehicle seat according to a second embodiment of the present invention.

FIG. 20 is an exploded perspective view in which a seat cushion cushioning layer 130 and a seat back cushioning layer 230 of a vehicle seat 1B according to a second embodiment of the present invention are omitted. In the second embodiment, a lumbar support 2220 includes a lumbar flat support member 2223 in addition to a lumbar support fabric 2221 and lumbar coil springs 2222 similar to those of the first embodiment. The lumbar flat support member 2223 is formed of synthetic resin such as a polypropylene resin in a thin plate shape with a predetermined area having a length equal to or shorter than that to a substantially middle portion in a longitudinal direction (up-down direction) in a seat back base fabric 2210 and a width fitting between left-right back-side side frames 211, 211. Further, the vicinity of the substantially middle portion in the up-down direction is slightly curved so as to expand forward, resulting in a shape fitted to the vicinity of a seated person's lumbar region.

The lumbar flat support member 2223 is disposed between the seat back base fabric 2210 and the lumbar support fabric 2221. Accordingly, by the action of restoring force of the lumbar coil springs 2222, the lumbar support fabric 2221 is biased forward, and thus the lumbar flat support member 2223 located in the front thereof is also biased forward. Since the lumbar flat support member 2223 is formed of synthetic resin as described above, has higher stiffness and a larger area than those of the lumbar support fabric 2221, and moreover, is formed in a slightly curved shape, it is fitted to the vicinity of the seated person's lumbar region to provide secure support. This further increases a sense of unity between a range from seated person's buttocks to his/her lumbar region and the vehicle seat 1B, and allows the vibration absorption characteristic to be enhanced. Note that the other configuration, action, and effect are exactly the same as those of the first embodiment.

Third Embodiment

FIG. 21 to FIG. 31 are views each for explaining a vehicle seat 1C according to a third embodiment of the present invention. In the third embodiment, the vehicle seat 1C has a configuration similar to that of the second embodiment in point of having a lumbar flat support member 2223, but a specific structure of the lumbar flat support member 2223 is different from that of the second embodiment. Further, a specific structure of each of buffer members 1212 constituting base support parts 1210 of a seat cushion base layer 120 is also different from those of the first and second embodiments. The other configuration is the same as those of the first and second embodiments.

The buffer members 1212 constituting the base support parts 1210 are each configured to have an outer pad member 1212a, an inner pad member 1212b, and cover members 1212c as illustrated in FIGS. 27(a), (b). The outer pad member 1212a is formed in a substantially rectangular frame shape, and the inner pad member 1212b substantially rectangular in a plane view is disposed in an inner space thereof. The cover members 1212c are composed by using, for example, two plastic films, and after disposing the inner pad member 1212b in the outer pad member 1212a, they cover a front surface and a back surface of the inner pad member 1212b and are disposed by adhering to a front surface and a back surface of the outer pad member 1212a respectively.

The outer pad member 1212a is preferably composed of, for example, a bead foam formed in a plate shape. In the case of being composed of the bead foam, it is preferably formed in a range of an expansion ratio of 25 to 50 times and in a thickness equal to or less than an average diameter of beads. For example, in a case where an average diameter of 30-time foamed beads is about 4 to 6 mm, the bead foam is preferably sliced in a thickness of about 3 to 5 mm. This imparts soft elasticity to the outer pad member 1212a, which becomes likely to vibrate, for example, also with respect to microvibrations due to seated person's biosignals.

The inner pad member 1212b is composed by using a three-dimensional fabric, preferably the aforesaid three-dimensional knitted fabric. Further, as the inner pad member 1212b, the one having a thickness slightly larger than that of the outer pad member 1212a is preferably used, and the cover members 1212c preferably cover the surfaces of the inner pad member 1212b so as to come into close contact therewith. This makes the microvibrations such as the biosignals transmitted through the cover members 1212c likely to resonate yarn and fiber of the three-dimensional knitted fabric composing the inner pad member 1212b. Further, the outer pad member 1212a is also sliced in such a thickness as described above to be imparted the soft elasticity to, thereby easily amplifying the microvibrations. Accordingly, by disposing a not illustrated sensor (a microphone sensor or the like) between the three-dimensional knitted fabric being the inner pad member 1212b and the cover member 1212c, the buffer member 1212 of this embodiment has a configuration similar to that of a biosignal detection device disclosed in Japanese Patent Application Laid-open No 2011-152242 by the present applicant, and can capture the biosignals transmitted through seated person's buttocks to provide them for an analysis of a seated person's biological state.

Figure 25:
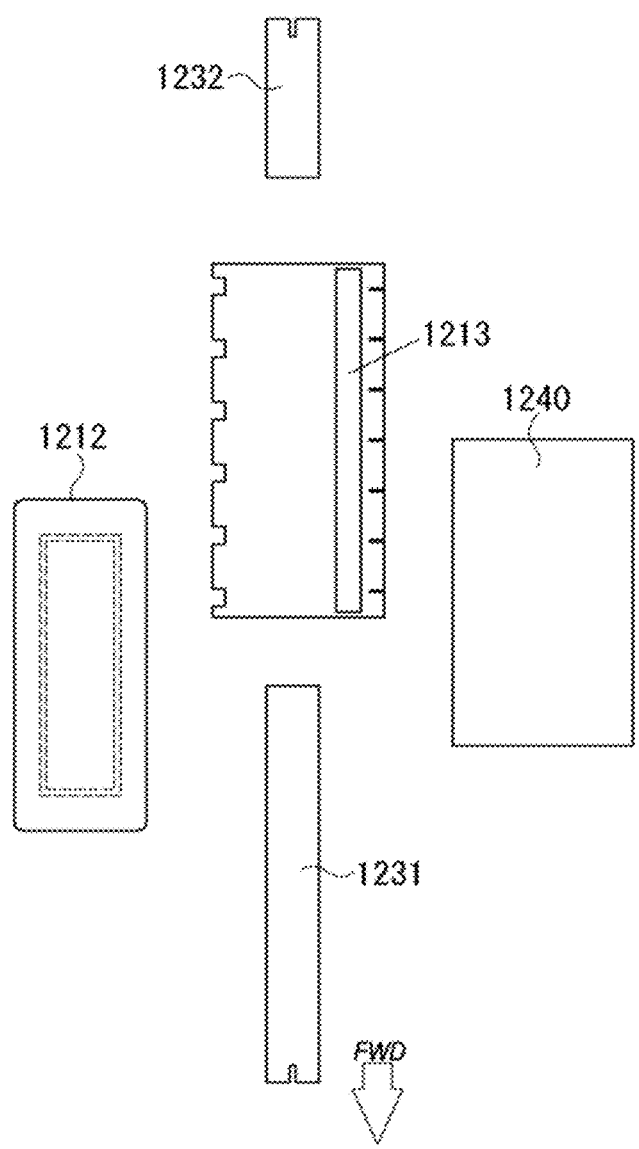
FIG. 25 is a view for explaining a configuration of a buffer member of the seat cushion base layer.

The buffer member 1212 can be fixed to a support fabric 1211 through, for example, a surface fastener 1213 (refer to FIG. 24(b), FIG. 25). The surface fastener 1213 is formed from paired hook side and loop side, and used by attaching one to a facing surface of the buffer member 1212 and attaching the other to a facing surface of the support fabric 1211. A fixing means is not limited to this, and sewing, adhesion, or the like can also be adopted, but using the surface fastener 1213 allows an attachment position of the buffer member 1212 to be fine adjusted front and rear and left and right. Note that a two-dimensional fabric or a three-dimensional fabric can be used as the support fabric 1211 similarly to the aforesaid first embodiment, and in a case of using the three-dimensional fabric such as the three-dimensional knitted fabric, as illustrated in FIGS. 29(a), (b), to both side portions of the support fabric 1211 composed of the three-dimensional knitted fabric, a two-dimensional fabric 12111 having cuts 12111a and a two-dimensional fabric 12112 having cut-out portions 12112a are attached and disposed by sewing or the like respectively.

Figure 21:
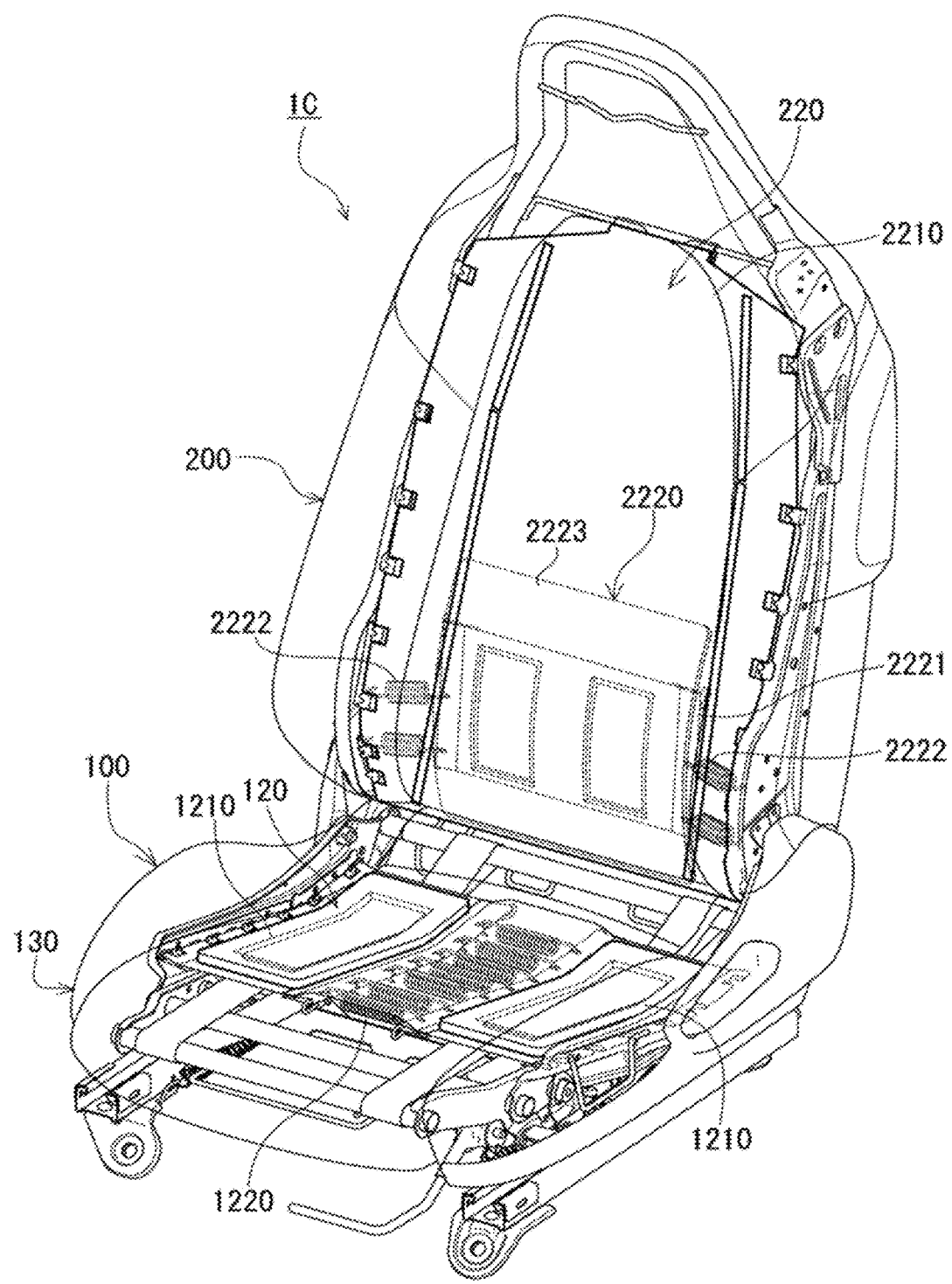
FIG. 21 is a perspective view illustrating a vehicle seat according to a third embodiment of the present invention.
Figure 22:
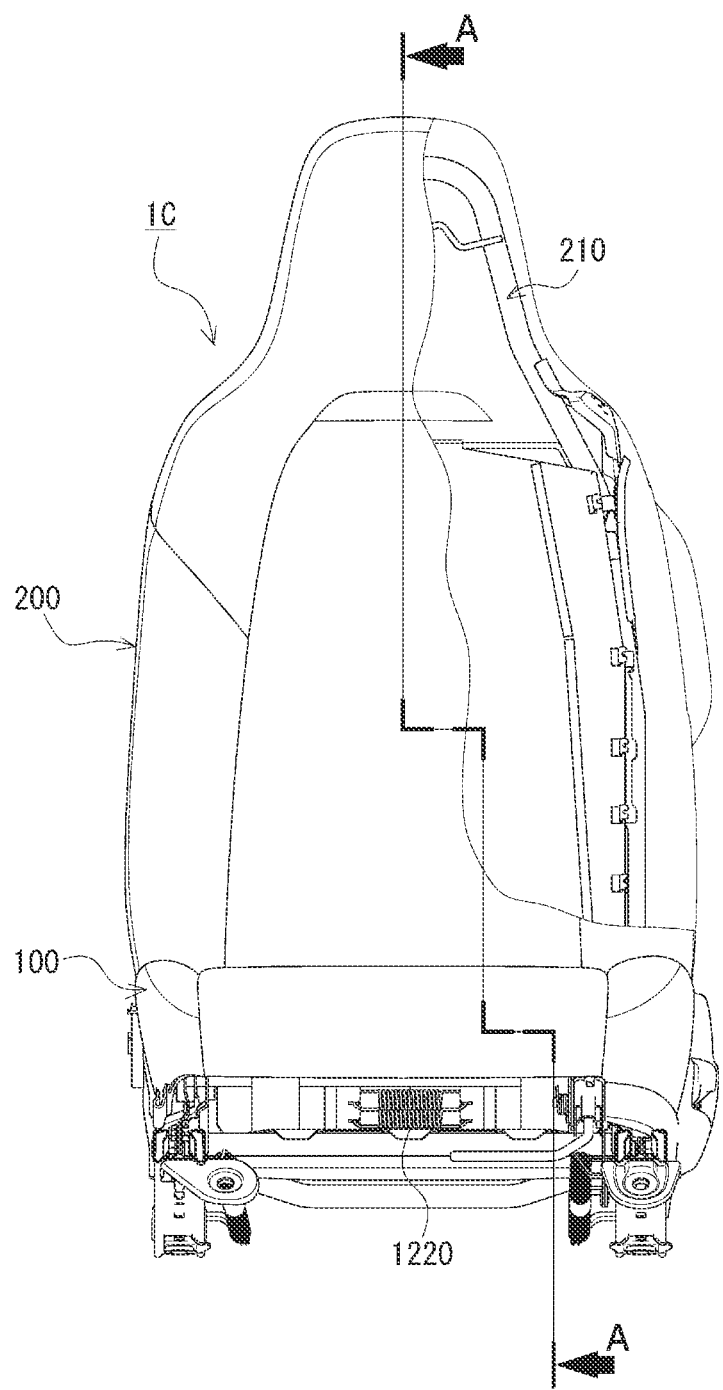
FIG. 22 is a front view of FIG. 21.
Figure 26:
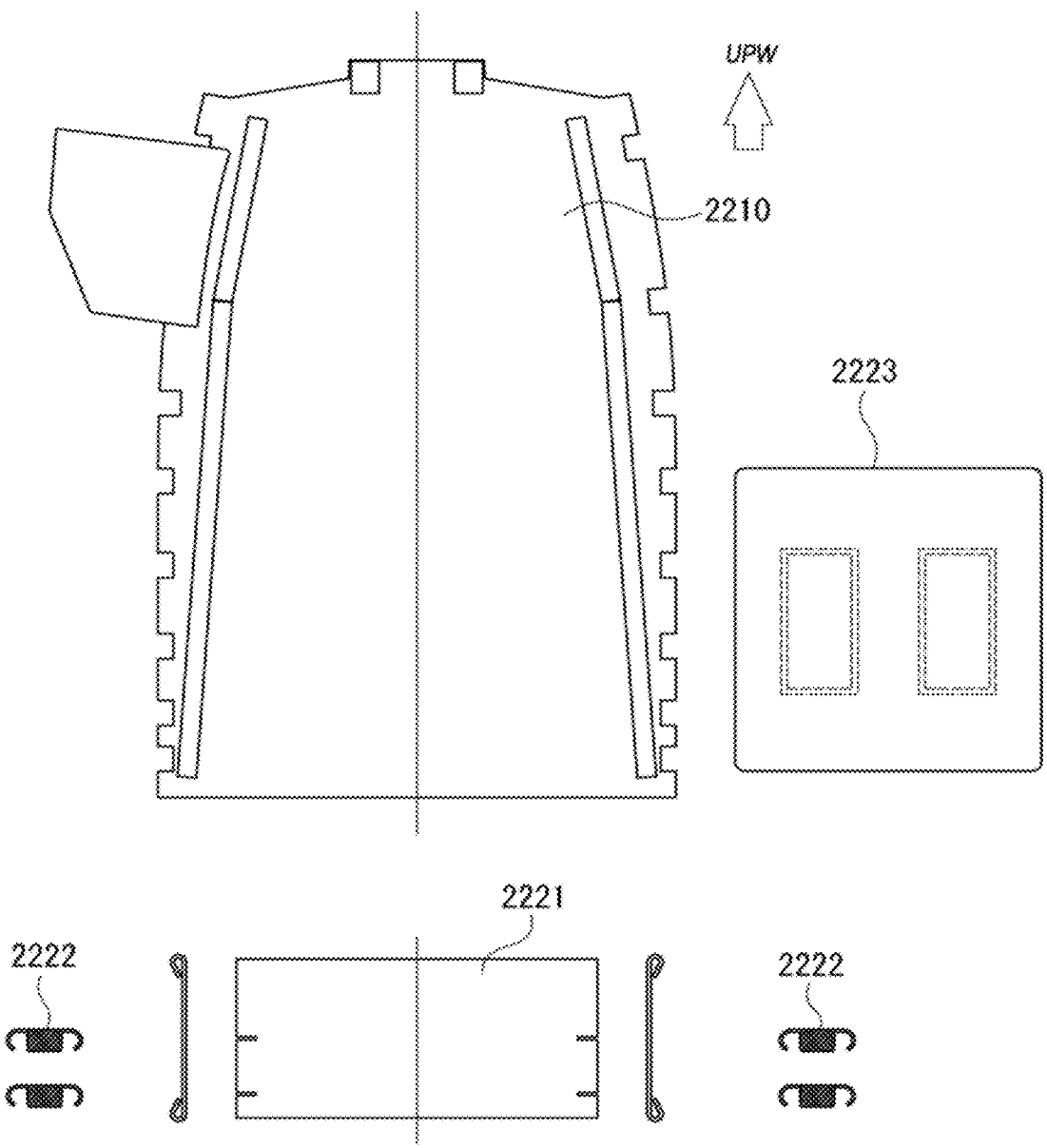
FIG. 26 is a view for explaining a configuration of a seat back base layer.
Figure 27:
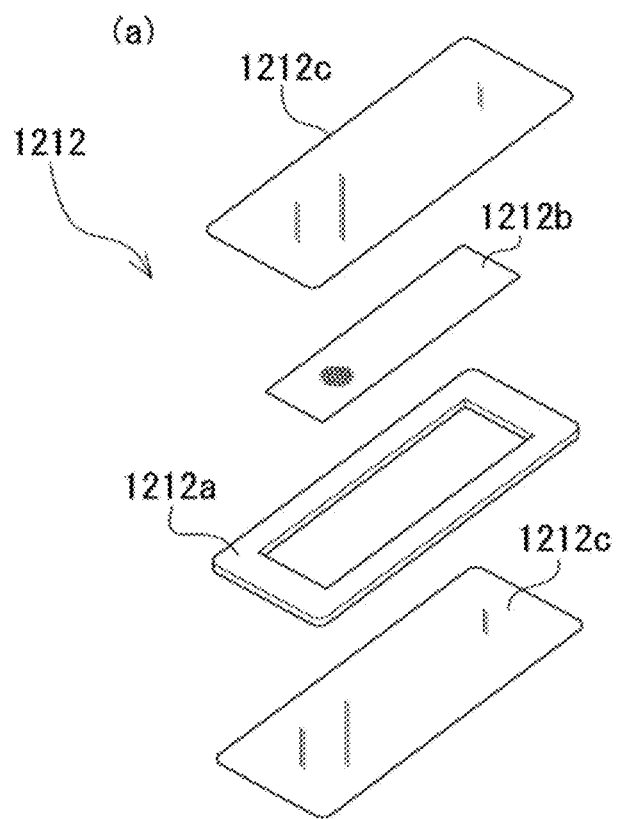
FIG. 27($a$) is an exploded perspective view of the buffer member, and FIG. 27($b$) is a transverse sectional view at the middle in a longitudinal direction of the buffer member.
Figure 27:
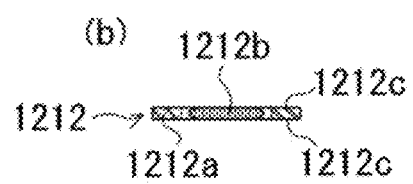
Figure 28:
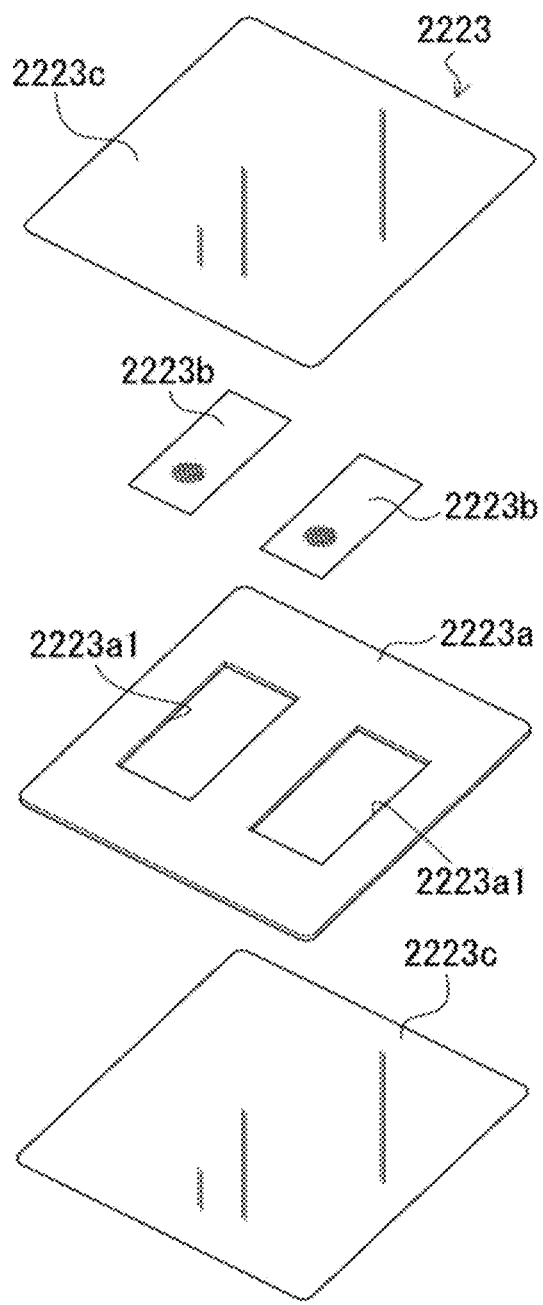
FIG. 28 is an exploded perspective view of a lumbar flat support member.
Figure 29:
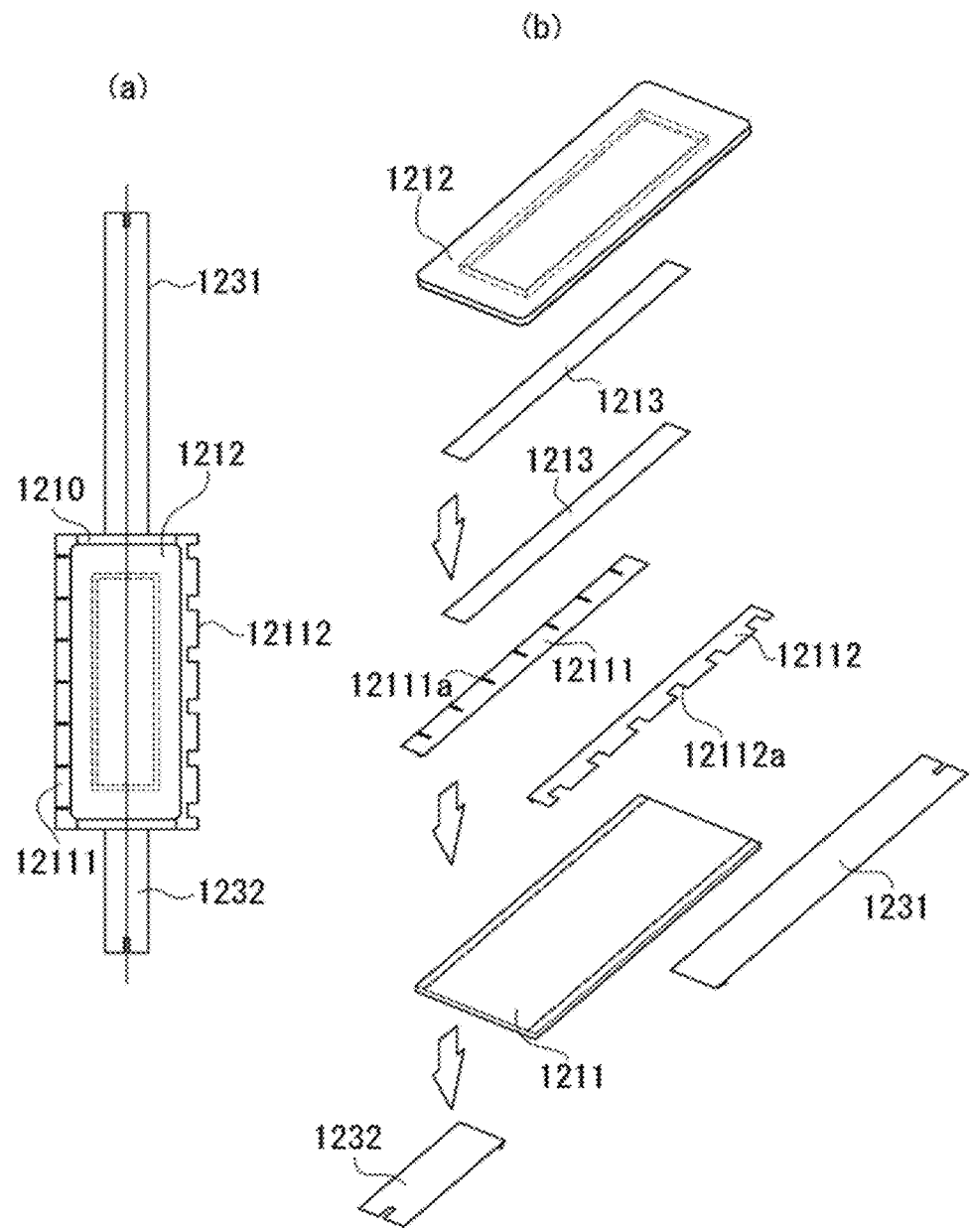
FIGS. 29($a$), ($b$) are views for explaining an example of using a three-dimensional knitted fabric as a support fabric of the seat cushion base layer.

The lumbar flat support member 2223 of this embodiment has a plate-shaped lumbar bead foam 2223a with a predetermined area having a length equal to or shorter than that up to a substantially middle portion in the longitudinal direction (up-down direction) in the seat back base fabric 2210 and a width fitting between the left-right back-side side frames 211, 211. As illustrated in FIG. 21, FIG. 26, and FIG. 28, through the lumbar bead foam 2223a, two substantially rectangular hole portions 2223a1 are formed close to its both sides with the middle in a width direction interposed therebetween, and three-dimensional knitted fabrics 2223b are disposed in the hole portions respectively. Further, cover members 2223c composed of plastic films cover a front surface and a back surface of each of the three-dimensional knitted fabrics 2223b and are made to adhere to a front surface and a back surface of the lumbar bead foam 2223a. A configuration of the lumbar flat support member 2223 is the same as a configuration of each of the buffer members 1212 used in a seat cushion 100 except a size and the disposition number of three-dimensional knitted fabrics, and preferable examples of the lumbar bead foam 2223a, the three-dimensional knitted fabrics 2223b, and the cover members 2223c are similar to those of the bead foam composing the aforesaid outer pad member 1212a, the three-dimensional knitted fabric composing the inner pad member 1212b, and the plastic films composing the cover members 1212c. By disposing a not illustrated sensor (microphone sensor) between the two cover members 2223c, biosignals can be captured from a seated person's back.

Figure 23:
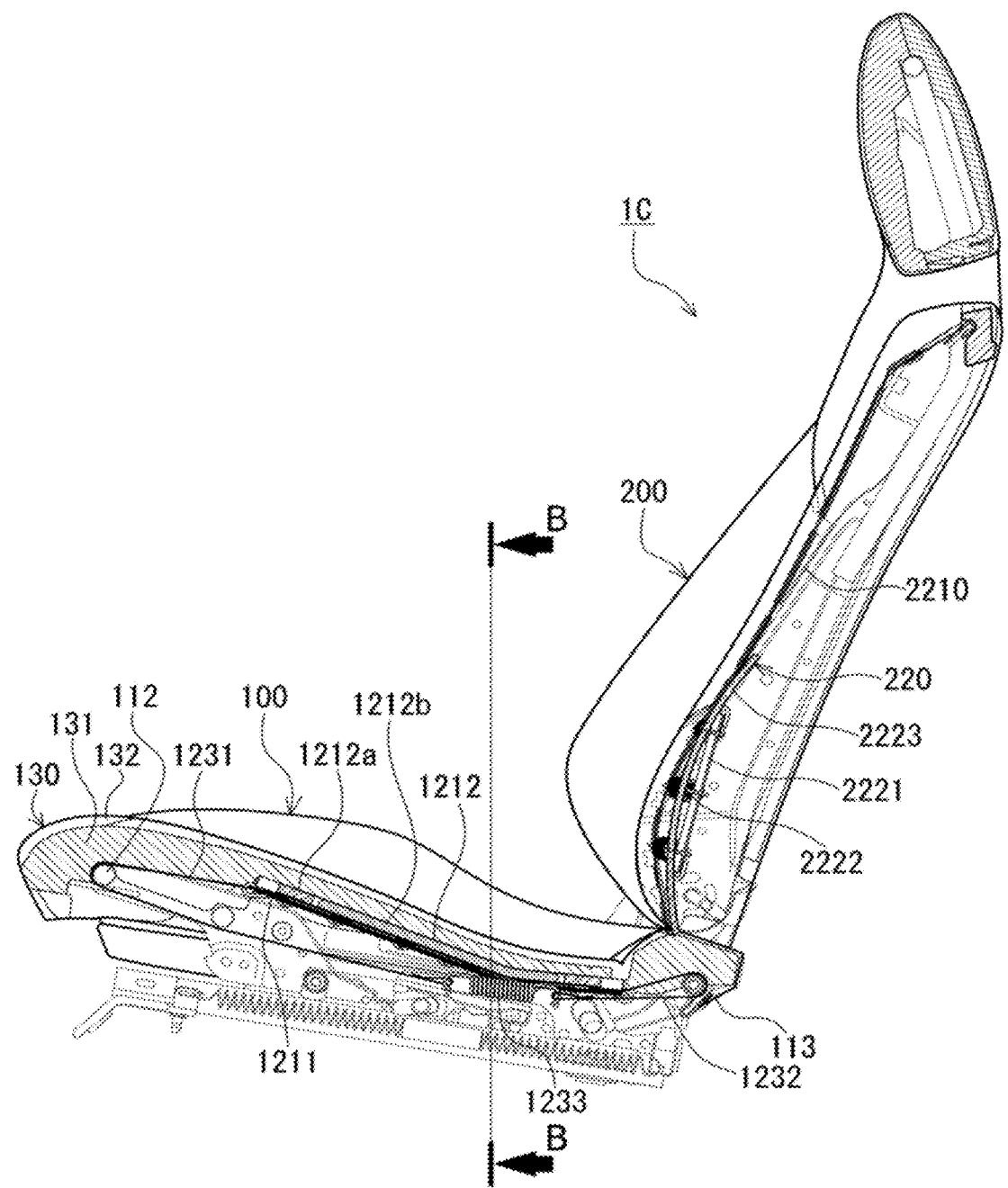
FIG. 23 is an A-A line sectional view of FIG. 21.
Figure 24:
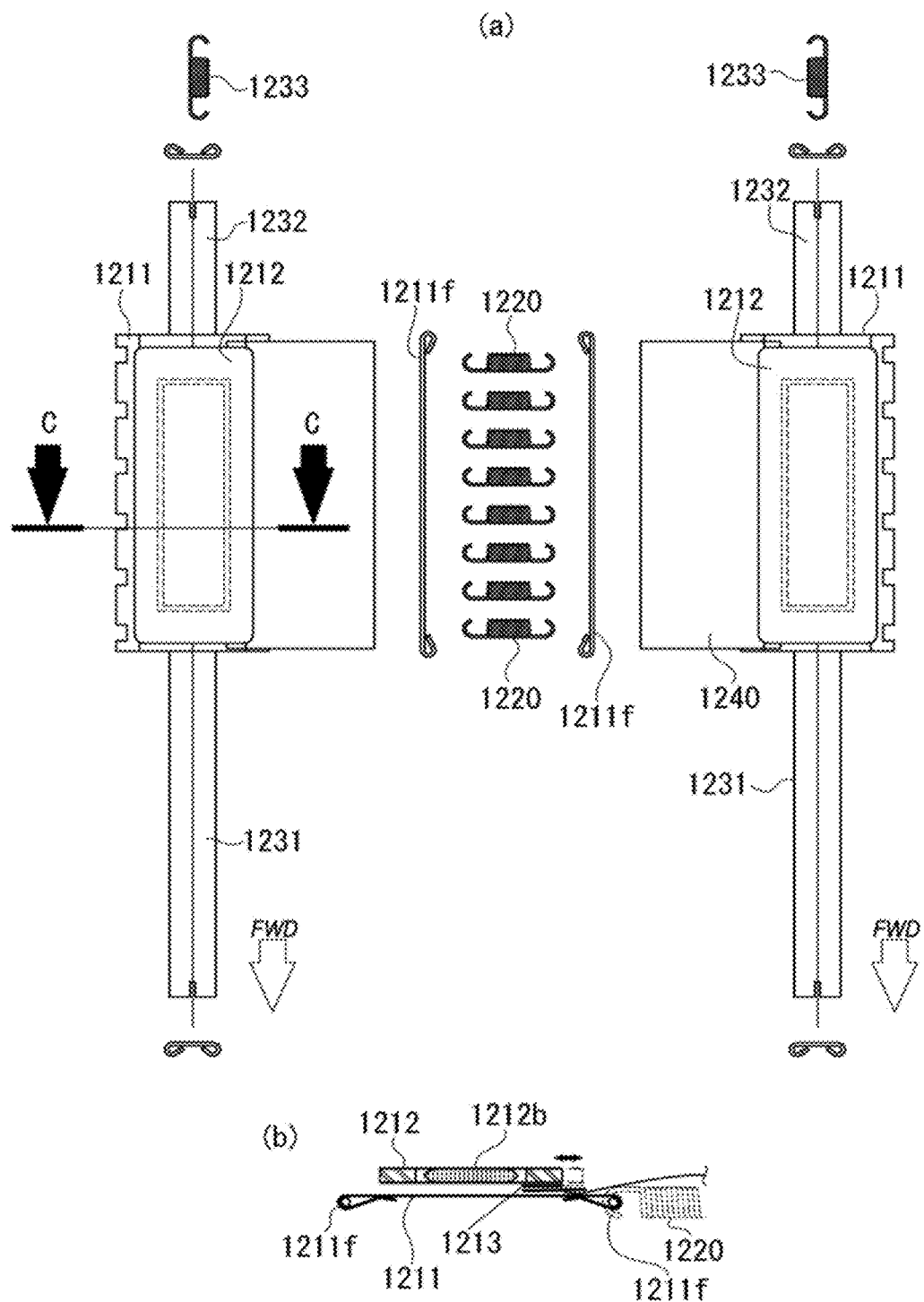
FIG. 24($a$) is a view for explaining a configuration of a seat cushion base layer, and FIG. 24($b$) is a C-C line sectional view of FIG. 24($a$).

The lumbar flat support member 2223 is disposed between the seat back base fabric 2210 and the lumbar support fabric 2221 (refer to FIG. 21 and FIG. 23). Accordingly, by the action of restoring force of the lumbar coil springs 2222, the lumbar support fabric 2221 is biased forward, and thus the lumbar flat support member 2223 located in the front thereof is also biased forward. The vicinity of a seated person's lumbar region is thereby supported by a predetermined support pressure. This point is similar to that of the aforesaid second embodiment, and in this embodiment, moreover, similarly to the buffer members 1212 used in the seat cushion 100, having the lumbar bead foam 2223a and the three-dimensional knitted fabrics 2223a thus results in having a characteristic similar to a load characteristic of human muscle as described above, which enables an increase in fit feeling, improvement in posture supportability, or the like. Note that in a case of using a three-dimensional fabric such as the three-dimensional knitted fabric as the seat back base fabric 2210, similarly to the aforesaid first embodiment, two-dimensional fabrics 22121, 22122 are attached to side edge portions by sewing or the like, and through them, the seat back base fabric 2210 is engaged in the left-right back-side side frames 211, 211 (refer to FIG. 9).

Figure 30:
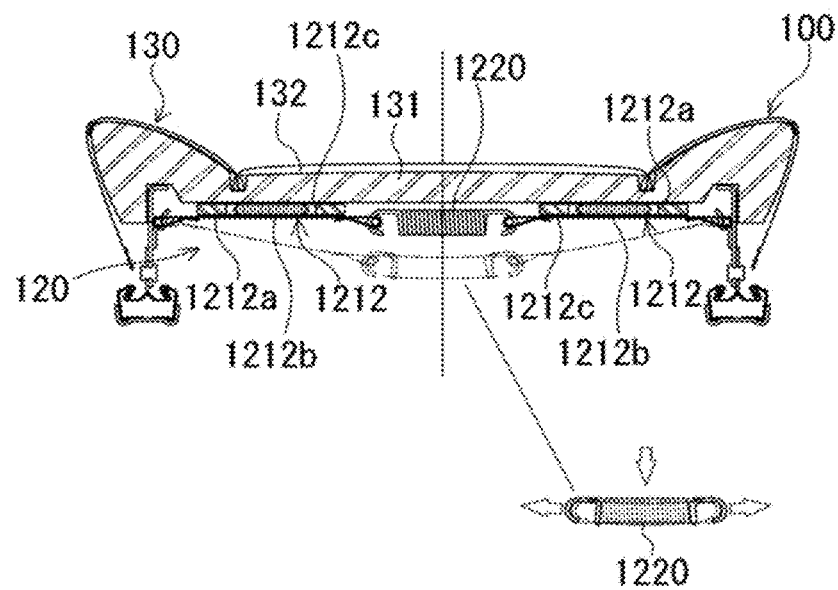
FIG. 30 is a B-B line sectional view of FIG. 23.
Figure 31:
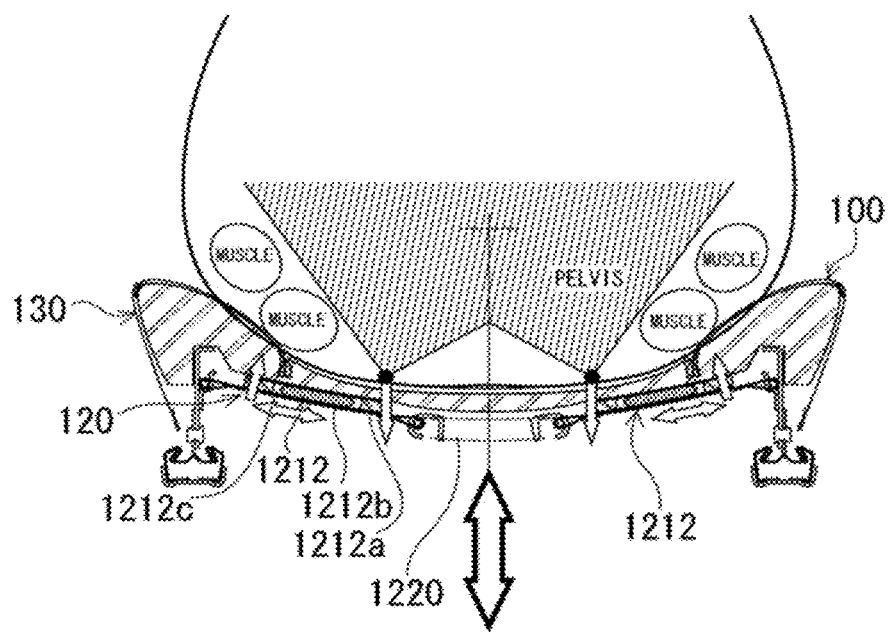
FIG. 31 is a view for explaining the action of the seat cushion base layer.

Further, as illustrated in FIG. 30, application of a seated person's load also in the third embodiment displaces the coil springs 1220, 1220 downward and draws the left-right buffer members 1212, 1212 in the center direction, whereby restoring force acts on the coil springs 1220, 1220. However, in the third embodiment, as illustrated in FIG. 31, in each of the buffer members 1212, 1212, not only the inner pad member 1212b composed of the three-dimensional knitted fabric but also the outer pad member 1212a composed of the bead foam therearound is disposed, and they are integrated by the upper and lower cover members 1212c, 1212c, and moreover an air layer is formed between the upper and lower cover members 1212c, 1212c. This causes a buffering function owing to the air layer in addition to a characteristic of the three-dimensional knitted fabric approximating human muscle to act, resulting in allowing a load applied with ischial tuberosities centered to be dispersed and relieved more efficiently than those of the aforesaid embodiments. Further, since the outer pad member 1212a is composed of the bead foam, thereby supporting the seated person's buttocks are supported on a hard stiffness surface of the bead foam, it is possible to suppress conveyance of a feeling of something foreign of the coil springs 1220, 1220 disposed in the middle portion to the seated person.

Further, as illustrated in FIG. 23, FIG. 24, FIG. 30, FIG. 31 and so on, the left-right base support parts 1210, 1210, in which outer portions 1211c, 1211c of the support fabrics 1211, 1211 are engaged and supported by left-right cushion-side side frames 111, 111, are supported by a front edge frame 112 and the rear edge frame 113 with front band-shaped members 1231 and rear band-shaped members 1232. Accordingly, a seated person's weight is put on a cushion frame 110 as reaction force, and acceleration to return to the seated person is reduced by an opposite phase to a high-frequency input in a balance between spring force and friction force with respect to a distributed load. That is, with connecting elastic members 1233 composed of coil springs coupling the front band-shaped members 1231 and the rear band-shaped members 1232, and a plurality of coil springs 1220, 1220 coupling the left-right support fabrics 1211, 1211 with each other and disposed near the middle in the width direction to be displaceable also in the up-down direction, the spring force acts also on any input in the front-rear direction, the left-right direction, and the up-down direction. Further, on the support fabric 1211, the outer pad member 1212a, the inner pad member 1212b, the cover members 1212c, and so on are stacked as the buffer member 1212, and vibrations cause even slight displacement and the friction force causes damping also between them. The acceleration is reduced by the opposite phase to the high-frequency input by these spring force and friction force. On the other hand, a low-frequency input becomes energy for moving these support fabrics 1211, buffer members 1212, coil springs 1220, front band-shaped members 1231, rear band-shaped members 1232, connecting elastic members 1233, and so on being a tension structure supported by the cushion frame 110, and is converted to friction heat to be damped. Note that the above action is also similar to that in other embodiments, and the more the stack number of members constituting the tension structure, such as the support fabrics 1211, is increased, the stronger characteristic the vibration absorption characteristic becomes in damping.

Figure 32:
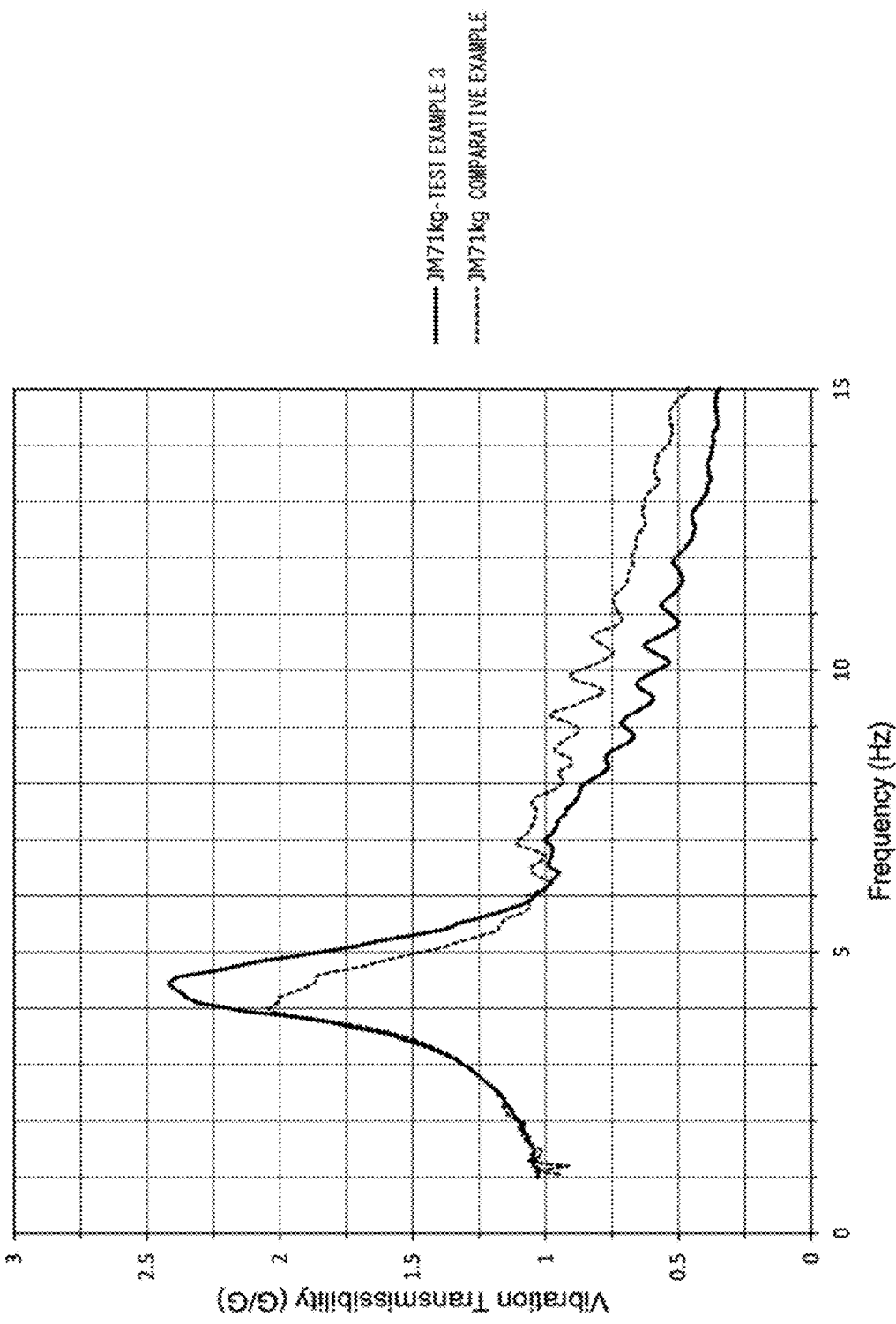
FIG. 32 is a chart illustrating measured results of vibration transmissibilities in Test example 3 and a comparative example.
Figure 33:
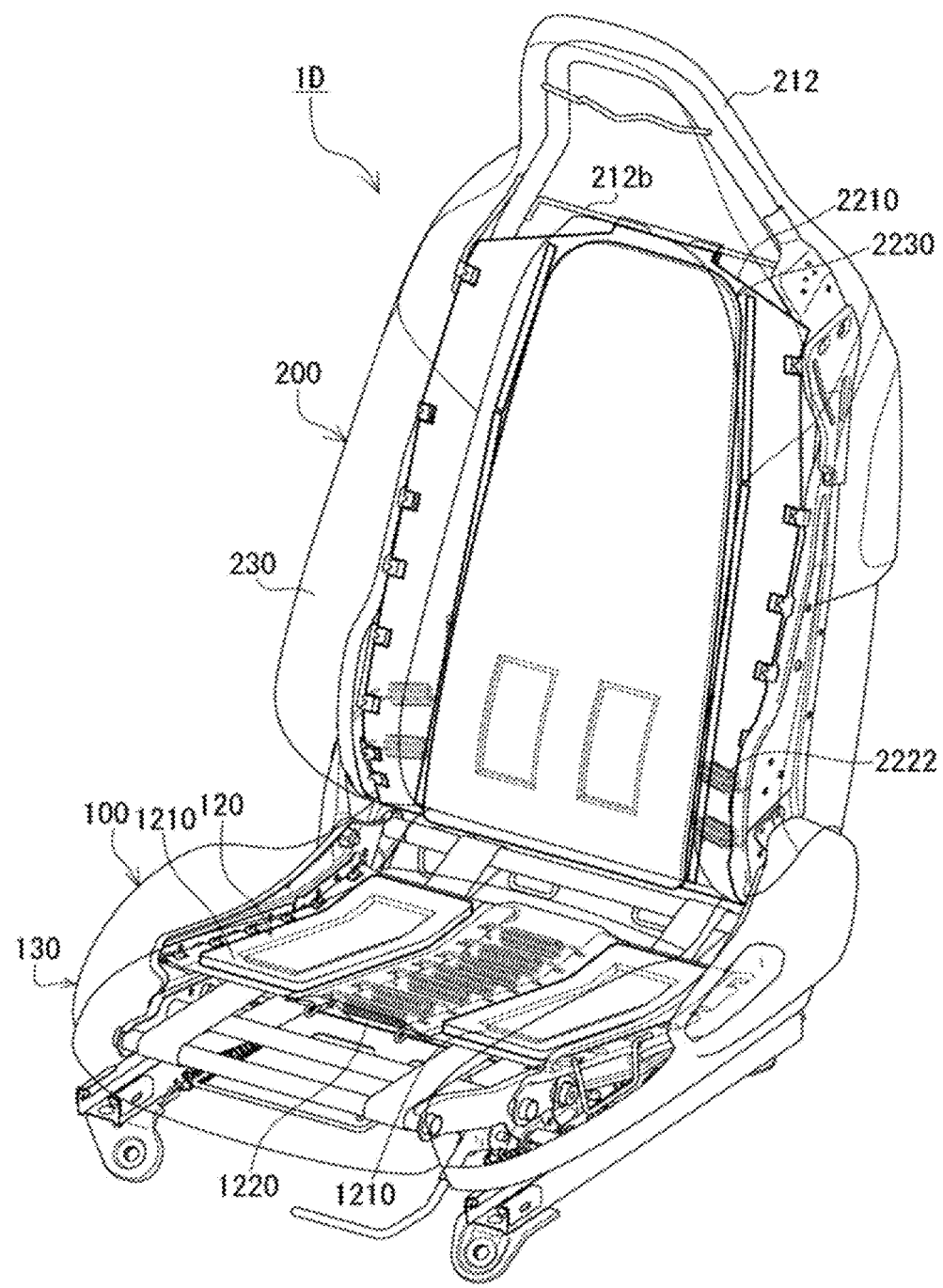
FIG. 33 is a perspective view illustrating a vehicle seat according to a fourth embodiment of the present invention.
Figure 34:
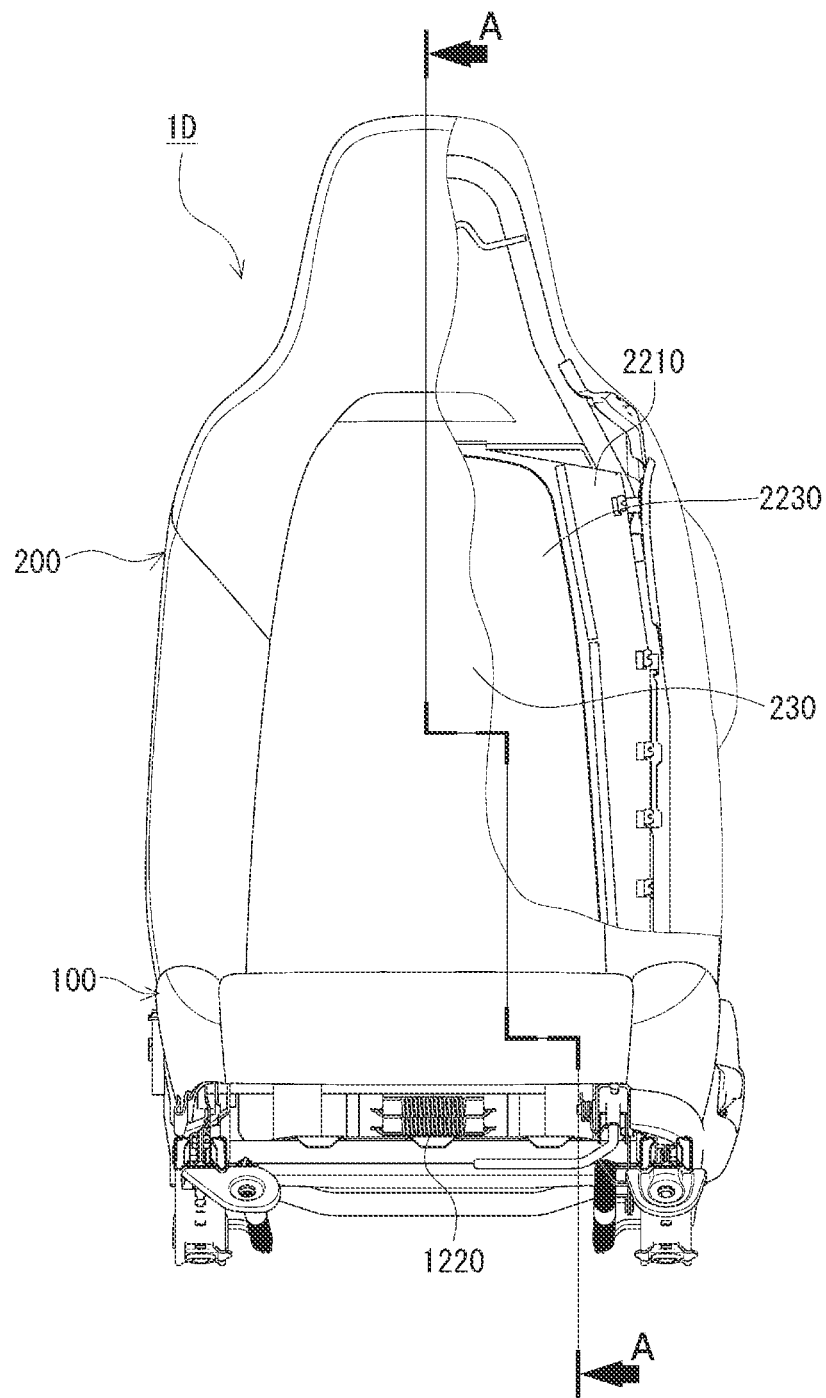
FIG. 34 is a front view of FIG. 33.

Next, vibration testing in which the vehicle seat 1C of the third embodiment (Test example 3) and the seat in the comparative example used in the aforesaid first embodiment were set on the 1-axis shaker and shaken with a peak-to-peak amplitude of 2 mm at a log sweep: 0.5 to 15 Hz in a state of seating a subject with a weight of 71 kg, was conducted. FIG. 32 is a graph illustrating the results.

As illustrated in FIG. 32, a resonant frequency in Test example 3 is lower than a visceral resonant frequency to be less than 5 Hz. This point is also similar to that in the comparative example, but in a high-frequency range of 7 Hz or more, the vibration transmissibility in Test example 3 is 1 or less, which indicates more excellence in point of a vibration transmission characteristic than that in the comparative example.

Fourth Example

FIG. 33 to FIG. 37 are views each for explaining a vehicle seat 1D according to a fourth embodiment of the present invention. In the fourth embodiment, a lumbar support 2220 has a structure in which the lumbar flat support member 2223 of the third embodiment is not adopted, namely is constituted of a lumbar support fabric 2221, and lumbar coil springs 2222 supporting the lumbar support fabric 2221 with a back frame 210. That is, the lumbar support 2220 of the fourth embodiment has the same structure as that of the lumbar support 2220 of the first embodiment. Further, the point where the seat back base fabric 2210 is supported by the back frame 210 so as to be located in the front of the lumbar support 2220 is also similar to that of the first embodiment.

However, in this embodiment, a seat back flat support member 2230 is newly disposed in the front of the seat back base fabric 2210 between a back cushioning layer 230 and the seat back base fabric 2210. The other structure except the aforesaid point is exactly the same as the structure of the vehicle seat 1C according to the third embodiment, and details thereof are omitted. Note that in FIG. 33 to FIG. 37, the same members as those of the third embodiment are denoted by the same marks.

The seat back flat support member 2230 adopted in this embodiment is configured to include the seat back base fabric 2210 and the lumbar support 2220. A length along an up-down direction of the seat back flat support member 2230 is almost the same as that of the seat back base fabric 2210, and has a length almost corresponding to a distance between a headrest auxiliary frame 212b and a lower frame 213. A width is formed in a smaller dimension than that of the seat back base fabric 2210 having a width corresponding to a distance between left-right back-side side frames 211, 211. That is, the seat back flat support member 2230 has an area covering a range from the vicinity of a boundary between a seat back 200 and a seat cushion 100 to the headrest auxiliary frame 212b located in a lower portion of the headrest frame 212, and widely supports a range from a seated person's pelvis to his/her upper back region including a range supported by the lumbar support 2220.

Figure 35:
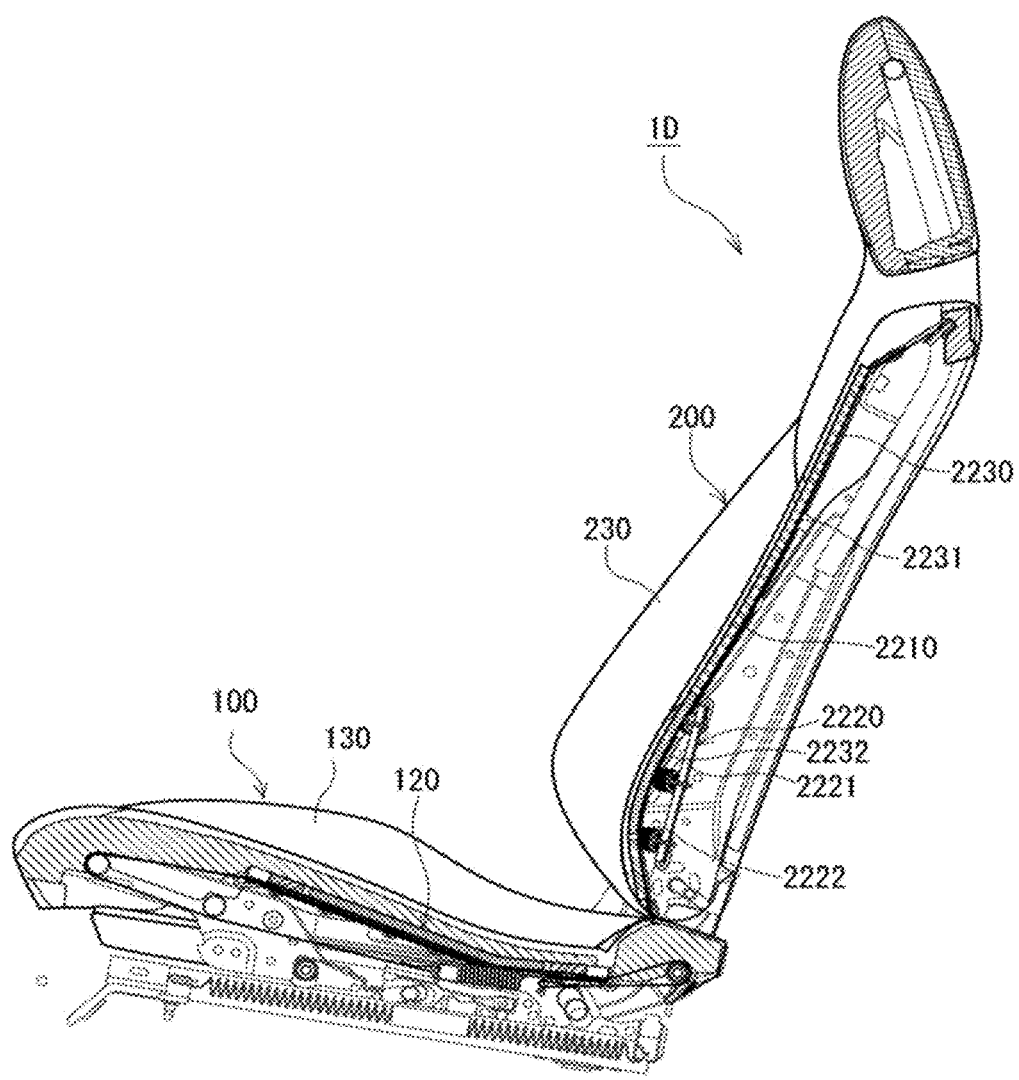
FIG. 35 is an A-A line sectional view of FIG. 34.
Figure 36:
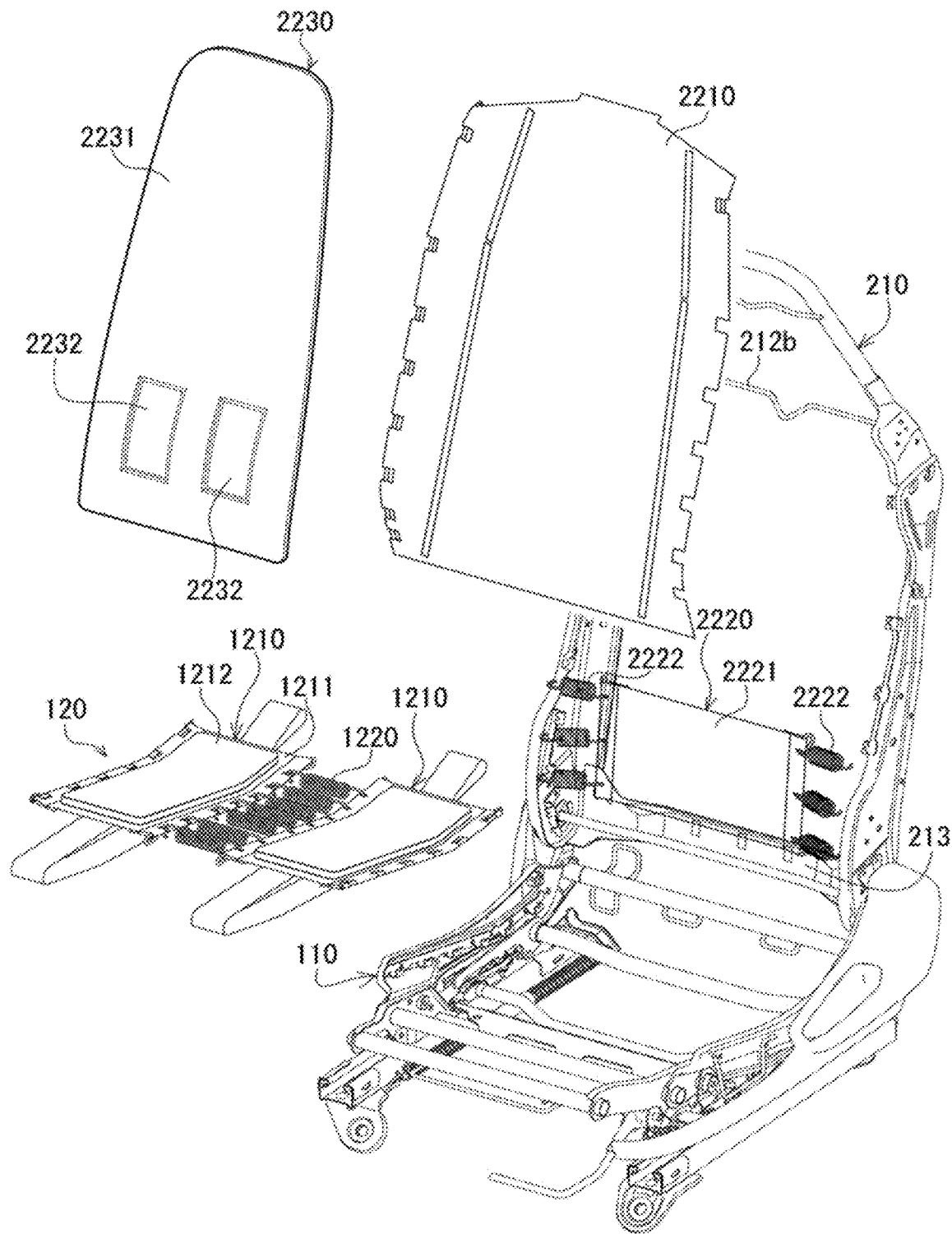
FIG. 36 is an exploded perspective view of substantial parts of the vehicle seat according to the fourth embodiment.
Figure 37:
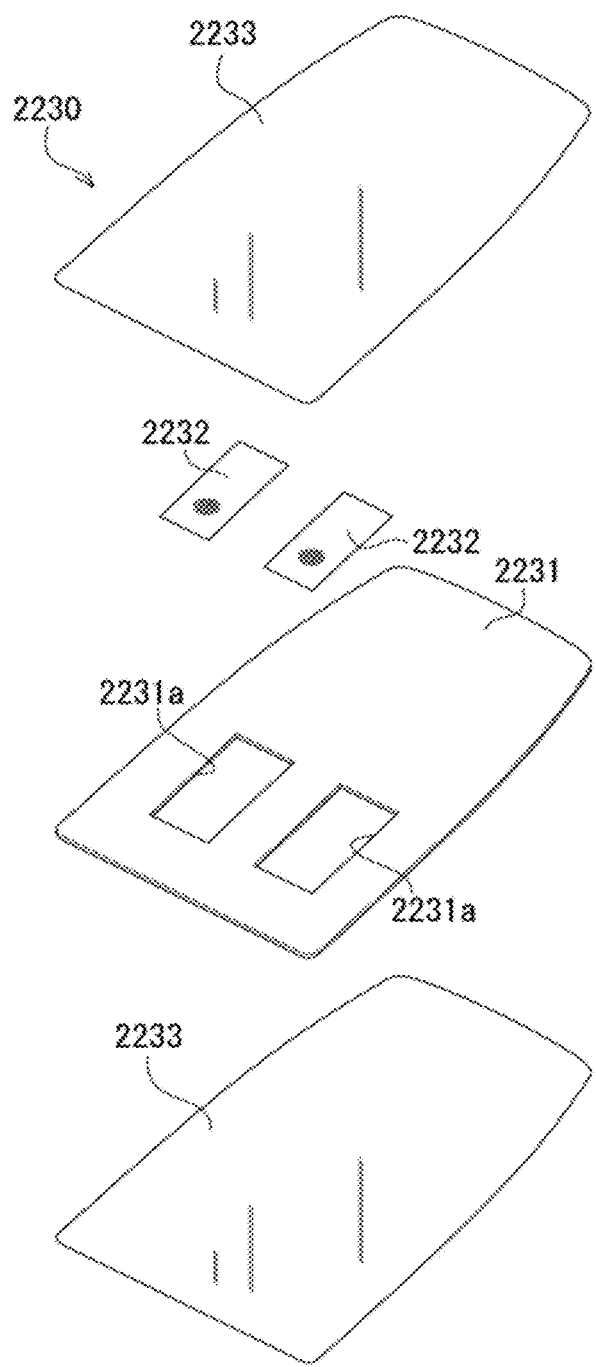
FIG. 37 is an exploded perspective view of a seat back flat support member.

A structure of the seat back flat support member 2230 is the same as that of the lumbar flat support member 2223 used in the third embodiment other than its dimensions. Specifically, it is configured to have a seat back bead foam 2231, three-dimensional knitted fabrics 2232, and cover members 2233. The seat back bead foam 2231 has an area of the range from the seated person's pelvis to his/her upper back region, as described above. As illustrated in FIG. 35, when seen from a side surface, the vicinity of a chest is slightly curved rearward, and a portion corresponding to the lumbar support 2220 is formed in a shape drawn with a gentle S-shaped curve so as to be curved forward, resulting in a high fit feeling for a seated person's back. This reduces a feeling of something foreign and a feeling of contact of the seat back flat support member 2230 itself to/with the seated person. Further, as illustrated in FIG. 36 and FIG. 37, in the seat back bead foam 2231, in a position corresponding to the lumbar support 2220, two substantially rectangular hole portions 2231a, 2231a are formed close to its both sides with the middle in a width direction interposed therebetween, and the three-dimensional knitted fabrics 2232 are disposed in the hole portions respectively. The cover members 2233 are composed of plastic films, cover a front surface and a back surface of each of the three-dimensional knitted fabrics 2232, and are made to adhere to a front surface and a back surface of the seat back bead foam 2231. Stacking the cover members 2233 on the seat back bead foam 2231 allows fracture to be suppressed even though such force as bends the seat back bead foam 2231 greatly is applied. This point is also similar to that of the lumbar flat support member 2223 in the aforesaid third embodiment.

According to this embodiment, since the seat back flat support member 2230 is provided with almost the same size as that of the seat back base fabric 2210, supporting power to support the seated person's back from the upper pelvis to the upper back region (near shoulders) is higher than that in the aforesaid embodiments. In particular, in a range more upward than the lumbar support 2220, due to the presence of the seat back flat support member 2230, a higher damping characteristic can be exhibited.

Further, with limitation to a range corresponding to a seated person's lumbar region, since not only the lumbar support 2220 but also, in the front thereof, the three-dimensional knitted fabrics 2232 disposed between the cover members 2233 are included, and an air layer is also formed between the cover members 2233, The point where elasticity owing to the three-dimensional knitted fabrics 2232 and the air layer acts is similar to that in the lumbar flat support member 2223 of the third embodiment, in particular, load dispersibility in a range close to a seated person's body side is high, which enables an increase in fit feeling, improvement in posture supportability, or the like.

On one hand, since the seat back flat support member 2230 including the three-dimensional knitted fabrics 2232 and the cover members 2233 is disposed in a position closer to the seat back cushioning layer 230 than the lumbar flat support member 2223 of the third embodiment, it also has an advantage of high detection sensitivity in a case of disposing a sensor (microphone sensor) for detecting biosignals.

Here, regarding the vehicle seat 1D according to the fourth embodiment, experiments were conducted on a vibration characteristic and a transient response characteristic. Note that as described above, in the seat cushion 100, by having the coil springs 1220, 1220, a sense of unity between their movement and a seated person's movement on a seating surface is high. Vibrations input from the outside are damped by the movement of the coil springs 1220, 1220 becoming an opposite phase, and since the sense of unity with the seated person is high, vibrations transmitted to the seated person are also damped similarly. Further, the buffer members 1212 enable a reduction in a sense of incongruity, an increase in fit feeling, improvement in posture supportability, or the like by using the three-dimensional knitted fabric. Since the three-dimensional knitted fabric has a characteristic close to a characteristic of human muscle as described above, a relief effect of a pressure applied to an ischium is high. Further, near a lumbar region, due to elasticity of the lumbar coil springs 2222 of the lumbar support 2220, a spring characteristic is relatively high in the seat back 200. This increases a sense of unity with the vehicle seat 1D in a range from seated person's buttocks to his/her lumbar region by synergistic action with the high spring characteristic of the seat cushion 100. That is, the vehicle seat 1D has a structure in which displacement followability is kept by using a spring system (coil spring) having a small hysteresis loss, and the three-dimensional fabric, preferably the three-dimensional knitted fabric approximating a load-deflection characteristic of human muscle and provided with surface stiffness supporting person's weight is used, thereby converting an up-down-direction input to force in a horizontal direction, to thus have a non-rebound characteristic of suppressing a return of external force to a person. This point is also similar to those of the aforesaid first to third embodiments.

That is, in order to obtain the structure with the non-rebound characteristic, in a strained structure in which a seat cushion cushioning layer 130 and the seat back cushioning layer 230 are strained over a cushion frame and a back frame respectively, a pad and an outer layer member (a three-dimensional knitted fabric or the like) composing each of them compose a soft layer, an inner pad member 1212b composed of the three-dimensional knitted fabric or the like, an outer pad member 1212a preferably including a bead foam, and the like, or the lumbar support 2220 or the like form a seating surface supporting a person while moving, and they are provided on the cushion frame or the back frame through the coil springs 1220, 2222 or the like, thereby resulting in a structure in which the displacement followability and the vibration absorbency are created. Then, in order to exhibit these characteristics without a phase lag, stiffness of the cushion frame and the back frame is desired to be high.

Figure 38:
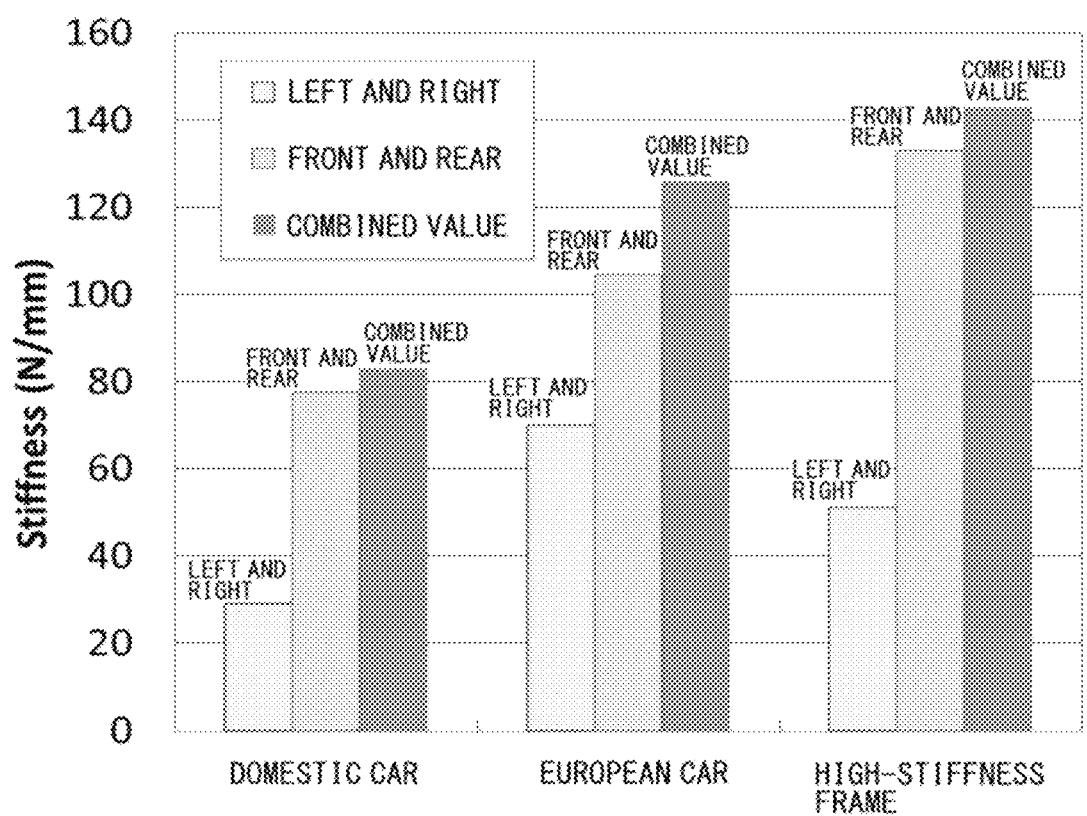
FIG. 38 is a graph of comparing stiffness of back frames of seats used for SUVs of a domestic car and a European car and that of a high-stiffness frame adopted as a back frame of the vehicle seat according to the fourth embodiment which is used in an experimental example.

FIG. 38 is a graph of comparing stiffness of back frames of seats used for SUVs of a domestic car and a European car and that of a high-stiffness frame adopted as the back frame of the vehicle seat 1D according to the fourth embodiment which is used in a later-described experiment. Stiffness measurement was conducted by measuring a displacement when a load of 500 N was applied at a point on each of the back frames at a height of 403.4 mm from a hip point (H. P.). The high-stiffness frame is particularly high in stiffness in a front-rear direction. Experiments were conducted by adopting the high-stiffness frame as a back frame and being equipped with the composing members according to the fourth embodiment.

Experimental Example

The experiments were conducted on a resonance experiment and an experiment on a transient response characteristic. The resonance experiment is conducted in a range of 0.5 to 15 Hz with a sine wave with an amplitude of 2 mmp-p (peak-to-peak) log-swept. The experiment on the transient response characteristic is conducted by using an excited wave at an acceleration of 0.5 Gp-p at 2 Hz. In each of the experiments, an up-down-direction acceleration under buttocks is measured in a state of seating a subject. As shakers, a 1-axis shaker manufactured by DELTATOOLING Co., Ltd. is used for the resonance experiment, and a 6-axis shaker manufactured by DELTATOOLING Co., Ltd. is used for the experiment on the transient responsiveness. As accelerometers, a seat acceleration pickup PV-62 manufactured by Rion Co., Ltd. is used, and an acceleration pickup PV-85 manufactured by Rion Co., Ltd. is used for an acceleration on a platform. The subjects are four healthy males ranging from their twenties to fifties. Subjects' weight is in a range of 50 to 80 kgf, and their body height is in a range of 150 to 180 cm.

Figure 39:
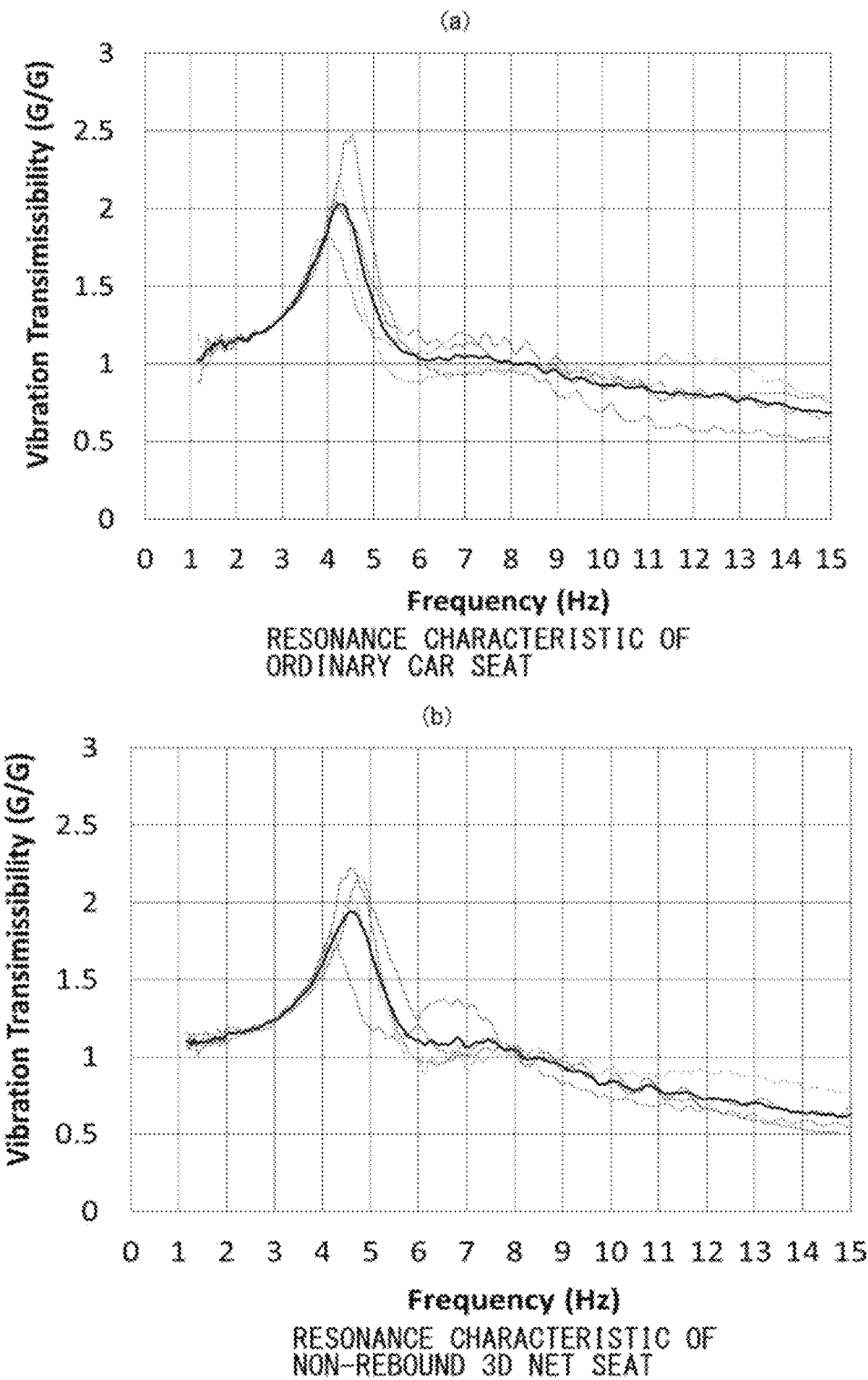
FIGS. 39($a$), ($b$) are experimental results of a resonance characteristic with respect to sinusoidal excitation force.
Figure 40:
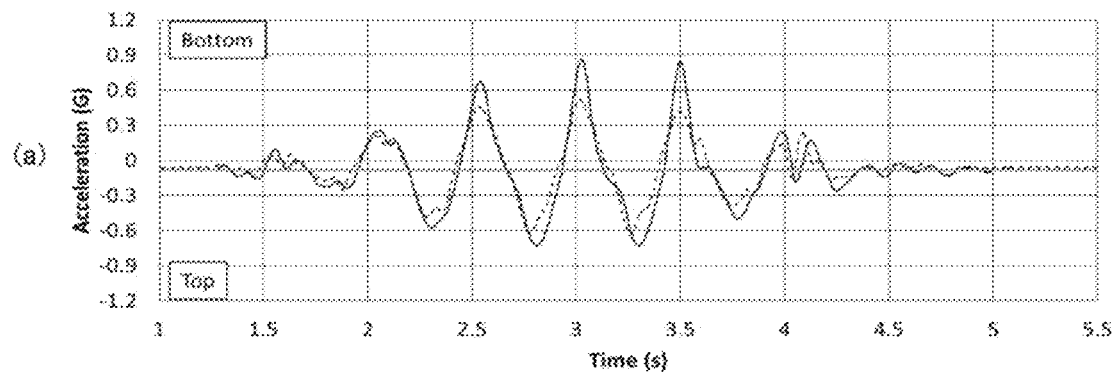
FIGS. 40($a$) to ($c$) are charts illustrating measured results of transient responsiveness which are each measured after seating a subject with a weight of 60 kgf.
Figure 40:
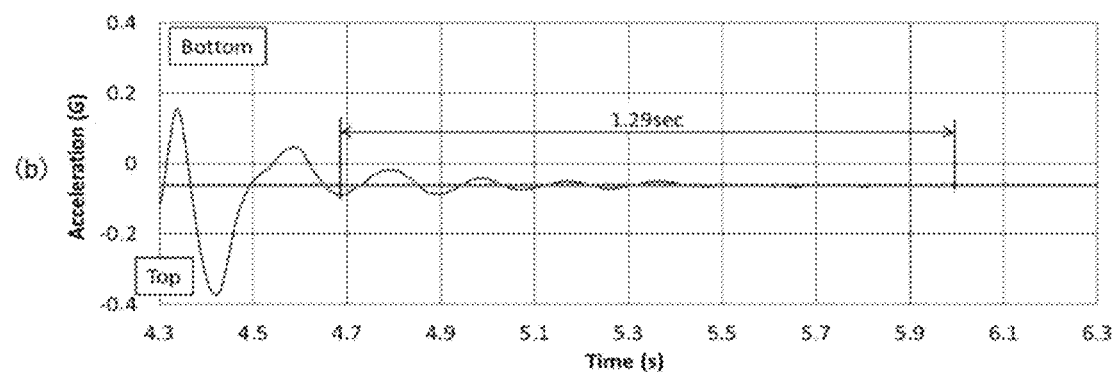
Figure 40:
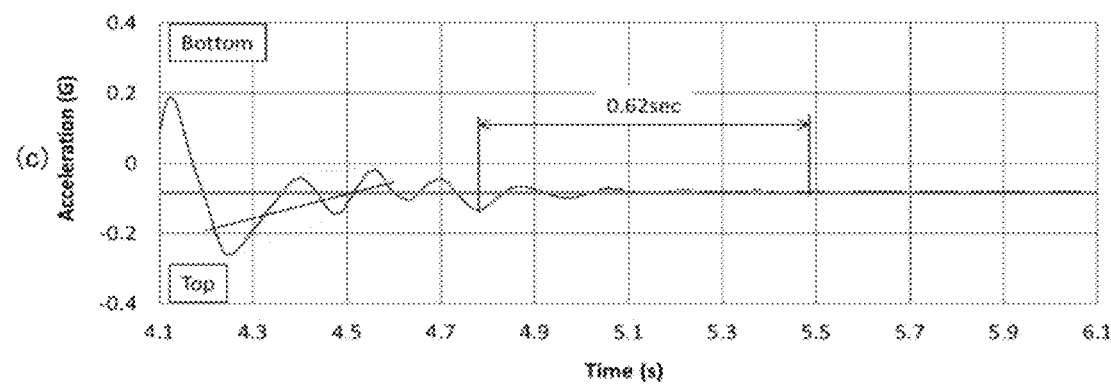
Figure 41:
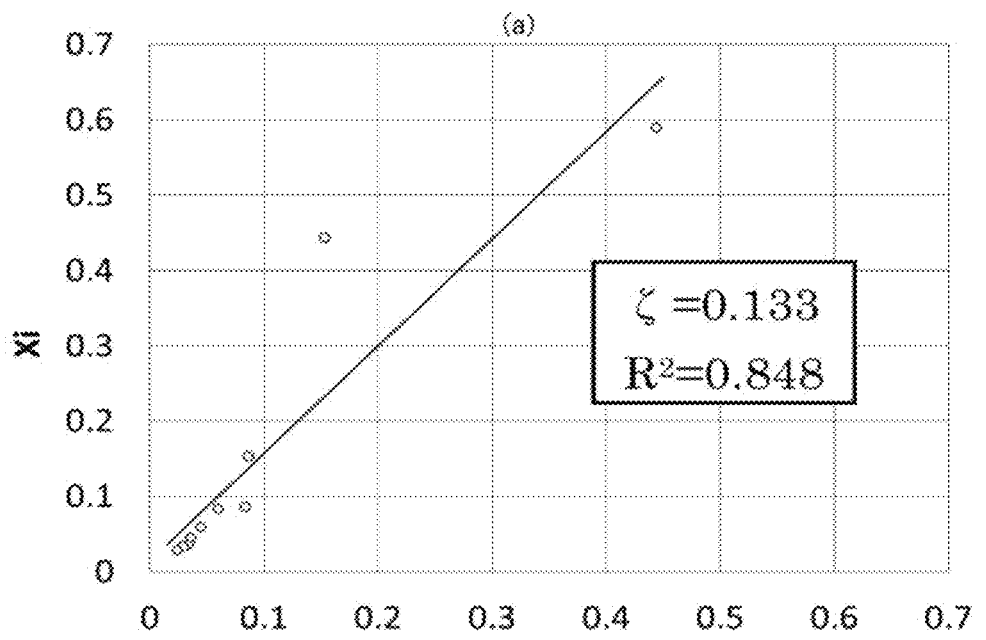
FIGS. 41($a$), ($b$) are charts each illustrating a damping characteristic measured after seating the subject with a weight of 60 kgf.
Figure 41:
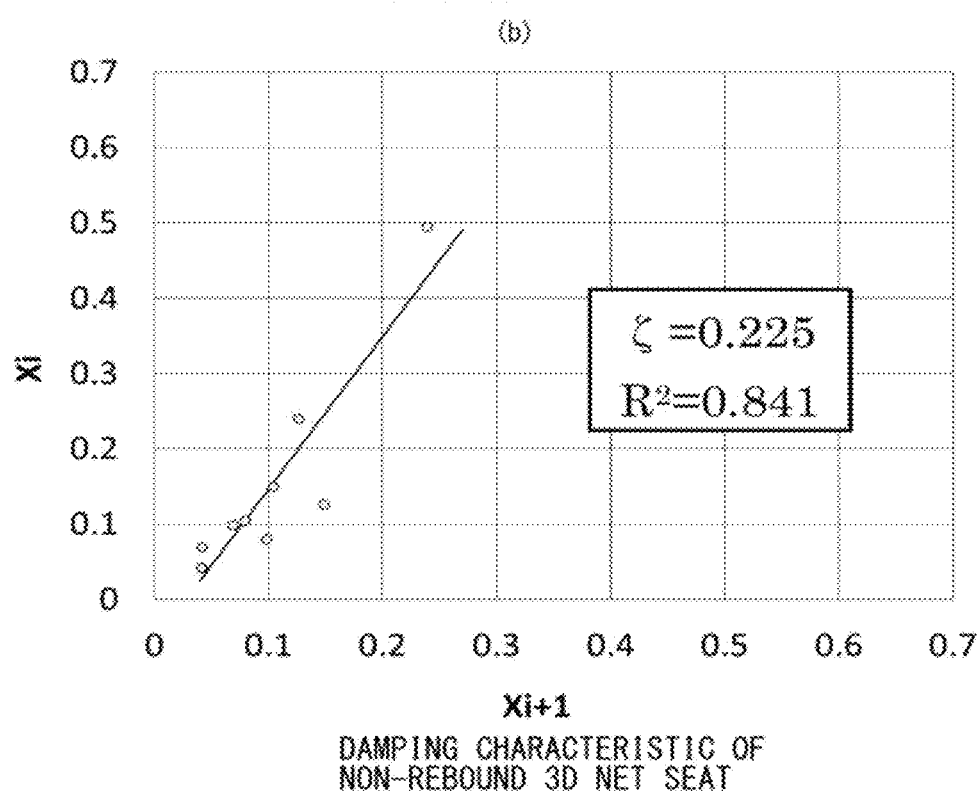

FIGS. 39(a), (b) are experimental results of a resonance characteristic with respect to sinusoidal excitation force. A natural frequency in a seat portion of the vehicle seat 1D (a seat using a three-dimensional knitted fabric having a non-rebound characteristic (a non-rebound 3D net seat)) according to the fourth embodiment used in this experimental example is 4 to 5 Hz, and a gain therein is near 2.0 in all the subjects (FIG. 39(b)), and they are in a range of an ideal resonance characteristic of an automobile seat. Further, an ordinary car seat depended on subjects' physique to cause variations in the resonance characteristic (FIG. 39(a)), while an effect of the physiques on the non-rebound 3D net seat was small (FIG. 39(b)).

FIGS. 40(a) to (c) and FIGS. 41(a), (b) are experimental results of transient responsiveness in a subject with a weight of 60 kgf. Relative to a damping ratio of the ordinary car seat of $\zeta=0.133$ (FIG. 41(a)), a damping ratio of the non-rebound 3D net seat was $\zeta=0.225$ (FIG. 41(b)). Here, from a relationship of $v^2=k/m$, a response to increasing m requires k to be larger (v is a natural angular frequency). In this case, the larger the damping combined with an elastic support spring is, the smaller a displacement amplitude can be, but because transmissibility to a person seated on the seat is increased, a suitable value of a damping ratio which is to be used is required to be found in consideration of both the amplitude and the transmissibility, and conventionally, a suitable value of an impulse response is set to $\zeta=0.25$. The damping ratio of the non-rebound 3D net seat was close to this value. Further, the settling time was 0.62 sec relative to that in the ordinary car seat having a strong spring property (FIG. 40(c)), and the settling time was allowed to fall within 1 sec with respect to a swing at 0.1 Gp-p at 5 Hz by which a shaking feeling started to be perceived, resulting in allowing the time to be nearly halved as compared with 1.29 sec in the ordinary car seat (FIG. 40(b)).

Figure 42:
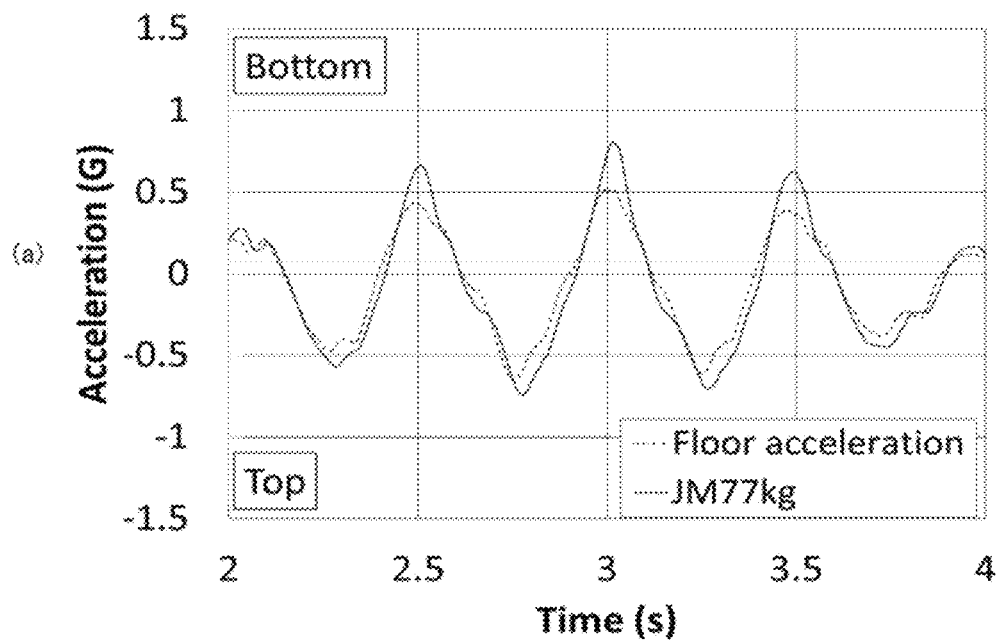
FIG. 42($a$) is a chart illustrating a measured result of transient responsiveness of a subject with a weight of 77 kgf, and FIG. 42($b$) is a chart illustrated by enlarging a part of FIG. 42($a$).
Figure 42:
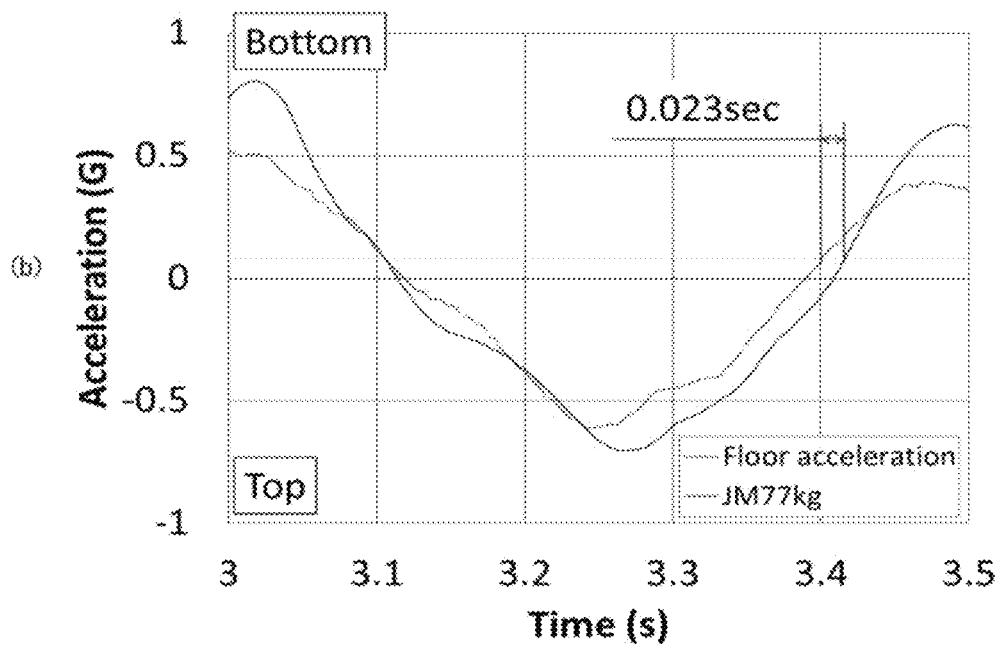

FIGS. 42(a), (b) are an experimental result of transient responsiveness of a subject with a weight of 77 kgf. A phase difference is very small to be in the neighborhood of 20 ms with respect to a platform of the shaker, and a sense of unity between a person and a vehicle can be said to be created.

Figure 43:
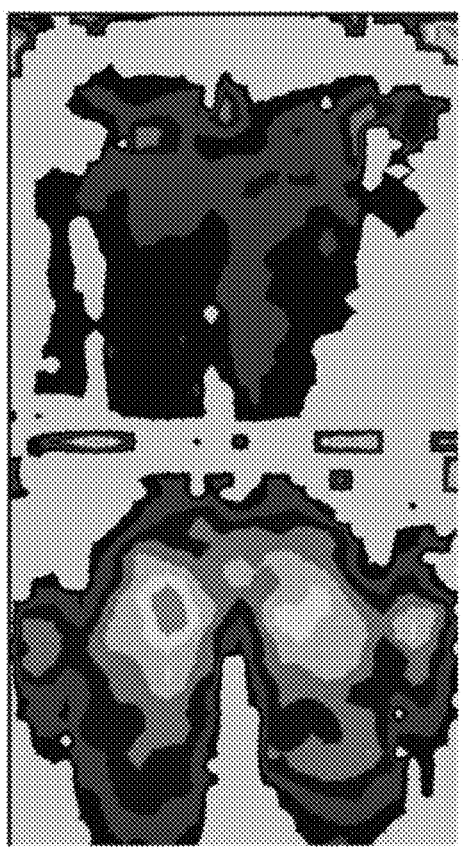
FIG. 43($a$) is a view illustrating a body pressure distribution on an ordinary car seat, and FIG. 43($b$) is a view illustrating a body pressure distribution on a non-rebound 3D net seat being the vehicle seat according to the fourth embodiment.
Figure 43:
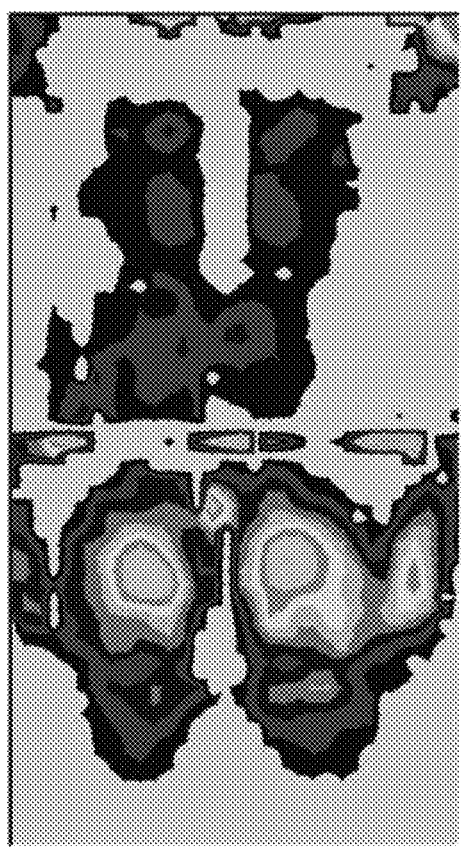

FIGS. 43(a), (b) each illustrate a body pressure distribution of a subject with a weight of 71 kgf. As illustrated in FIG. 43(a), the ordinary car seat comes into contact with his body in a wide range. In particular, the strong and weak degree of a body pressure on its back portion is small, which gives such an uncomfortable feeling as to cling to his body. As illustrated in FIG. 43(b), the non-rebound 3D net seat supports his body with body side portions around a backbone centered. The body side support is the support suitable for long-time seating which facilitates breathing, and leads to effective suppression of passenger's fatigue.

Comparative Experiment of Seat Back

Figure 44:
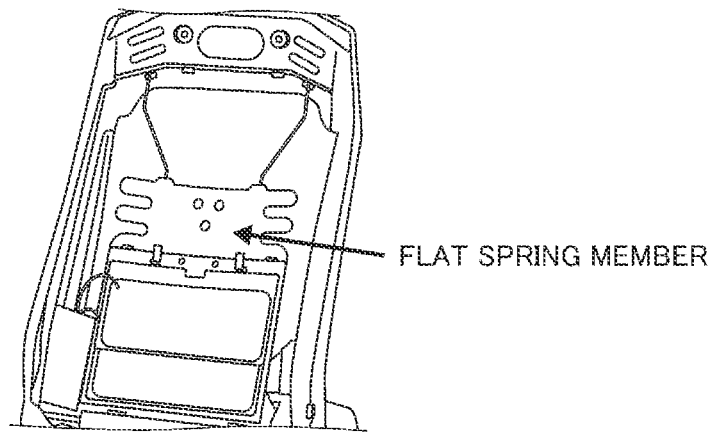
FIGS. 44($a$) to ($c$) are views illustrating back base layers of the seats used in a comparative experiment of the seat backs.
Figure 44:
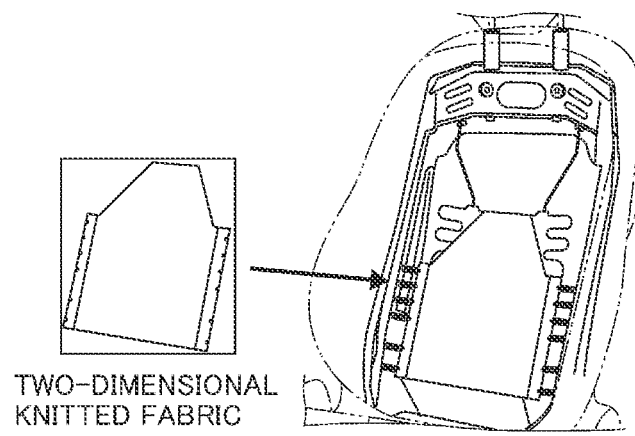
Figure 44:
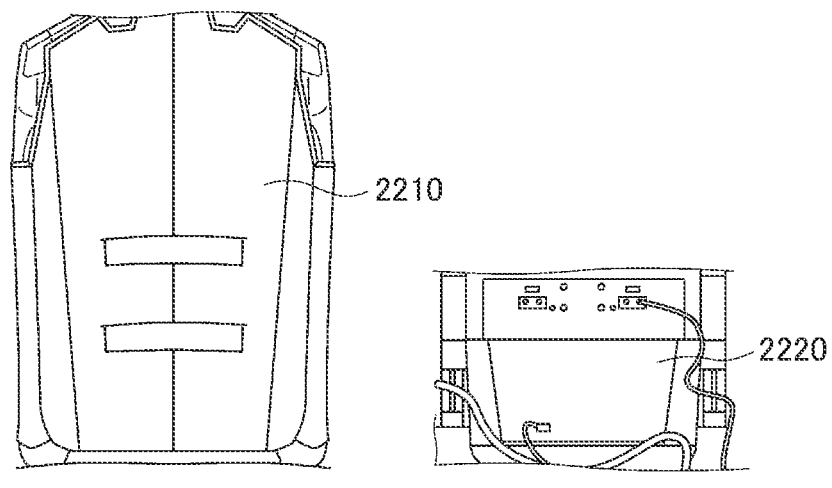

As described above, in the vehicle seat of the present invention, in the seat cushion, greater importance is given to a spring characteristic than a damping characteristic, while in the seat back, greater importance is given to the damping characteristic than the spring characteristic. Thus, a cushioning layer of the seat cushion was composed of a urethane member adopted in the ordinary car seat, to increase the damping characteristic of the seat back, thereby examining how the damping characteristic of the entire vehicle seat was changed. Note that in the following explanation and FIG. 44 to FIG. 52, "Genuine Seat (G seat)" means the ordinary car (genuine) seat, and as a back base layer constituting a cushioning layer of the seat back, such a flat spring member whose both sides are each formed in a comb teeth shape as illustrated in FIG. 44(a) is adopted. "Remodeling A seat (RA seat)" is disposed with a two-dimensional knitted fabric covering a surface of the flat spring member of the ordinary car seat, and both sides of the two-dimensional knitted fabric are supported with respect to side frames by five coil springs for each of the left and right sides, as illustrated in FIG. 44(b). "Remodeling B seat (RB seat)" is disposed with the seat back flat support member 2230 provided with the seat back base fabric 2210 bridged over the back frame 210 and the lumbar support 2220 supported on side frames by three coil springs for each of the left and right sides, the same as the fourth embodiment, as the back base layer 220, as illustrated in FIG. 44(c). Further, in any of the seats, a configuration of the seat back cushioning layer 230 covering an upper portion of the back base layer was set to have exactly the same structure as those of the aforesaid embodiments.

Experimental Method

A load-deflection characteristic of a seat portion and a back portion is measured to know seat characteristics. Autograph AG-Xplus manufactured by Shimadzu Corporation is used for the load-deflection characteristic.

A damping ratio is found by making a weight of 6.7 kg freely fall from a height of 20 mm and measuring a free damped waveform. A laser displacement sensor LB-01 manufactured by KEYENCE CORPORATION is used for a displacement.

Subjects in the resonance experiment are four Japanese healthy males ranging from their twenties to fifties. Subjects' weight is 58 kg to 77 kg. An up-down-direction 1-axis shaker manufactured by DELTATOOLING Co., Ltd. is used for shaking, and a shaking waveform is a sine logarithmic sweep waveform (0.5 to 15 Hz) with an amplitude of 2 mmp-p. As an acceleration sensor, a piezoelectric acceleration pickup PV-85 (an acceleration on a platform) and a seat vibration pickup (three directions) PV-62 (an acceleration of subject's buttocks) which are manufactured by Rion Co., Ltd. are used.

A body pressure distribution is measured by using a body pressure distribution measurement system (BPMS system) manufactured by Tekscan.

Experimental Result and Consideration

Figure 45:
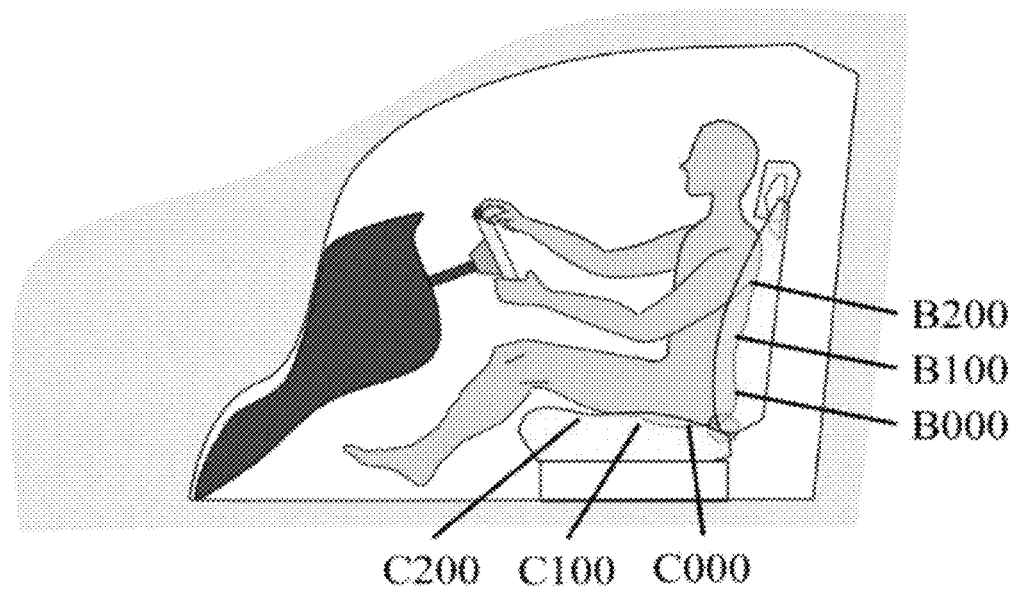
FIG. 45 is a view for explaining measuring points of the load-deflection characteristic and the damping characteristic.
Figure 46:
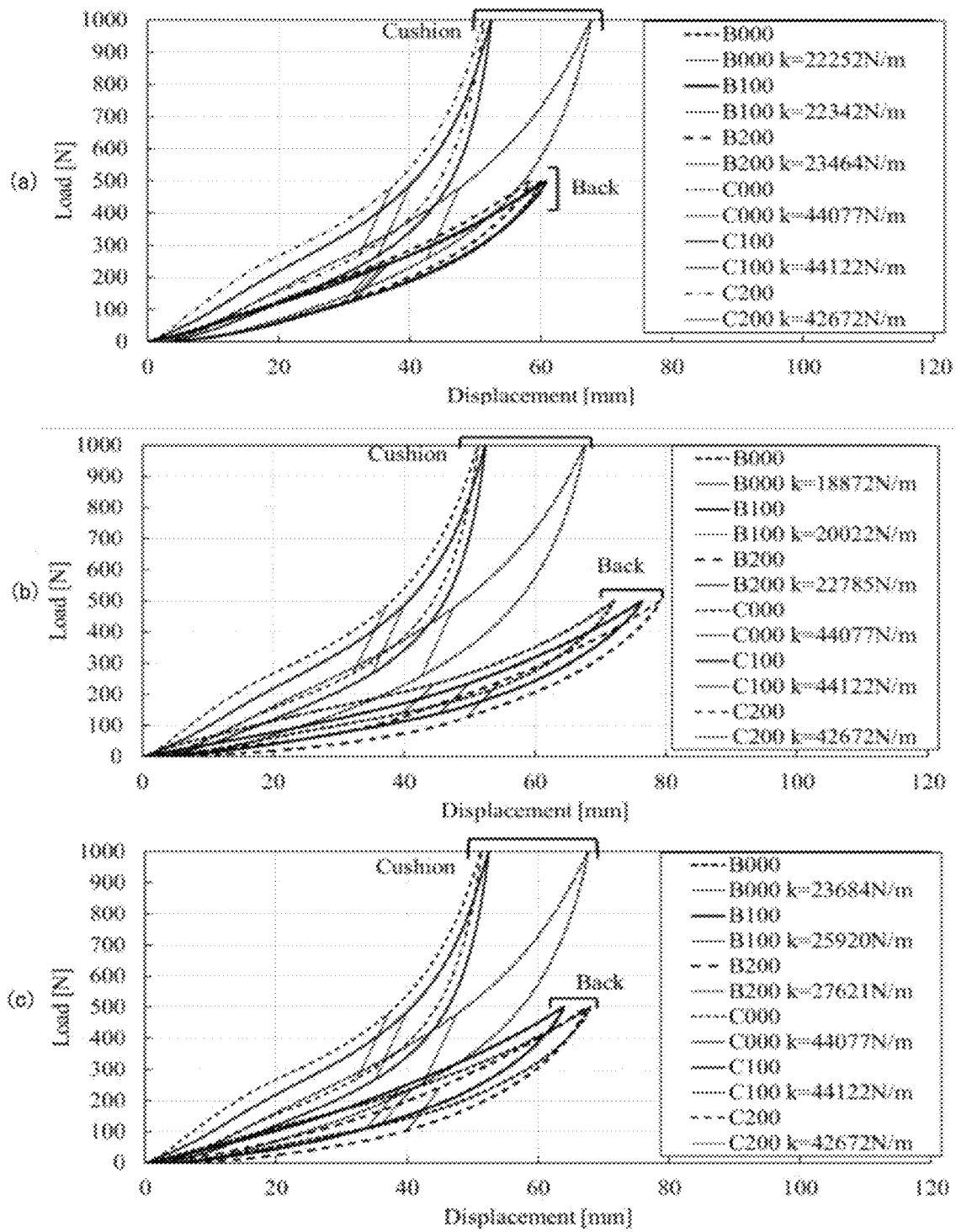
FIGS. 46($a$) to ($c$) are charts illustrating the load-deflection characteristic of the seat cushions and the seat backs of the seats.
Figure 47:
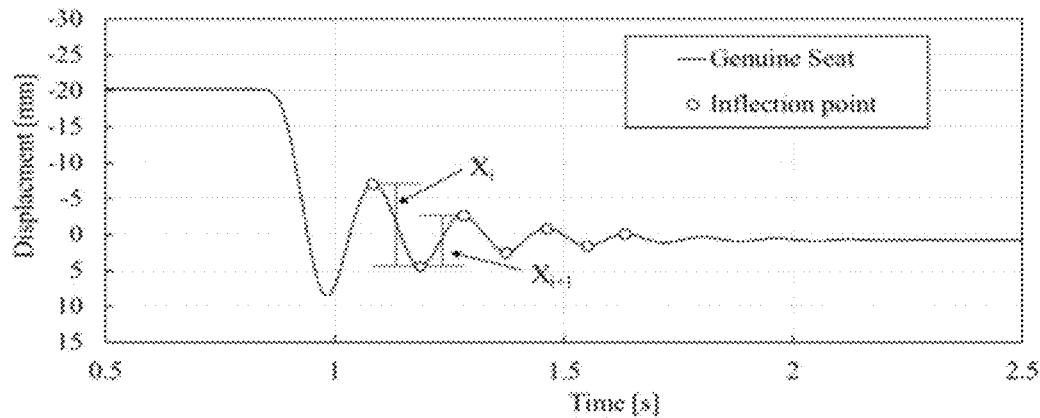
FIGS. 47($a$) to ($c$) are free damped waveforms illustrating the damping characteristic of the seat backs of the seats.
Figure 47:
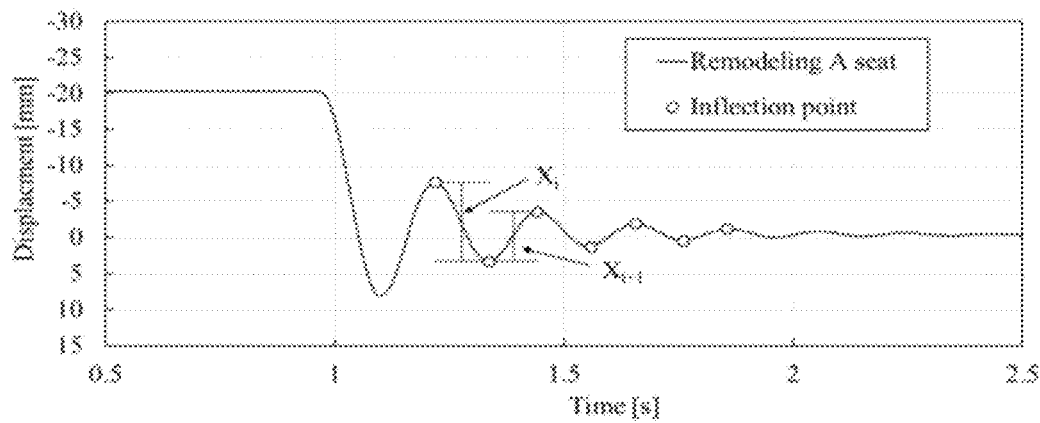
Figure 47:
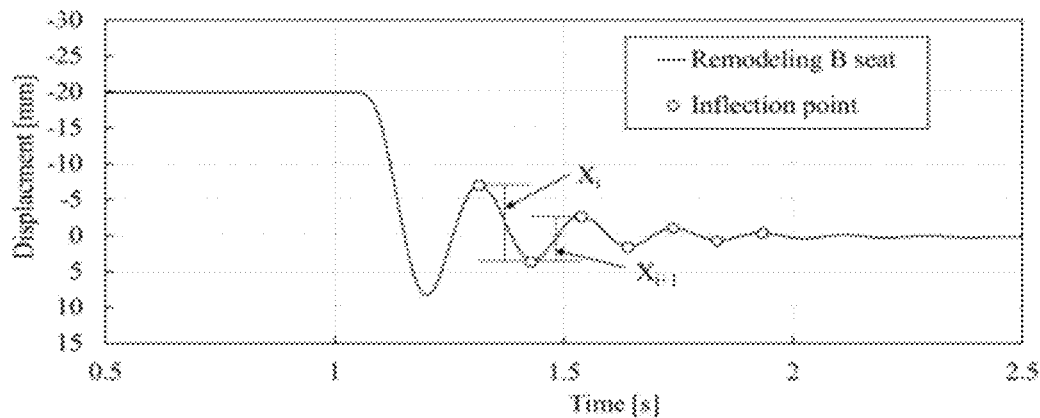
Figure 48:
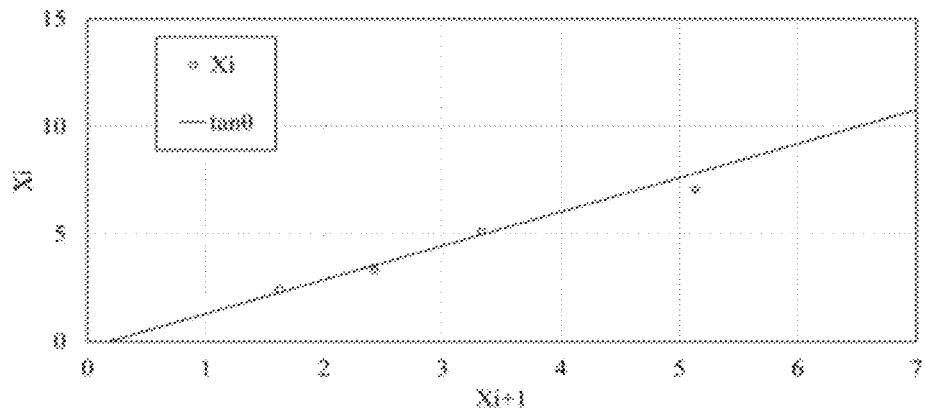
FIGS. 48($a$) to ($c$) are charts illustrating relationships between Xi and Xi+1 which are obtained by free damped vibrations in FIGS. 47($a$) to ($c$).
Figure 48:
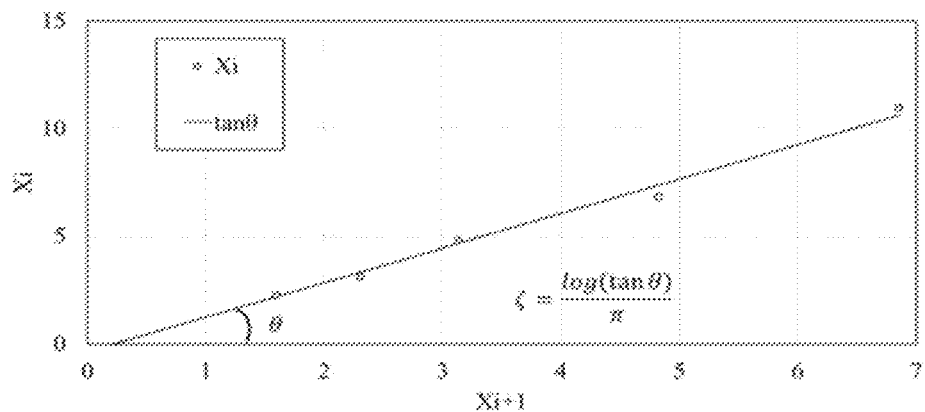
Figure 48:
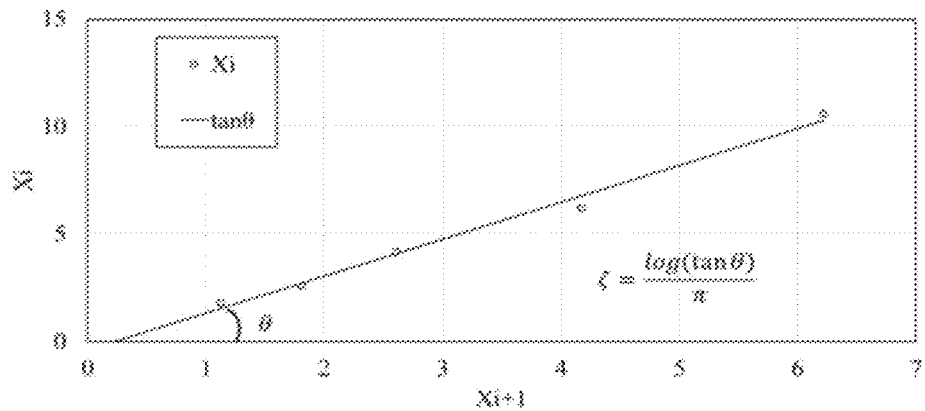

FIG. 45 illustrates measuring points, and C000 or B000 is in the vicinity of a pelvis of the subject seated on the seat, C100 or B100 is in the vicinity from buttocks to a femoral region or to a lumbar region, and C200 or B200 is in the vicinity of the femoral region or the vicinity of a scapular region. Specifically, C000 or B000 is located 100 mm forward of or upward from an intersection of the seat cushion and the seat back, and the points are arranged at pitches of 100 mm between them along the surfaces. A size of a pressure board is 200 mm in diameter.

FIG. 46(a) illustrates the load-deflection characteristic of the G seat, FIG. 46(b) illustrates the load-deflection characteristic of the RA seat, and FIG. 46(c) illustrates the load-deflection characteristic of the RB seat. A value of k in the charts is a dynamic spring constant, and also in consideration of a height of a resonance peak and an influence of a hysteresis loss, the dynamic spring constant has been calculated assuming that an amplitude is ±2 mm near a resonant frequency. The load-deflection characteristic of the seat back of the G seat is a characteristic having values almost equal to each other from the pelvis and the lumbar region up to the thoracic vertebrae. Therefore, a pressure near the fourth lumber vertebrae being a gravity center position of the body is high and a pressure on an upper back region is low, which exhibits a pressure distribution such that loins are pushed out. On one hand, in the load-deflection characteristic of the RA seat, a deflection difference of about 10 mm occurs from the lumbar portion up to the upper back portion, to increase a contact area, which results in such a support distribution as to cause coming-off in a shoulder portion. The RB seat having a configuration of the seat back similar to that of the fourth embodiment has a deflection difference of about 5 mm from the lumber portion up to the upper back portion, to increase a contact area, which increases a spring constant of the upper back portion, thus being impressed as a uniform support distribution up to the shoulder portion.

In the spring constants of the seat backs, the RA seat is slightly lower, resulting in weak spring constants, as compared with the G seat. The spring constants of the RB seat are relatively higher than those of the RA seat. The RB seat, in which a support balance between the seat cushion and the seat back is nearly balanced, has the load-deflection characteristic to be spared for external force.

Figure 49:
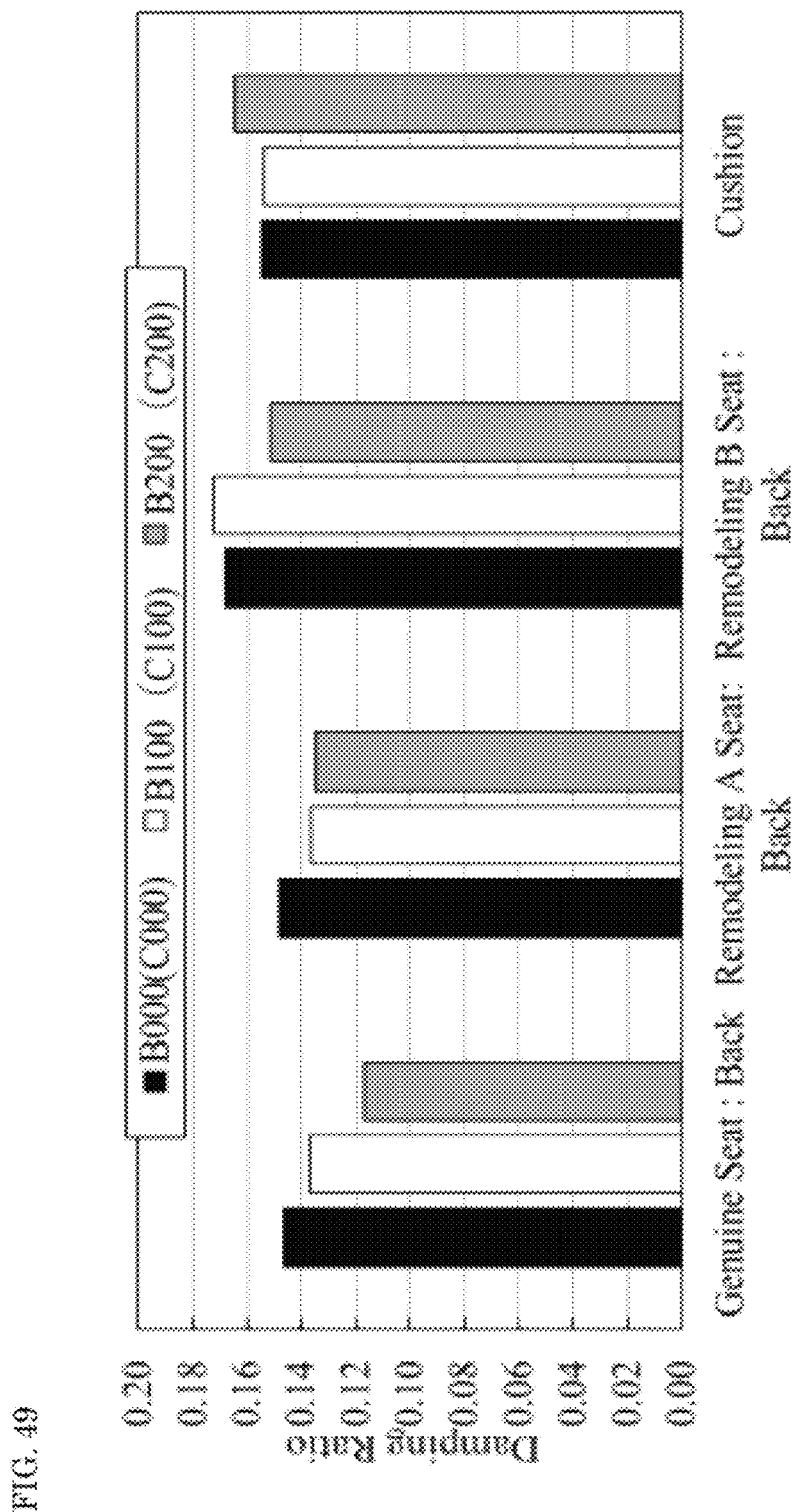
FIG. 49 is a graph illustrating damping ratios of each of the seats.

FIGS. 47(a) to (c) illustrate examples of free damped waveforms when the weight of 6.7 kg is made to freely fall from the height of 20 mm. FIGS. 48(a) to (c) illustrate relationships between Xi and Xi +1 obtained by free damped vibrations in FIGS. 47(a) to (c). Based on each of the charts, damping ratios $\zeta$ were found by using a formula: $\zeta=\log(\tan\theta)/\pi$. FIG. 49 illustrates damping ratios at B000 of the seat backs of the G seat, the RA seat, and the RB seat. The damping ratio $\zeta$=about 0.17 was found in the RB seat, and the damping ratio $\zeta$=about 0.14 was found in both the G seat and the RA seat. Any of damping ratios at C000 of the seat cushions was the damping ratio $\zeta$=about 0.15 since they had the same configuration. Consequently, the seat back of the RB seat having a similar configuration to that of the fourth embodiment was able to make the damping ratio higher than that of the seat cushion.

Figure 50:
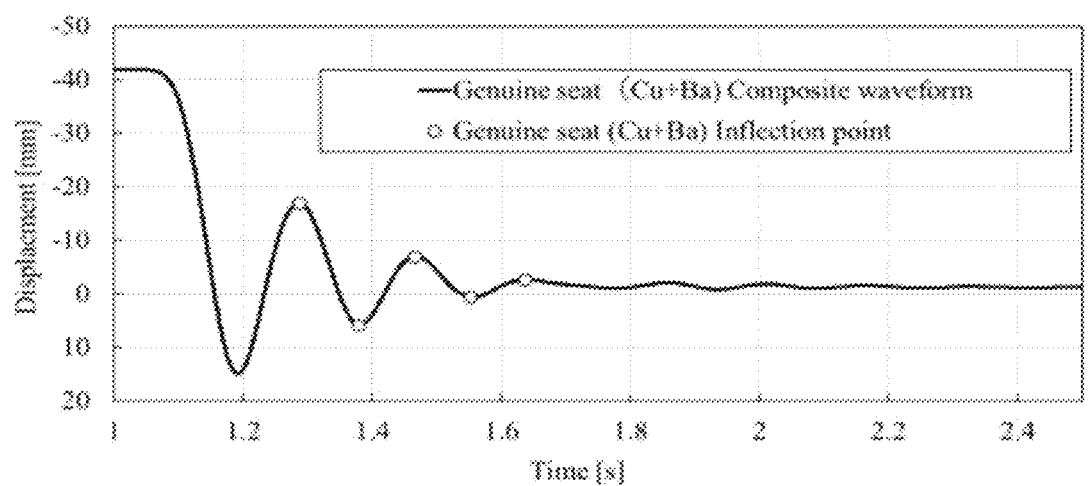
FIGS. 50($a$), ($b$) are charts comparing the damping characteristic of a G seat and a RB seat.
Figure 50:
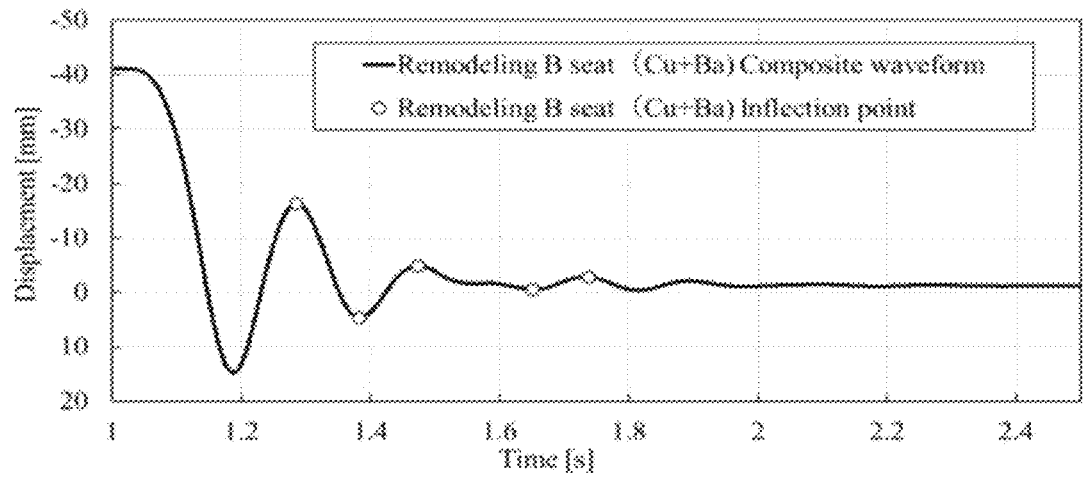

Here, the effect that the seat back has on the seat cushion can be considered to be presumed by resultant force of force input from the seat cushion and the seat back to the pelvis. Thus, FIGS. 50 illustrate the results obtained by superimposing free damped vibrations of the seat cushion and the seat back, regarding the G seat and the RB seat. Since the seat cushion and the seat back have almost the same damping ratio in the G seat, a phase difference between the seat cushion and the seat back causes the damping. On the other hand, in the RB seat, it is found that a spring characteristic distributed around the pelvis and a damping characteristic distributed from the lumbar portion up to the upper back portion cause the damping at an earlier stage than that in the G seat by using mass of a trunk.

Figure 51:
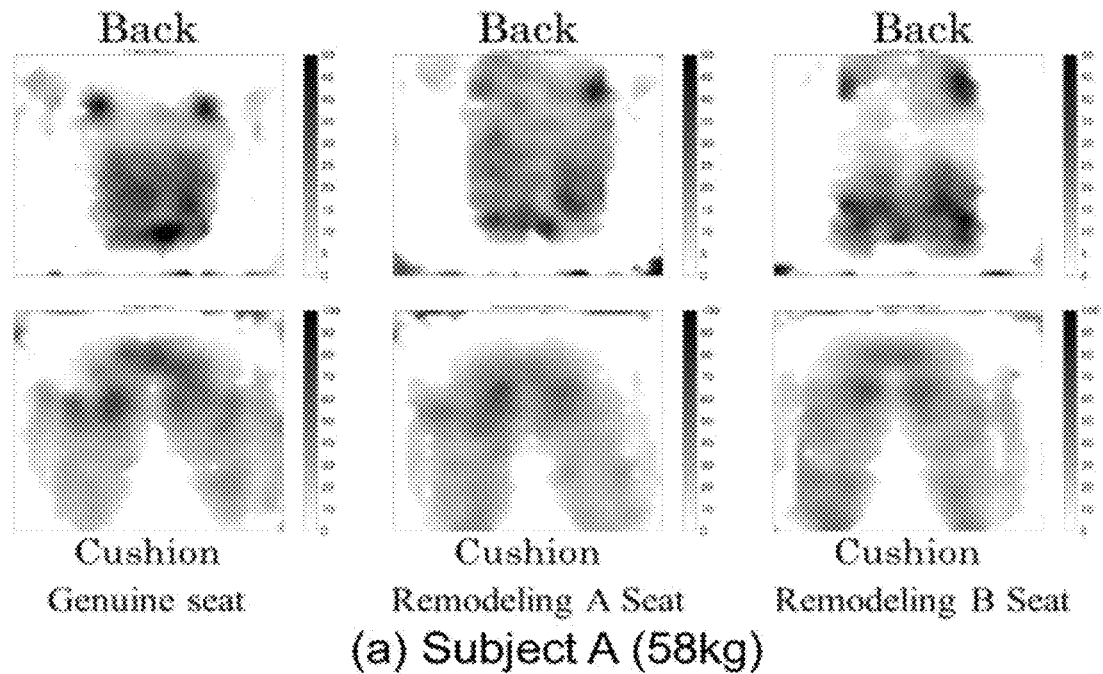
FIGS. 51($a$), ($b$) are views illustrating body pressure distributions of subjects A, D with the seats individually.
Figure 51:
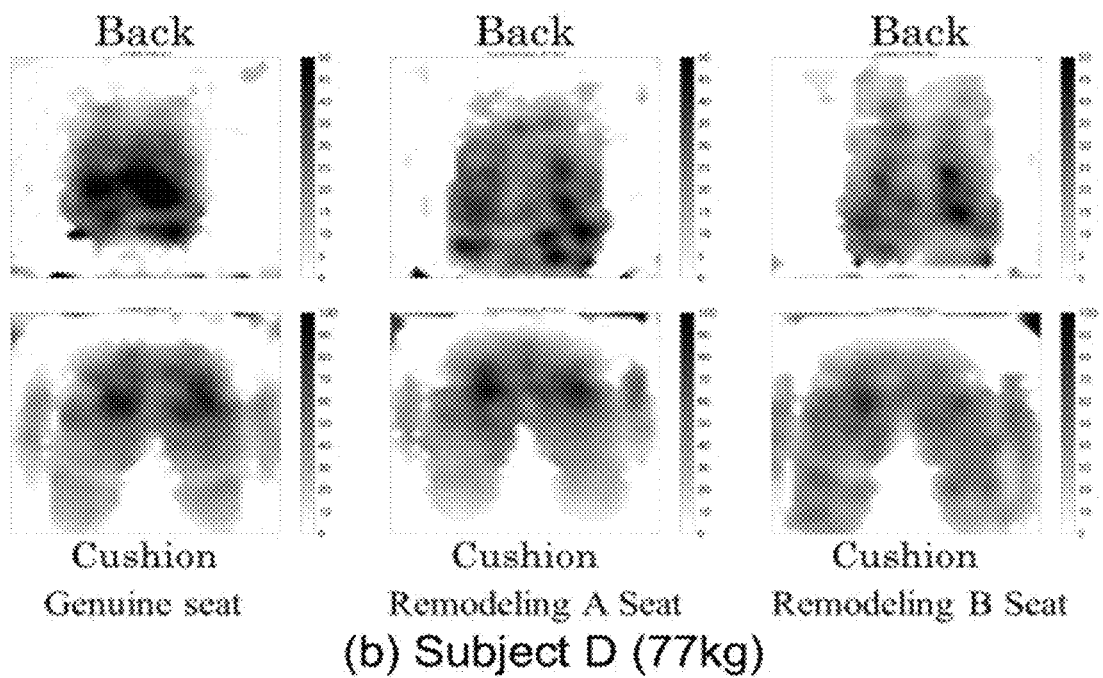

FIGS. 51 illustrate body pressure distributions of each of a subject A with a weight of 58 kg and a subject D with a weight of 77 kg. Both the subjects indicated the same tendency, in which contact areas were small in the G seat and contact areas increased in order of the RA seat and the RB seat. These results say that the RB seat has a structure likely to damp vibrations of the seat cushion by using mass of the upper back region.

Figure 52:
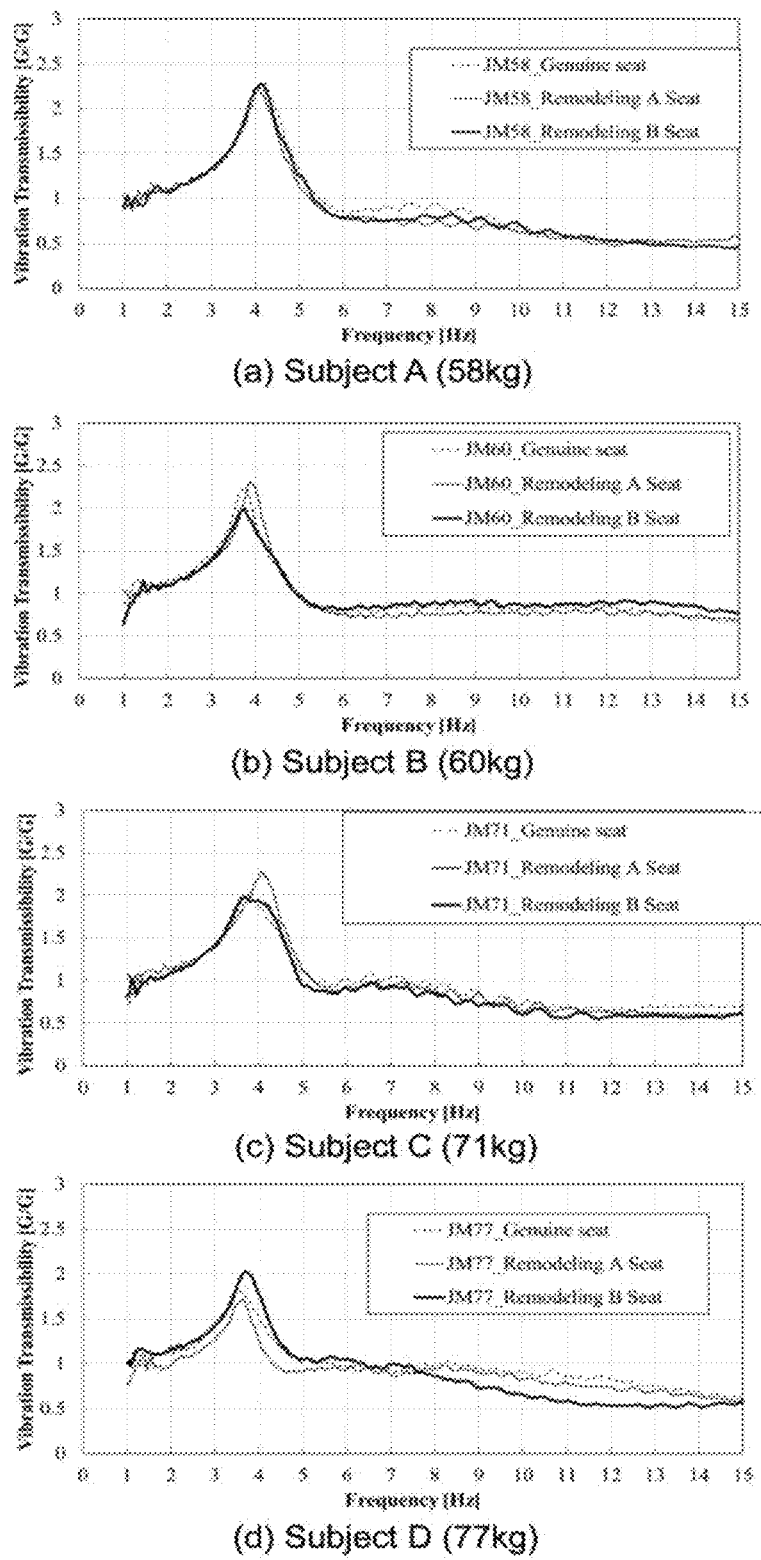
FIGS. 52($a$) to ($d$) are charts illustrating vibration transmissibilities in an up-down direction of the subjects A to D seated on the seats.

FIG. 52 illustrate vibration transmissibilities in an up-down direction of the subjects seated on these seats. In the RB seat including a combination of the damping ratio $\zeta$=0.15 of the seat cushion and the damping ratio $\zeta$=0.17 of the seat back, in the cases of the subjects with the weight of 58 kg to 77 kg, resonant frequencies of the seat cushion were in a range of 3.0 to 4.5 Hz, and gains were 1.9 to 2.3. It was indicated that visceral resonance was reduced in the subject A and resonance from internal organs up to a chest was reduced in the subject D. It was found that up-down movement of a backbone was reduced in the subjects B, C. Though there is a difference between the reduced regions depending on the subjects, it is found that the RB seat results in improvement in vibration absorbency of the seat cushion as compared with the G seat.

According to the above description, it has been found that changing the distributions of the spring characteristic and the damping ratio of the seat back makes it possible to control the damping ratio and the settling time of the seat cushion, and increasing the damping ratio of the seat back more than that of the seat cushion makes it possible to reduce backbone resonance, visceral resonance, and chest resonance.

EXPLANATION OF REFERENCE SIGNS 1A, 1B, 1C, 1D vehicle seat
100 seat cushion
110 cushion frame
120 seat cushion base layer
1210 base support part
1211 support fabric
1212 buffer member
1212a outer pad member
1212b inner pad member
1212c cover member
1220 coil spring (base support part elastic member)
130 seat cushion cushioning layer
200 seat back
210 back frame
220 back base layer
2210 seat back base fabric
2220 lumbar support
2221 lumbar support fabric
2222 lumbar coil spring
2223 lumbar flat support member
2223a lumbar bead foam
2223b three-dimensional knitted fabric
2223c cover member
2230 seat back flat support member
2231 seat back bead foam
2232 three-dimensional knitted fabric
2233 cover member

The invention claimed is:
1. A seat cushion for a vehicle seat, the seat cushion comprising:
a seat cushion base layer supported by a cushion frame; and
a seat cushion cushioning layer disposed on the seat cushion base layer,
wherein the seat cushion base layer comprises
left-right base support parts provided in a range including positions corresponding to seated person's left-right ischial tuberosities, apart from each other in a width direction of the cushion frame,
wherein the left-right base support parts are coupled with each other through base support part elastic members, and supported to be movable by the cushion frame, and
wherein the respective left-right base support parts are movable with 6 degrees of freedom with the positions corresponding to ischial tuberosities centered.
2. A seat cushion for a vehicle seat, the seat cushion comprising:
a seat cushion base layer supported by a cushion frame; and
a seat cushion cushioning layer disposed on the seat cushion base layer,
wherein the seat cushion base layer comprises:
left-right base support parts provided in a range including positions corresponding to seated person's left-right ischial tuberosities, apart from each other in a width direction of the cushion frame; and
base support part elastic members bridged between the left-right base support parts, in which restoring force acts in directions bringing the left-right base support parts close to each other, near a middle in a width direction of the cushion frame.
3. The seat cushion according to claim 2, wherein the base support part elastic members are composed of coil springs, and disposed in plurality along a front-rear direction of the cushion frame between the left-right base support parts.
4. The seat cushion according to claim 2,
wherein the left-right base support parts each comprise:
a support fabric whose front portion, rear portion, and outer portion are supported by the cushion frame; and
a buffer member stacked on the support fabric.
5. The seat cushion according to claim 4, wherein the buffer member is configured to have a three-dimensional knitted fabric.
6. The seat cushion according to claim 5, wherein the buffer member is configured to have an outer pad member in a substantially rectangular frame shape, an inner pad member disposed in an inner space of the outer pad member, and cover members covering a front surface and a back surface of the inner pad member and made to adhere to a front surface and a back surface of the outer pad member.
7. The seat cushion according to claim 6, wherein the outer pad member is a bead foam, and the inner pad member is a three-dimensional knitted fabric.
8. A vehicle seat including a seat cushion and a seat back, wherein, as the seat cushion, the seat cushion according to claim 2 is used.
9. The vehicle seat according to claim 8,
wherein the seat back comprises:
a seat back base layer supported by a back frame; and
a seat back cushioning layer disposed by covering the seat back base layer, and
wherein the seat back base layer comprises:
a seat back base fabric bridged between left-right side frames of the back frame; and
a lumbar support elastically supported through spring members in a range close to a portion more downward than a substantially middle portion in an up-down direction of the back frame.
10. The vehicle seat according to claim 9, wherein the seat back base fabric has a size which is longer than an up-down-direction length of the lumbar support and covers a portion between a frame disposed close to an upper portion of the back frame and a frame disposed close to a lower portion thereof.
11. The vehicle seat according to claim 9,
wherein the lumbar support comprises
a lumbar flat support member having a plate-shaped lumbar bead foam, three-dimensional knitted fabrics disposed in hole portions formed in the lumbar bead foam, and cover members covering a front surface and a back surface of each of the three-dimensional knitted fabrics and made to adhere to a front surface and a back surface of the lumbar bead foam.
12. The vehicle seat according to claim 9,
wherein when, in a load-deflection characteristic of the seat cushion in pressurizing the seat cushion with a pressure board having a diameter of 200 mm, at a speed of 50 mm/min, and up to a load of 1000 N, in a range of connecting an origin, a maximum displacement point, and a maximum load point, in the range, a ratio between an outward area (a1) of a range including an outward curve and an inward area (b1) of a range including an inward curve is set as a load characteristic area ratio of the seat cushion (b1/a1), and
in a load-deflection characteristic of the seat back in pressurizing the seat back with a pressure board having a diameter of 200 mm, at a speed of 50 mm/min, and up to a load of 500 N, in a range of connecting an origin, a maximum displacement point, and a maximum load point, in the range, a ratio between an outward area (a2) of a range including an outward curve and an inward area (b2) of a range including an inward curve is set as a load characteristic area ratio of the seat back (b2/a2), there is a relationship of (b1/a1)>(b2/a2).

13. The vehicle seat according to claim 12, wherein a difference between the load characteristic area ratio of the seat cushion (b1/a1) and the load characteristic area ratio of the seat back (b2/a2) is in a range of 3 to 15%.

14. The vehicle seat according to claim 12,
wherein spring constants at a balanced point on outward curves of a load-deflection characteristic of the seat back are each 15000 N/m or more.

15. The vehicle seat according to claim 9, wherein a damping ratio of the seat back is larger than a damping ratio of the seat cushion, in which the respective damping ratios are found from free damped waveforms when a weight of 6.7 kg is made to fall from a height of 20 mm onto the seat cushion and the seat back.

16. The vehicle seat according to claim 15,
wherein in a load-deflection characteristic of the seat back in pressurizing the seat back with a pressure board having a diameter of 200 mm, at a speed of 50 mm/min, and up to a load of 500 N,
from an intersection of the seat cushion and the seat back, a deflection difference at each of 100 mm and 300 mm upward measuring points in the seat back is 4 mm or more and less than 10 mm.

17. A vehicle seat including a seat cushion and a seat back, wherein, as the seat cushion, the seat cushion according to claim 1 is used.

* * * * *